(12) United States Patent
Yoscovich et al.

(10) Patent No.: US 12,407,158 B2
(45) Date of Patent: Sep. 2, 2025

(54) ARC DETECTION AND PREVENTION IN A POWER GENERATION SYSTEM

(71) Applicant: Solaredge Technologies Ltd., Herzeliya (IL)

(72) Inventors: Ilan Yoscovich, Givatayim (IL); Guy Sella, Bitan Aharon (IL); Meir Gazit, Ashkelon (IL); Yoav Galin, Raanana (IL); David Braginsky, Yokne'am (IL); Lior Handelsman, Givatayim (IL); Meir Adest, Modiin (IL); Yakir Loewenstern, Ariel (IL); Tzachi Glovinsky, Petah Tikva (IL); Nadav Berkovitch, Petah Tikva (IL); Ron Neuman, Ramat Hasharon (IL); Amir Fishelov, Tel Aviv (IL)

(73) Assignee: Solaredge Technologies Ltd., Herzeliya (IL)

( * ) Notice: Subject to any disclaimer, the term of this patent is extended or adjusted under 35 U.S.C. 154(b) by 0 days.

(21) Appl. No.: 17/939,078

(22) Filed: Sep. 7, 2022

(65) Prior Publication Data
US 2023/0006434 A1 Jan. 5, 2023

Related U.S. Application Data

(63) Continuation of application No. 17/344,436, filed on Jun. 10, 2021, now Pat. No. 11,489,330, which is a
(Continued)

(30) Foreign Application Priority Data
Nov. 9, 2010 (GB) ...................................... 1018872

(51) Int. Cl.
H02J 3/38 (2006.01)
H02H 1/00 (2006.01)
(Continued)

(52) U.S. Cl.
CPC ............ *H02H 1/0015* (2013.01); *H02H 3/20* (2013.01); *H02H 7/20* (2013.01); *H02J 3/38* (2013.01);
(Continued)

(58) Field of Classification Search
CPC ...... H01L 31/042; H02H 1/0015; H02H 3/08; H02H 3/20; H02H 7/20; H02J 3/38;
(Continued)

(56) References Cited

U.S. PATENT DOCUMENTS 2,367,925 A 1/1945 Brown
2,586,804 A 2/1952 Fluke
(Continued)

FOREIGN PATENT DOCUMENTS

AU 2073800 A 9/2000
AU 2005262278 A1 1/2006
(Continued)

OTHER PUBLICATIONS

International Search Report for corresponding PCT/GB2004/001965, completed Aug. 16, 2004 by A. Roider.
(Continued)

*Primary Examiner* — Levi Gannon
(74) *Attorney, Agent, or Firm* — Banner & Witcoff, Ltd.

(57) ABSTRACT

Methods for arc detection in a system including one or more photovoltaic generators, one or more photovoltaic power devices and a system power device and/or a load connectible to the photovoltaic generators and/or the photovoltaic power devices. The methods may measure voltage, current, and/or power delivered to the load or system power device, and the methods may measure voltage noise or current noise within the photovoltaic system. The methods may periodically, and/or in response to detecting noise, reduce an electrical parameter such as current or voltage in order to extinguish
(Continued)

an arc. The methods may compare one or more measurements to one or more thresholds to detect arcing, and upon a comparison indicating that arcing is or was present, an alarm condition may be set.

20 Claims, 22 Drawing Sheets

Related U.S. Application Data continuation of application No. 16/856,683, filed on Apr. 23, 2020, now Pat. No. 11,070,051, which is a continuation of application No. 15/819,903, filed on Nov. 21, 2017, now Pat. No. 10,673,229, which is a continuation-in-part of application No. 15/407,881, filed on Jan. 17, 2017, now Pat. No. 10,673,222, which is a continuation-in-part of application No. 15/250,068, filed on Aug. 29, 2016, now Pat. No. 10,230,310, said application No. 15/407,881 is a continuation-in-part of application No. 13/290,528, filed on Nov. 7, 2011, now Pat. No. 9,647,442.

(60) Provisional application No. 62/395,461, filed on Sep. 16, 2016, provisional application No. 62/341,147, filed on May 25, 2016, provisional application No. 62/318,303, filed on Apr. 5, 2016.

(51) Int. Cl.
H02H 3/20 (2006.01)
H02H 7/20 (2006.01)
H02S 50/00 (2014.01)
H02S 50/10 (2014.01)

(52) U.S. Cl.
CPC .......... *H02S 50/00* (2013.01); *H02S 50/10* (2014.12); *H02J 3/381* (2013.01); *H02J 2300/24* (2020.01); *Y02E 10/56* (2013.01)

(58) Field of Classification Search
CPC .... H02J 3/381; H02J 2300/22; H02J 2300/24; H02J 2300/26; H02S 50/00; H02S 50/10; Y02E 10/56
See application file for complete search history.

(56) References Cited

U.S. PATENT DOCUMENTS

| | | |
|---|---|---|
| 2,758,219 A | 8/1956 | Miller |
| 2,852,721 A | 9/1958 | Harders et al. |
| 2,958,171 A | 11/1960 | Deckers |
| 3,369,210 A | 2/1968 | Manickella |
| 3,380,035 A | 4/1968 | Hecker |
| 3,392,326 A | 7/1968 | Lamberton |
| 3,496,029 A | 2/1970 | King et al. |
| 3,566,143 A | 2/1971 | Paine et al. |
| 3,569,784 A | 3/1971 | Carroll et al. |
| 3,643,564 A | 2/1972 | Uchiyama |
| 3,696,286 A | 10/1972 | Ule |
| 3,740,652 A | 6/1973 | Burgener |
| 3,958,136 A | 5/1976 | Schroeder |
| 3,982,105 A | 9/1976 | Eberle |
| 4,060,757 A | 11/1977 | McMurray |
| 4,101,816 A | 7/1978 | Shepter |
| 4,104,687 A | 8/1978 | Zulaski |
| 4,127,797 A | 11/1978 | Perper |
| 4,129,788 A | 12/1978 | Chavannes |
| 4,129,823 A | 12/1978 | van der Pool et al. |
| 4,146,785 A | 3/1979 | Neale |
| 4,161,771 A | 7/1979 | Bates |
| 4,171,861 A | 10/1979 | Hohorst |
| 4,183,079 A | 1/1980 | Wachi |
| 4,253,764 A | 3/1981 | Morrill |
| 4,257,087 A | 3/1981 | Cuk |
| 4,296,461 A | 10/1981 | Mallory et al. |
| 4,321,581 A | 3/1982 | Tappeiner et al. |
| 4,324,225 A | 4/1982 | Trihey |
| 4,327,318 A | 4/1982 | Kwon et al. |
| 4,346,341 A | 8/1982 | Blackburn et al. |
| 4,363,040 A | 12/1982 | Inose |
| 4,367,557 A | 1/1983 | Stern et al. |
| 4,375,662 A | 3/1983 | Baker |
| 4,384,321 A | 5/1983 | Rippel |
| 4,404,472 A | 9/1983 | Steigerwald |
| 4,412,142 A | 10/1983 | Ragonese et al. |
| 4,452,867 A | 6/1984 | Conforti |
| 4,453,207 A | 6/1984 | Paul |
| 4,460,232 A | 7/1984 | Sotolongo |
| 4,470,213 A | 9/1984 | Thompson |
| 4,479,175 A | 10/1984 | Gille et al. |
| 4,481,654 A | 11/1984 | Daniels et al. |
| 4,488,136 A | 12/1984 | Hansen et al. |
| 4,526,553 A | 7/1985 | Guerrero |
| 4,533,986 A | 8/1985 | Jones |
| 4,545,997 A | 10/1985 | Wong et al. |
| 4,549,254 A | 10/1985 | Kissel |
| 4,554,502 A | 11/1985 | Rohatyn |
| 4,554,515 A | 11/1985 | Burson et al. |
| 4,580,090 A | 4/1986 | Bailey et al. |
| 4,591,965 A | 5/1986 | Dickerson |
| 4,598,330 A | 7/1986 | Woodworth |
| 4,602,322 A | 7/1986 | Merrick |
| 4,604,567 A | 8/1986 | Chetty |
| 4,611,090 A | 9/1986 | Catella et al. |
| 4,623,753 A | 11/1986 | Feldman et al. |
| 4,626,983 A | 12/1986 | Harada et al. |
| 4,631,565 A | 12/1986 | Tihanyi |
| 4,637,677 A | 1/1987 | Barkus |
| 4,639,844 A | 1/1987 | Gallios et al. |
| 4,641,042 A | 2/1987 | Miyazawa |
| 4,641,079 A | 2/1987 | Kato et al. |
| 4,644,458 A | 2/1987 | Harafuji et al. |
| 4,649,334 A | 3/1987 | Nakajima |
| 4,652,770 A | 3/1987 | Kumano |
| 4,683,529 A | 7/1987 | Bucher, II |
| 4,685,040 A | 8/1987 | Steigerwald et al. |
| 4,686,617 A | 8/1987 | Colton |
| 4,706,181 A | 11/1987 | Mercer |
| 4,719,553 A | 1/1988 | Hinckley |
| 4,720,667 A | 1/1988 | Lee et al. |
| 4,720,668 A | 1/1988 | Lee et al. |
| 4,736,151 A | 4/1988 | Dishner |
| 4,746,879 A | 5/1988 | Ma et al. |
| 4,772,994 A | 9/1988 | Harada et al. |
| 4,783,728 A | 11/1988 | Hoffman |
| 4,797,803 A | 1/1989 | Carroll |
| 4,819,121 A | 4/1989 | Saito et al. |
| RE33,057 E | 9/1989 | Clegg et al. |
| 4,864,213 A | 9/1989 | Kido |
| 4,868,379 A | 9/1989 | West |
| 4,873,480 A | 10/1989 | Lafferty |
| 4,888,063 A | 12/1989 | Powell |
| 4,888,702 A | 12/1989 | Gerken et al. |
| 4,899,246 A | 2/1990 | Tripodi |
| 4,899,269 A | 2/1990 | Rouzies |
| 4,903,851 A | 2/1990 | Slough |
| 4,906,859 A | 3/1990 | Kobayashi et al. |
| 4,910,518 A | 3/1990 | Kim et al. |
| 4,951,117 A | 8/1990 | Kasai |
| 4,978,870 A | 12/1990 | Chen et al. |
| 4,987,360 A | 1/1991 | Thompson |
| 5,001,415 A | 3/1991 | Watkinson |
| 5,027,051 A | 6/1991 | Lafferty |
| 5,027,059 A | 6/1991 | de Montgolfier et al. |
| 5,041,739 A | 8/1991 | Goto |
| 5,045,988 A | 9/1991 | Gritter et al. |
| 5,054,023 A | 10/1991 | Kronberg |
| 5,081,558 A | 1/1992 | Mahler |
| 5,097,196 A | 3/1992 | Schoneman |
| 5,138,422 A | 8/1992 | Fujii et al. |
| 5,143,556 A | 9/1992 | Matlin |

(56) References Cited

U.S. PATENT DOCUMENTS

| | | |
|---|---|---|
| 5,144,222 A | 9/1992 | Herbert |
| 5,155,670 A | 10/1992 | Brian |
| 5,191,519 A | 3/1993 | Kawakami |
| 5,196,781 A | 3/1993 | Jamieson et al. |
| 5,210,519 A | 5/1993 | Moore |
| 5,235,266 A | 8/1993 | Schaffrin |
| 5,237,194 A | 8/1993 | Takahashi |
| 5,268,832 A | 12/1993 | Kandatsu |
| 5,280,133 A | 1/1994 | Nath |
| 5,280,232 A | 1/1994 | Kohl et al. |
| 5,287,261 A | 2/1994 | Ehsani |
| 5,289,361 A | 2/1994 | Vinciarelli |
| 5,289,998 A | 3/1994 | Bingley et al. |
| 5,327,071 A | 7/1994 | Frederick et al. |
| 5,329,222 A | 7/1994 | Gyugyi et al. |
| 5,345,375 A | 9/1994 | Mohan |
| 5,379,209 A | 1/1995 | Goff |
| 5,381,327 A | 1/1995 | Yan |
| 5,391,235 A | 2/1995 | Inoue |
| 5,402,060 A | 3/1995 | Erisman |
| 5,404,059 A | 4/1995 | Loffler |
| 5,412,558 A | 5/1995 | Sakurai et al. |
| 5,413,313 A | 5/1995 | Mutterlein et al. |
| 5,428,286 A | 6/1995 | Kha |
| 5,446,645 A | 8/1995 | Shirahama et al. |
| 5,460,546 A | 10/1995 | Kunishi et al. |
| 5,472,614 A | 12/1995 | Rossi |
| 5,475,296 A | 12/1995 | Vinsant et al. |
| 5,477,091 A | 12/1995 | Fiorina et al. |
| 5,493,154 A | 2/1996 | Smith et al. |
| 5,497,289 A | 3/1996 | Sugishima et al. |
| 5,501,083 A | 3/1996 | Kim |
| 5,504,415 A | 4/1996 | Podrazhansky et al. |
| 5,504,418 A | 4/1996 | Ashley |
| 5,504,449 A | 4/1996 | Prentice |
| 5,513,075 A | 4/1996 | Capper et al. |
| 5,517,378 A | 5/1996 | Asplund et al. |
| 5,530,335 A | 6/1996 | Decker et al. |
| 5,539,238 A | 7/1996 | Malhi |
| 5,548,504 A | 8/1996 | Takehara |
| 5,563,780 A | 10/1996 | Goad |
| 5,565,855 A | 10/1996 | Knibbe |
| 5,566,022 A | 10/1996 | Segev |
| 5,576,941 A | 11/1996 | Nguyen et al. |
| 5,580,395 A | 12/1996 | Yoshioka et al. |
| 5,585,749 A | 12/1996 | Pace et al. |
| 5,604,430 A | 2/1997 | Decker et al. |
| 5,616,913 A | 4/1997 | Litterst |
| 5,625,539 A | 4/1997 | Nakata et al. |
| 5,631,534 A | 5/1997 | Lewis |
| 5,636,107 A | 6/1997 | Lu et al. |
| 5,644,212 A | 7/1997 | Takahashi |
| 5,644,219 A | 7/1997 | Kurokawa |
| 5,646,501 A | 7/1997 | Fishman et al. |
| 5,648,731 A | 7/1997 | Decker et al. |
| 5,654,740 A | 8/1997 | Schulha |
| 5,659,465 A | 8/1997 | Flack et al. |
| 5,677,833 A | 10/1997 | Bingley |
| 5,684,385 A | 11/1997 | Guyonneau et al. |
| 5,686,766 A | 11/1997 | Tamechika |
| 5,696,439 A | 12/1997 | Presti et al. |
| 5,703,390 A | 12/1997 | Itoh |
| 5,708,576 A | 1/1998 | Jones et al. |
| 5,719,758 A | 2/1998 | Nakata et al. |
| 5,722,057 A | 2/1998 | Wu |
| 5,726,505 A | 3/1998 | Yamada et al. |
| 5,726,615 A | 3/1998 | Bloom |
| 5,731,603 A | 3/1998 | Nakagawa et al. |
| 5,734,258 A | 3/1998 | Esser |
| 5,734,259 A | 3/1998 | Sisson et al. |
| 5,734,565 A | 3/1998 | Mueller et al. |
| 5,747,967 A | 5/1998 | Muljadi et al. |
| 5,751,120 A | 5/1998 | Zeitler et al. |
| 5,773,963 A | 6/1998 | Blanc et al. |
| 5,777,515 A | 7/1998 | Kimura |
| 5,777,858 A | 7/1998 | Rodulfo |
| 5,780,092 A | 7/1998 | Agbo et al. |
| 5,793,184 A | 8/1998 | O'Connor |
| 5,798,631 A | 8/1998 | Spee et al. |
| 5,801,519 A | 9/1998 | Midya et al. |
| 5,804,894 A | 9/1998 | Leeson et al. |
| 5,812,045 A | 9/1998 | Ishikawa et al. |
| 5,814,970 A | 9/1998 | Schmidt |
| 5,821,734 A | 10/1998 | Faulk |
| 5,822,186 A | 10/1998 | Bull et al. |
| 5,838,148 A | 11/1998 | Kurokami et al. |
| 5,847,549 A | 12/1998 | Dodson, III |
| 5,859,772 A | 1/1999 | Hilpert |
| 5,869,956 A | 2/1999 | Nagao et al. |
| 5,873,738 A | 2/1999 | Shimada et al. |
| 5,886,882 A | 3/1999 | Rodulfo |
| 5,886,890 A | 3/1999 | Ishida et al. |
| 5,892,354 A | 4/1999 | Nagao et al. |
| 5,898,585 A | 4/1999 | Sirichote et al. |
| 5,903,138 A | 5/1999 | Hwang et al. |
| 5,905,645 A | 5/1999 | Cross |
| 5,917,722 A | 6/1999 | Singh |
| 5,919,314 A | 7/1999 | Kim |
| 5,923,100 A | 7/1999 | Lukens et al. |
| 5,923,158 A | 7/1999 | Kurokami et al. |
| 5,929,614 A | 7/1999 | Copple |
| 5,930,128 A | 7/1999 | Dent |
| 5,930,131 A | 7/1999 | Feng |
| 5,932,994 A | 8/1999 | Jo et al. |
| 5,933,327 A | 8/1999 | Leighton et al. |
| 5,945,806 A | 8/1999 | Faulk |
| 5,946,206 A | 8/1999 | Shimizu et al. |
| 5,949,668 A | 9/1999 | Schweighofer |
| 5,955,885 A | 9/1999 | Kurokami et al. |
| 5,959,438 A | 9/1999 | Jovanovic et al. |
| 5,961,739 A | 10/1999 | Osborne |
| 5,963,010 A | 10/1999 | Hayashi et al. |
| 5,963,078 A | 10/1999 | Wallace |
| 5,982,253 A | 11/1999 | Perrin et al. |
| 5,986,909 A | 11/1999 | Hammond et al. |
| 5,990,659 A | 11/1999 | Frannhagen |
| 6,002,290 A | 12/1999 | Avery et al. |
| 6,002,603 A | 12/1999 | Carver |
| 6,008,971 A | 12/1999 | Duba et al. |
| 6,021,052 A | 2/2000 | Unger et al. |
| 6,031,736 A | 2/2000 | Takehara et al. |
| 6,037,720 A | 3/2000 | Wong et al. |
| 6,038,148 A | 3/2000 | Farrington et al. |
| 6,046,470 A | 4/2000 | Williams et al. |
| 6,046,919 A | 4/2000 | Madenokouji et al. |
| 6,050,779 A | 4/2000 | Nagao et al. |
| 6,058,035 A | 5/2000 | Madenokouji et al. |
| 6,064,086 A | 5/2000 | Nakagawa et al. |
| 6,078,511 A | 6/2000 | Fasullo et al. |
| 6,081,104 A | 6/2000 | Kern |
| 6,082,122 A | 7/2000 | Madenokouji et al. |
| 6,087,738 A | 7/2000 | Hammond |
| 6,091,329 A | 7/2000 | Newman |
| 6,093,885 A | 7/2000 | Takehara et al. |
| 6,094,129 A | 7/2000 | Baiatu |
| 6,101,073 A | 8/2000 | Takehara |
| 6,105,317 A | 8/2000 | Tomiuchi et al. |
| 6,111,188 A | 8/2000 | Kurokami et al. |
| 6,111,391 A | 8/2000 | Cullen |
| 6,111,767 A | 8/2000 | Handleman |
| 6,127,801 A | 10/2000 | Manor |
| 6,130,458 A | 10/2000 | Takagi et al. |
| 6,150,739 A | 11/2000 | Baumgartl et al. |
| 6,151,234 A | 11/2000 | Oldenkamp |
| 6,163,086 A | 12/2000 | Choo |
| 6,166,455 A | 12/2000 | Li |
| 6,166,527 A | 12/2000 | Dwelley et al. |
| 6,169,678 B1 | 1/2001 | Kondo et al. |
| 6,175,219 B1 | 1/2001 | Imamura et al. |
| 6,175,512 B1 | 1/2001 | Hagihara et al. |
| 6,191,456 B1 | 2/2001 | Stoisiek et al. |
| 6,191,498 B1 | 2/2001 | Chang |
| 6,215,286 B1 | 4/2001 | Scoones et al. |
| 6,219,623 B1 | 4/2001 | Wills |

(56) References Cited

U.S. PATENT DOCUMENTS

| | | |
|---|---|---|
| 6,222,351 B1 | 4/2001 | Fontanella et al. |
| 6,225,793 B1 | 5/2001 | Dickmann |
| 6,255,360 B1 | 7/2001 | Domschke et al. |
| 6,255,804 B1 | 7/2001 | Herniter et al. |
| 6,256,234 B1 | 7/2001 | Keeth et al. |
| 6,259,234 B1 | 7/2001 | Perol |
| 6,262,558 B1 | 7/2001 | Weinberg |
| 6,268,559 B1 | 7/2001 | Yamawaki |
| 6,274,804 B1 | 8/2001 | Psyk et al. |
| 6,275,016 B1 | 8/2001 | Ivanov |
| 6,281,485 B1 | 8/2001 | Siri |
| 6,285,572 B1 | 9/2001 | Onizuka et al. |
| 6,291,764 B1 | 9/2001 | Ishida et al. |
| 6,292,379 B1 | 9/2001 | Edevold et al. |
| 6,297,621 B1 | 10/2001 | Hui et al. |
| 6,301,128 B1 | 10/2001 | Jang et al. |
| 6,304,065 B1 | 10/2001 | Wittenbreder |
| 6,307,749 B1 | 10/2001 | Daanen et al. |
| 6,311,137 B1 | 10/2001 | Kurokami et al. |
| 6,316,716 B1 | 11/2001 | Hilgrath |
| 6,320,769 B2 | 11/2001 | Kurokami et al. |
| 6,329,808 B1 | 12/2001 | Enguent |
| 6,331,670 B2 | 12/2001 | Takehara et al. |
| 6,339,538 B1 | 1/2002 | Handleman |
| 6,344,612 B1 | 2/2002 | Kuwahara et al. |
| 6,346,451 B1 | 2/2002 | Simpson et al. |
| 6,348,781 B1 | 2/2002 | Midya et al. |
| 6,350,944 B1 | 2/2002 | Sherif et al. |
| 6,351,130 B1 | 2/2002 | Preiser et al. |
| 6,369,461 B1 | 4/2002 | Jungreis et al. |
| 6,369,462 B1 | 4/2002 | Siri |
| 6,380,719 B2 | 4/2002 | Underwood et al. |
| 6,396,170 B1 | 5/2002 | Laufenberg et al. |
| 6,396,239 B1 | 5/2002 | Benn et al. |
| 6,400,579 B2 | 6/2002 | Cuk |
| 6,425,248 B1 | 7/2002 | Tonomura et al. |
| 6,429,546 B1 | 8/2002 | Ropp et al. |
| 6,429,621 B1 | 8/2002 | Arai |
| 6,433,522 B1 | 8/2002 | Siri |
| 6,433,978 B1 | 8/2002 | Neiger et al. |
| 6,441,597 B1 | 8/2002 | Lethellier |
| 6,445,599 B1 | 9/2002 | Nguyen |
| 6,448,489 B2 | 9/2002 | Kimura et al. |
| 6,452,362 B1 | 9/2002 | Choo |
| 6,452,814 B1 | 9/2002 | Wittenbreder |
| 6,465,910 B2 | 10/2002 | Young et al. |
| 6,465,931 B2 | 10/2002 | Knowles et al. |
| 6,469,919 B1 | 10/2002 | Bennett |
| 6,472,254 B2 | 10/2002 | Cantarini et al. |
| 6,479,963 B1 | 11/2002 | Manor et al. |
| 6,483,203 B1 | 11/2002 | McCormack |
| 6,493,246 B2 | 12/2002 | Suzui et al. |
| 6,501,362 B1 | 12/2002 | Hoffman et al. |
| 6,507,176 B2 | 1/2003 | Wittenbreder, Jr. |
| 6,509,712 B1 | 1/2003 | Landis |
| 6,512,444 B1 | 1/2003 | Morris, Jr. et al. |
| 6,515,215 B1 | 2/2003 | Mimura |
| 6,515,217 B1 | 2/2003 | Aylaian |
| 6,519,165 B2 | 2/2003 | Koike |
| 6,528,977 B2 | 3/2003 | Arakawa |
| 6,531,848 B1 | 3/2003 | Chitsazan et al. |
| 6,545,211 B1 | 4/2003 | Mimura |
| 6,548,205 B2 | 4/2003 | Leung et al. |
| 6,560,131 B1 | 5/2003 | vonBrethorst |
| 6,587,051 B2 | 7/2003 | Takehara et al. |
| 6,590,793 B1 | 7/2003 | Nagao et al. |
| 6,590,794 B1 | 7/2003 | Carter |
| 6,593,520 B2 | 7/2003 | Kondo et al. |
| 6,593,521 B2 | 7/2003 | Kobayashi |
| 6,600,100 B2 | 7/2003 | Ho et al. |
| 6,603,672 B1 | 8/2003 | Deng et al. |
| 6,608,468 B2 | 8/2003 | Nagase |
| 6,611,130 B2 | 8/2003 | Chang |
| 6,611,441 B2 | 8/2003 | Kurokami et al. |
| 6,628,011 B2 | 9/2003 | Droppo et al. |
| 6,633,824 B2 | 10/2003 | Dollar, II |
| 6,636,431 B2 | 10/2003 | Seki et al. |
| 6,650,031 B1 | 11/2003 | Goldack |
| 6,650,560 B2 | 11/2003 | MacDonald et al. |
| 6,653,549 B2 | 11/2003 | Matsushita et al. |
| 6,655,987 B2 | 12/2003 | Higashikozono et al. |
| 6,657,419 B2 | 12/2003 | Renyolds |
| 6,664,762 B2 | 12/2003 | Kutkut |
| 6,672,018 B2 | 1/2004 | Shingleton |
| 6,678,174 B2 | 1/2004 | Suzui et al. |
| 6,690,590 B2 | 2/2004 | Stamenic et al. |
| 6,693,327 B2 | 2/2004 | Priefert et al. |
| 6,693,781 B1 | 2/2004 | Kroker |
| 6,708,507 B1 | 3/2004 | Sem et al. |
| 6,709,291 B1 | 3/2004 | Wallace et al. |
| 6,724,593 B1 | 4/2004 | Smith |
| 6,731,136 B2 | 5/2004 | Knee |
| 6,738,692 B2 | 5/2004 | Schienbein et al. |
| 6,744,643 B2 | 6/2004 | Luo et al. |
| 6,750,391 B2 | 6/2004 | Bower et al. |
| 6,765,315 B2 | 7/2004 | Hammerstrom et al. |
| 6,768,047 B2 | 7/2004 | Chang et al. |
| 6,768,180 B2 | 7/2004 | Salama et al. |
| 6,788,033 B2 | 9/2004 | Vinciarelli |
| 6,788,146 B2 | 9/2004 | Forejt et al. |
| 6,795,318 B2 | 9/2004 | Haas et al. |
| 6,800,964 B2 | 10/2004 | Beck |
| 6,801,442 B2 | 10/2004 | Suzui et al. |
| 6,807,069 B2 | 10/2004 | Nieminen et al. |
| 6,809,942 B2 | 10/2004 | Madenokouji et al. |
| 6,810,339 B2 | 10/2004 | Wills |
| 6,812,396 B2 | 11/2004 | Makita et al. |
| 6,828,503 B2 | 12/2004 | Yoshikawa et al. |
| 6,828,901 B2 | 12/2004 | Birchfield et al. |
| 6,835,491 B2 | 12/2004 | Gartstein et al. |
| 6,837,739 B2 | 1/2005 | Gorringe et al. |
| 6,838,611 B2 | 1/2005 | Kondo et al. |
| 6,838,856 B2 | 1/2005 | Raichle |
| 6,842,354 B1 | 1/2005 | Tallam et al. |
| 6,844,739 B2 | 1/2005 | Kasai et al. |
| 6,850,074 B2 | 2/2005 | Adams et al. |
| 6,856,102 B1 | 2/2005 | Lin et al. |
| 6,882,131 B1 | 4/2005 | Takada et al. |
| 6,888,728 B2 | 5/2005 | Takagi et al. |
| 6,894,911 B2 | 5/2005 | Telefus et al. |
| 6,897,370 B2 | 5/2005 | Kondo et al. |
| 6,914,418 B2 | 7/2005 | Sung |
| 6,919,714 B2 | 7/2005 | Delepaut |
| 6,927,955 B2 | 8/2005 | Suzui et al. |
| 6,933,627 B2 | 8/2005 | Wilhelm |
| 6,933,714 B2 | 8/2005 | Fasshauer et al. |
| 6,936,995 B2 | 8/2005 | Kapsokavathis et al. |
| 6,940,735 B2 | 9/2005 | Deng et al. |
| 6,949,843 B2 | 9/2005 | Dubovsky |
| 6,950,323 B2 | 9/2005 | Achleitner et al. |
| 6,963,147 B2 | 11/2005 | Kurokami et al. |
| 6,966,184 B2 | 11/2005 | Toyomura et al. |
| 6,970,365 B2 | 11/2005 | Turchi |
| 6,980,783 B2 | 12/2005 | Liu et al. |
| 6,984,967 B2 | 1/2006 | Notman |
| 6,984,970 B2 | 1/2006 | Capel |
| 6,985,967 B1 | 1/2006 | Hipp |
| 6,987,444 B2 | 1/2006 | Bub et al. |
| 6,996,741 B1 | 2/2006 | Pittelkow et al. |
| 7,030,597 B2 | 4/2006 | Bruno et al. |
| 7,031,176 B2 | 4/2006 | Kotsopoulos et al. |
| 7,038,430 B2 | 5/2006 | Itabashi et al. |
| 7,039,941 B1 | 5/2006 | Caporizzo et al. |
| 7,042,195 B2 | 5/2006 | Tsunetsugu et al. |
| 7,045,991 B2 | 5/2006 | Nakamura et al. |
| 7,046,531 B2 | 5/2006 | Zocchi et al. |
| 7,053,506 B2 | 5/2006 | Alonso et al. |
| 7,061,211 B2 | 6/2006 | Satoh et al. |
| 7,061,214 B2 | 6/2006 | Mayega et al. |
| 7,064,967 B2 | 6/2006 | Ichinose et al. |
| 7,068,017 B2 | 6/2006 | Willner et al. |
| 7,072,194 B2 | 7/2006 | Nayar et al. |
| 7,078,883 B2 | 7/2006 | Chapman et al. |
| 7,079,406 B2 | 7/2006 | Kurokami et al. |

(56) References Cited

U.S. PATENT DOCUMENTS

| | | |
|---|---|---|
| 7,087,332 B2 | 8/2006 | Harris |
| 7,088,595 B2 | 8/2006 | Nino |
| 7,089,780 B2 | 8/2006 | Sunshine et al. |
| 7,090,509 B1 | 8/2006 | Gilliland et al. |
| 7,091,707 B2 | 8/2006 | Cutler |
| 7,097,516 B2 | 8/2006 | Werner et al. |
| 7,099,169 B2 | 8/2006 | West et al. |
| 7,126,053 B2 | 10/2006 | Kurokami et al. |
| 7,126,294 B2 | 10/2006 | Minami et al. |
| 7,138,786 B2 | 11/2006 | Ishigaki et al. |
| 7,142,997 B1 | 11/2006 | Widner |
| 7,148,669 B2 | 12/2006 | Maksimovic et al. |
| 7,150,938 B2 | 12/2006 | Munshi et al. |
| 7,157,888 B2 | 1/2007 | Chen et al. |
| 7,158,359 B2 | 1/2007 | Bertele et al. |
| 7,158,395 B2 | 1/2007 | Deng et al. |
| 7,161,082 B2 | 1/2007 | Matsushita et al. |
| 7,174,973 B1 | 2/2007 | Lysaght |
| 7,176,667 B2 | 2/2007 | Chen et al. |
| 7,183,667 B2 | 2/2007 | Colby et al. |
| 7,193,872 B2 | 3/2007 | Siri |
| 7,202,653 B2 | 4/2007 | Pai |
| 7,208,674 B2 | 4/2007 | Aylaian |
| 7,218,541 B2 | 5/2007 | Price et al. |
| 7,248,946 B2 | 7/2007 | Bashaw et al. |
| 7,256,566 B2 | 8/2007 | Bhavaraju et al. |
| 7,259,474 B2 | 8/2007 | Blanc |
| 7,262,979 B2 | 8/2007 | Wai et al. |
| 7,276,886 B2 | 10/2007 | Kinder et al. |
| 7,277,304 B2 | 10/2007 | Stancu et al. |
| 7,281,141 B2 | 10/2007 | Elkayam et al. |
| 7,282,814 B2 | 10/2007 | Jacobs |
| 7,282,924 B1 | 10/2007 | Wittner |
| 7,291,036 B1 | 11/2007 | Daily et al. |
| 7,298,113 B2 | 11/2007 | Orikasa |
| RE39,976 E | 1/2008 | Schiff et al. |
| 7,315,052 B2 | 1/2008 | Alter |
| 7,319,313 B2 | 1/2008 | Dickerson et al. |
| 7,324,361 B2 | 1/2008 | Siri |
| 7,336,004 B2 | 2/2008 | Lai |
| 7,336,056 B1 | 2/2008 | Dening |
| 7,339,287 B2 | 3/2008 | Jepsen et al. |
| 7,348,802 B2 | 3/2008 | Kasanyal et al. |
| 7,352,154 B2 | 4/2008 | Cook |
| 7,361,952 B2 | 4/2008 | Miura et al. |
| 7,371,963 B2 | 5/2008 | Suenaga et al. |
| 7,372,712 B2 | 5/2008 | Stancu et al. |
| 7,385,380 B2 | 6/2008 | Ishigaki et al. |
| 7,385,833 B2 | 6/2008 | Keung |
| 7,388,348 B2 | 6/2008 | Mattichak |
| 7,391,190 B1 | 6/2008 | Rajagopalan |
| 7,394,237 B2 | 7/2008 | Chou et al. |
| 7,405,117 B2 | 7/2008 | Zuniga et al. |
| 7,414,870 B2 | 8/2008 | Rottger et al. |
| 7,420,354 B2 | 9/2008 | Cutler |
| 7,420,815 B2 | 9/2008 | Love |
| 7,432,691 B2 | 10/2008 | Cutler |
| 7,435,134 B2 | 10/2008 | Lenox |
| 7,435,897 B2 | 10/2008 | Russell |
| 7,443,052 B2 | 10/2008 | Wendt et al. |
| 7,443,152 B2 | 10/2008 | Utsunomiya |
| 7,450,401 B2 | 11/2008 | Iida |
| 7,456,510 B2 | 11/2008 | Ito et al. |
| 7,456,523 B2 | 11/2008 | Kobayashi |
| 7,463,500 B2 | 12/2008 | West |
| 7,466,566 B2 | 12/2008 | Fukumoto |
| 7,471,014 B2 | 12/2008 | Lum et al. |
| 7,471,524 B1 | 12/2008 | Batarseh et al. |
| 7,479,774 B2 | 1/2009 | Wai et al. |
| 7,482,238 B2 | 1/2009 | Sung |
| 7,485,987 B2 | 2/2009 | Mori et al. |
| 7,495,419 B1 | 2/2009 | Ju |
| 7,504,811 B2 | 3/2009 | Watanabe et al. |
| 7,518,346 B2 | 4/2009 | Prexl et al. |
| 7,538,451 B2 | 5/2009 | Nomoto |
| 7,560,915 B2 | 7/2009 | Ito et al. |
| 7,589,437 B2 | 9/2009 | Henne et al. |
| 7,595,616 B2 | 9/2009 | Prexl et al. |
| 7,596,008 B2 | 9/2009 | Iwata et al. |
| 7,599,200 B2 | 10/2009 | Tomonaga |
| 7,600,349 B2 | 10/2009 | Liebendorfer |
| 7,602,080 B1 | 10/2009 | Hadar et al. |
| 7,602,626 B2 | 10/2009 | Iwata et al. |
| 7,605,498 B2 | 10/2009 | Ledenev et al. |
| 7,612,283 B2 | 11/2009 | Toyomura et al. |
| 7,615,981 B2 | 11/2009 | Wong et al. |
| 7,626,834 B2 | 12/2009 | Chisenga et al. |
| 7,634,667 B2 | 12/2009 | Weaver et al. |
| 7,646,116 B2 | 1/2010 | Batarseh et al. |
| 7,649,434 B2 | 1/2010 | Xu et al. |
| 7,659,701 B1 | 2/2010 | Metsker et al. |
| 7,701,083 B2 | 4/2010 | Savage |
| 7,709,727 B2 | 5/2010 | Roehrig et al. |
| 7,719,140 B2 | 5/2010 | Ledenev et al. |
| 7,723,865 B2 | 5/2010 | Kitanaka |
| 7,733,069 B2 | 6/2010 | Toyomura et al. |
| 7,748,175 B2 | 7/2010 | Liebendorfer |
| 7,759,575 B2 | 7/2010 | Jones et al. |
| 7,763,807 B2 | 7/2010 | Richter |
| 7,772,716 B2 | 8/2010 | Shaver, II et al. |
| 7,777,570 B2 | 8/2010 | Lai |
| 7,780,472 B2 | 8/2010 | Lenox |
| 7,782,031 B2 | 8/2010 | Qiu et al. |
| 7,783,389 B2 | 8/2010 | Yamada et al. |
| 7,787,273 B2 | 8/2010 | Lu et al. |
| 7,804,282 B2 | 9/2010 | Bertele |
| 7,807,919 B2 | 10/2010 | Powell et al. |
| 7,808,125 B1 | 10/2010 | Sachdeva et al. |
| 7,812,592 B2 | 10/2010 | Prior et al. |
| 7,812,701 B2 | 10/2010 | Lee et al. |
| 7,821,225 B2 | 10/2010 | Chou et al. |
| 7,824,189 B1 | 11/2010 | Lauermann et al. |
| 7,839,022 B2 | 11/2010 | Wolfs |
| 7,843,085 B2 | 11/2010 | Ledenev et al. |
| 7,864,497 B2 | 1/2011 | Quardt et al. |
| 7,868,599 B2 | 1/2011 | Rahman et al. |
| 7,880,334 B2 | 2/2011 | Evans et al. |
| 7,883,808 B2 | 2/2011 | Norimatsu et al. |
| 7,884,278 B2 | 2/2011 | Powell et al. |
| 7,893,346 B2 | 2/2011 | Nachamkin et al. |
| 7,898,112 B2 | 3/2011 | Powell et al. |
| 7,900,361 B2 | 3/2011 | Adest et al. |
| 7,906,007 B2 | 3/2011 | Gibson et al. |
| 7,906,870 B2 | 3/2011 | Ohm |
| 7,919,952 B1 | 4/2011 | Fahrenbruch |
| 7,919,953 B2 | 4/2011 | Porter et al. |
| 7,925,552 B2 | 4/2011 | Tarbell et al. |
| 7,944,191 B2 | 5/2011 | Xu |
| 7,945,413 B2 | 5/2011 | Krein |
| 7,948,221 B2 | 5/2011 | Watanabe et al. |
| 7,952,897 B2 | 5/2011 | Nocentini et al. |
| 7,960,650 B2 | 6/2011 | Richter et al. |
| 7,960,950 B2 | 6/2011 | Glovinsky |
| 7,962,249 B1 | 6/2011 | Zhang et al. |
| 7,969,043 B2 | 6/2011 | Caraghiorghiopol et al. |
| 7,969,133 B2 | 6/2011 | Zhang et al. |
| 7,977,810 B2 | 7/2011 | Choi et al. |
| 8,003,885 B2 | 8/2011 | Richter et al. |
| 8,004,113 B2 | 8/2011 | Sander et al. |
| 8,004,116 B2 | 8/2011 | Ledenev et al. |
| 8,004,117 B2 | 8/2011 | Adest et al. |
| 8,004,237 B2 | 8/2011 | Manor et al. |
| 8,004,866 B2 | 8/2011 | Bucella et al. |
| 8,013,472 B2 | 9/2011 | Adest et al. |
| 8,018,748 B2 | 9/2011 | Leonard |
| 8,035,249 B2 | 10/2011 | Shaver, II et al. |
| 8,039,730 B2 | 10/2011 | Hadar et al. |
| 8,049,363 B2 | 11/2011 | McLean et al. |
| 8,050,804 B2 | 11/2011 | Kernahan |
| 8,058,747 B2 | 11/2011 | Avrutsky et al. |
| 8,058,752 B2 | 11/2011 | Erickson, Jr. et al. |
| 8,067,855 B2 | 11/2011 | Mumtaz et al. |
| 8,077,437 B2 | 12/2011 | Mumtaz et al. |
| 8,080,986 B2 | 12/2011 | Lai et al. |

(56) References Cited

U.S. PATENT DOCUMENTS

| | | | |
|---|---|---|---|
| 8,089,780 B2 | 1/2012 | Mochikawa et al. |
| 8,089,785 B2 | 1/2012 | Rodriguez |
| 8,090,548 B2 | 1/2012 | Abdennadher et al. |
| 8,093,756 B2 | 1/2012 | Porter et al. |
| 8,093,757 B2 | 1/2012 | Wolfs |
| 8,097,818 B2 | 1/2012 | Gerull et al. |
| 8,098,055 B2 | 1/2012 | Avrutsky et al. |
| 8,102,074 B2 | 1/2012 | Hadar et al. |
| 8,102,144 B2 | 1/2012 | Capp et al. |
| 8,111,052 B2 | 2/2012 | Glovinsky |
| 8,116,103 B2 | 2/2012 | Zacharias et al. |
| 8,138,631 B2 | 3/2012 | Allen et al. |
| 8,138,914 B2 | 3/2012 | Wong et al. |
| 8,139,335 B2 | 3/2012 | Quardt et al. |
| 8,139,382 B2 | 3/2012 | Zhang et al. |
| 8,148,849 B2 | 4/2012 | Zanarini et al. |
| 8,158,877 B2 | 4/2012 | Klein et al. |
| 8,169,252 B2 | 5/2012 | Fahrenbruch et al. |
| 8,179,147 B2 | 5/2012 | Dargatz et al. |
| 8,184,460 B2 | 5/2012 | O'Brien et al. |
| 8,188,610 B2 | 5/2012 | Scholte-Wassink |
| 8,204,709 B2 | 6/2012 | Presher, Jr. et al. |
| 8,212,408 B2 | 7/2012 | Fishman |
| 8,212,409 B2 | 7/2012 | Bettenwort et al. |
| 8,232,790 B2 | 7/2012 | Leong et al. |
| 8,233,301 B1 | 7/2012 | Guo |
| 8,248,804 B2 | 8/2012 | Han et al. |
| 8,271,599 B2 | 9/2012 | Eizips et al. |
| 8,274,172 B2 | 9/2012 | Hadar et al. |
| 8,279,644 B2 | 10/2012 | Zhang et al. |
| 8,284,574 B2 | 10/2012 | Chapman et al. |
| 8,289,183 B1 | 10/2012 | Foss |
| 8,289,742 B2 | 10/2012 | Adest et al. |
| 8,294,451 B2 | 10/2012 | Hasenfus |
| 8,299,757 B2 | 10/2012 | Yamauchi et al. |
| 8,299,773 B2 | 10/2012 | Jang et al. |
| 8,304,932 B2 | 11/2012 | Ledenev et al. |
| 8,310,101 B2 | 11/2012 | Amaratunga et al. |
| 8,310,102 B2 | 11/2012 | Raju |
| 8,314,375 B2 | 11/2012 | Arditi et al. |
| 8,319,471 B2 | 11/2012 | Adest et al. |
| 8,324,921 B2 | 12/2012 | Adest et al. |
| 8,325,059 B2 | 12/2012 | Rozenboim |
| 8,344,548 B2 | 1/2013 | Stern |
| 8,355,563 B2 | 1/2013 | Kasahara et al. |
| 8,369,113 B2 | 2/2013 | Rodriguez |
| 8,378,656 B2 | 2/2013 | de Rooij et al. |
| 8,379,418 B2 | 2/2013 | Falk |
| 8,391,031 B2 | 3/2013 | Garrity |
| 8,391,032 B2 | 3/2013 | Garrity et al. |
| 8,395,366 B2 | 3/2013 | Uno |
| 8,405,248 B2 | 3/2013 | Mumtaz et al. |
| 8,405,349 B2 | 3/2013 | Kikinis et al. |
| 8,405,367 B2 | 3/2013 | Chisenga et al. |
| 8,410,359 B2 | 4/2013 | Richter |
| 8,410,889 B2 | 4/2013 | Garrity et al. |
| 8,410,950 B2 | 4/2013 | Takehara et al. |
| 8,415,552 B2 | 4/2013 | Hadar et al. |
| 8,415,937 B2 | 4/2013 | Hester |
| 8,427,009 B2 | 4/2013 | Shaver, II et al. |
| 8,436,592 B2 | 5/2013 | Saitoh |
| 8,461,809 B2 | 6/2013 | Rodriguez |
| 8,466,789 B2 | 6/2013 | Muhlberger et al. |
| 8,472,220 B2 | 6/2013 | Garrity et al. |
| 8,473,250 B2 | 6/2013 | Adest et al. |
| 8,509,032 B2 | 8/2013 | Rakib |
| 8,526,205 B2 | 9/2013 | Garrity |
| 8,531,055 B2 | 9/2013 | Adest et al. |
| 8,542,512 B2 | 9/2013 | Garrity |
| 8,570,017 B2 | 10/2013 | Perichon et al. |
| 8,581,441 B2 | 11/2013 | Rotzoll et al. |
| 8,587,151 B2 | 11/2013 | Adest et al. |
| 8,618,692 B2 | 12/2013 | Adest et al. |
| 8,624,443 B2 | 1/2014 | Mumtaz |
| 8,653,689 B2 | 2/2014 | Rozenboim |
| 8,669,675 B2 | 3/2014 | Capp et al. |
| 8,670,255 B2 | 3/2014 | Gong et al. |
| 8,674,548 B2 | 3/2014 | Mumtaz |
| 8,674,668 B2 | 3/2014 | Chisenga et al. |
| 8,686,333 B2 | 4/2014 | Arditi et al. |
| 8,710,351 B2 | 4/2014 | Robbins |
| 8,751,053 B2 | 6/2014 | Hadar et al. |
| 8,773,236 B2 | 7/2014 | Makhota et al. |
| 8,791,598 B2 | 7/2014 | Jain |
| 8,796,884 B2 | 8/2014 | Naiknaware et al. |
| 8,809,699 B2 | 8/2014 | Funk |
| 8,811,047 B2 | 8/2014 | Rodriguez |
| 8,816,535 B2 | 8/2014 | Adest et al. |
| 8,823,212 B2 | 9/2014 | Garrity et al. |
| 8,823,218 B2 | 9/2014 | Hadar et al. |
| 8,823,342 B2 | 9/2014 | Williams |
| 8,835,748 B2 | 9/2014 | Frolov et al. |
| 8,841,916 B2 | 9/2014 | Avrutsky |
| 8,853,886 B2 | 10/2014 | Avrutsky et al. |
| 8,854,193 B2 | 10/2014 | Makhota et al. |
| 8,859,884 B2 | 10/2014 | Dunton et al. |
| 8,860,241 B2 | 10/2014 | Hadar et al. |
| 8,860,246 B2 | 10/2014 | Hadar et al. |
| 8,878,563 B2 | 11/2014 | Robbins |
| 8,917,156 B2 | 12/2014 | Garrity et al. |
| 8,922,061 B2 | 12/2014 | Arditi |
| 8,933,321 B2 | 1/2015 | Hadar et al. |
| 8,934,269 B2 | 1/2015 | Garrity |
| 8,947,194 B2 | 2/2015 | Sella et al. |
| 8,963,375 B2 | 2/2015 | DeGraaff |
| 8,963,378 B1 | 2/2015 | Fornage et al. |
| 8,963,501 B2 | 2/2015 | Shigemizu et al. |
| 8,963,518 B2 | 2/2015 | Wolfs |
| 8,972,765 B1 | 3/2015 | Krolak et al. |
| 9,010,645 B2 | 4/2015 | Arnouse |
| 9,041,339 B2 | 5/2015 | Adest et al. |
| 9,088,178 B2 | 7/2015 | Adest et al. |
| 9,130,401 B2 | 9/2015 | Adest et al. |
| 9,257,848 B2 | 2/2016 | Coccia et al. |
| 9,291,696 B2 | 3/2016 | Adest et al. |
| 9,362,743 B2 | 6/2016 | Gazit et al. |
| 9,397,497 B2 | 7/2016 | Ledenev |
| 9,401,664 B2 | 7/2016 | Perreault et al. |
| 9,407,161 B2 | 8/2016 | Adest et al. |
| 9,466,737 B2 | 10/2016 | Ledenev |
| 9,577,454 B2 | 2/2017 | Seymour et al. |
| 9,647,442 B2 | 5/2017 | Yoscovich et al. |
| 9,660,527 B2 | 5/2017 | Glovinski |
| 9,673,630 B2 | 6/2017 | Ledenev et al. |
| 9,819,178 B2 | 11/2017 | Gazit et al. |
| 9,831,916 B2 | 11/2017 | Behrends |
| 9,843,193 B2 | 12/2017 | Getsla |
| 9,865,411 B2 | 1/2018 | Friebe et al. |
| 9,869,701 B2 | 1/2018 | Sella et al. |
| 9,923,516 B2 | 3/2018 | Har-Shai et al. |
| 9,991,717 B1 | 6/2018 | Rowe et al. |
| 9,995,796 B1* | 6/2018 | Johnson .................. H02S 50/10 |
| 10,032,939 B2 | 7/2018 | Ledenev et al. |
| 10,256,770 B2 | 4/2019 | Hadar et al. |
| 10,432,139 B2* | 10/2019 | Chaintreuil .............. H02S 50/00 |
| 10,673,253 B2 | 6/2020 | Adest et al. |
| 10,931,119 B2 | 2/2021 | Har-Shai et al. |
| 10,969,412 B2 | 4/2021 | Sella et al. |
| 11,018,623 B2 | 5/2021 | Loewenstern et al. |
| 11,476,799 B2 | 10/2022 | Sella et al. |
| 11,682,918 B2 | 6/2023 | Adest et al. |
| 11,979,037 B2 | 5/2024 | Har-Shai et al. |
| 2001/0000957 A1 | 5/2001 | Birchfield et al. |
| 2001/0011881 A1 | 8/2001 | Emori et al. |
| 2001/0013767 A1 | 8/2001 | Takemoto |
| 2001/0023703 A1 | 9/2001 | Kondo et al. |
| 2001/0032664 A1 | 10/2001 | Takehara et al. |
| 2001/0034982 A1 | 11/2001 | Nagao et al. |
| 2001/0035180 A1 | 11/2001 | Kimura et al. |
| 2001/0048605 A1 | 12/2001 | Kurokami et al. |
| 2001/0050102 A1 | 12/2001 | Matsumi et al. |
| 2001/0054881 A1 | 12/2001 | Watanabe |
| 2002/0002040 A1 | 1/2002 | Kline et al. |
| 2002/0014262 A1 | 2/2002 | Matsushita et al. |

(56) References Cited

U.S. PATENT DOCUMENTS

| | | |
|---|---|---|
| 2002/0017900 A1 | 2/2002 | Takeda et al. |
| 2002/0034083 A1 | 3/2002 | Ayyanar et al. |
| 2002/0038667 A1 | 4/2002 | Kondo et al. |
| 2002/0041505 A1 | 4/2002 | Suzui et al. |
| 2002/0044473 A1 | 4/2002 | Toyomura et al. |
| 2002/0047309 A1 | 4/2002 | Droppo et al. |
| 2002/0047693 A1 | 4/2002 | Chang |
| 2002/0056089 A1 | 5/2002 | Houston |
| 2002/0059035 A1 | 5/2002 | Yagi et al. |
| 2002/0063552 A1 | 5/2002 | Arakawa |
| 2002/0063625 A1 | 5/2002 | Takehara et al. |
| 2002/0078991 A1 | 6/2002 | Nagao et al. |
| 2002/0080027 A1 | 6/2002 | Conley |
| 2002/0085397 A1 | 7/2002 | Suzui et al. |
| 2002/0105765 A1 | 8/2002 | Kondo et al. |
| 2002/0113689 A1 | 8/2002 | Gehlot et al. |
| 2002/0118559 A1 | 8/2002 | Kurokami et al. |
| 2002/0127980 A1 | 9/2002 | Amanullah et al. |
| 2002/0134567 A1 | 9/2002 | Rasmussen et al. |
| 2002/0148497 A1 | 10/2002 | Sasaoka et al. |
| 2002/0149950 A1 | 10/2002 | Takebayashi |
| 2002/0162585 A1 | 11/2002 | Sugawara et al. |
| 2002/0165458 A1 | 11/2002 | Carter et al. |
| 2002/0177401 A1 | 11/2002 | Judd et al. |
| 2002/0179140 A1 | 12/2002 | Toyomura |
| 2002/0180408 A1 | 12/2002 | McDaniel et al. |
| 2002/0190696 A1 | 12/2002 | Darshan |
| 2003/0001709 A1 | 1/2003 | Visser |
| 2003/0002303 A1 | 1/2003 | Riggio et al. |
| 2003/0025594 A1 | 2/2003 | Akiyama et al. |
| 2003/0038615 A1 | 2/2003 | Elbanhawy |
| 2003/0043597 A1 | 3/2003 | Betts-LaCroix |
| 2003/0047207 A1 | 3/2003 | Aylaian |
| 2003/0058593 A1 | 3/2003 | Bertele et al. |
| 2003/0058662 A1 | 3/2003 | Baudelot et al. |
| 2003/0066076 A1 | 4/2003 | Minahan |
| 2003/0066555 A1 | 4/2003 | Hui et al. |
| 2003/0075211 A1 | 4/2003 | Makita et al. |
| 2003/0080741 A1 | 5/2003 | LeRow et al. |
| 2003/0085621 A1 | 5/2003 | Potega |
| 2003/0090233 A1 | 5/2003 | Browe |
| 2003/0090246 A1 | 5/2003 | Shenai et al. |
| 2003/0094931 A1 | 5/2003 | Renyolds |
| 2003/0098056 A1 | 5/2003 | Fronek et al. |
| 2003/0107352 A1 | 6/2003 | Downer et al. |
| 2003/0111103 A1 | 6/2003 | Bower et al. |
| 2003/0116154 A1 | 6/2003 | Butler et al. |
| 2003/0121514 A1 | 7/2003 | Davenport et al. |
| 2003/0127126 A1 | 7/2003 | Yang |
| 2003/0140960 A1 | 7/2003 | Baum et al. |
| 2003/0156439 A1 | 8/2003 | Ohmichi et al. |
| 2003/0164695 A1 | 9/2003 | Fasshauer et al. |
| 2003/0185026 A1 | 10/2003 | Matsuda et al. |
| 2003/0193821 A1 | 10/2003 | Krieger et al. |
| 2003/0201674 A1 | 10/2003 | Droppo et al. |
| 2003/0206424 A1 | 11/2003 | Jungreis et al. |
| 2003/0214274 A1 | 11/2003 | Lethellier |
| 2003/0223257 A1 | 12/2003 | Onoe |
| 2004/0004402 A1 | 1/2004 | Kippley |
| 2004/0027101 A1 | 2/2004 | Vinciarelli et al. |
| 2004/0027112 A1 | 2/2004 | Kondo et al. |
| 2004/0041548 A1 | 3/2004 | Perry |
| 2004/0056642 A1 | 3/2004 | Nebrigic et al. |
| 2004/0056768 A1 | 3/2004 | Matsushita et al. |
| 2004/0061527 A1 | 4/2004 | Knee |
| 2004/0076028 A1 | 4/2004 | Achleitner et al. |
| 2004/0117676 A1 | 6/2004 | Kobayashi et al. |
| 2004/0118446 A1 | 6/2004 | Toyomura |
| 2004/0123894 A1 | 7/2004 | Erban |
| 2004/0124816 A1 | 7/2004 | DeLepaut |
| 2004/0125618 A1 | 7/2004 | De Rooij et al. |
| 2004/0140719 A1 | 7/2004 | Vulih et al. |
| 2004/0141345 A1 | 7/2004 | Cheng et al. |
| 2004/0144043 A1 | 7/2004 | Stevenson et al. |
| 2004/0150410 A1 | 8/2004 | Schoepf et al. |
| 2004/0164718 A1 | 8/2004 | McDaniel et al. |
| 2004/0165408 A1 | 8/2004 | West et al. |
| 2004/0167676 A1 | 8/2004 | Mizumaki |
| 2004/0169499 A1 | 9/2004 | Huang et al. |
| 2004/0170038 A1 | 9/2004 | Ichinose et al. |
| 2004/0189090 A1 | 9/2004 | Yanagida et al. |
| 2004/0189432 A1 | 9/2004 | Yan et al. |
| 2004/0195372 A1 | 10/2004 | Yoshikawa et al. |
| 2004/0201279 A1 | 10/2004 | Templeton |
| 2004/0201933 A1 | 10/2004 | Blanc |
| 2004/0207366 A1 | 10/2004 | Sung |
| 2004/0211456 A1 | 10/2004 | Brown et al. |
| 2004/0211458 A1 | 10/2004 | Gui et al. |
| 2004/0211459 A1 | 10/2004 | Suenaga et al. |
| 2004/0213169 A1 | 10/2004 | Allard et al. |
| 2004/0223351 A1 | 11/2004 | Kurokami et al. |
| 2004/0230343 A1 | 11/2004 | Zalesski |
| 2004/0233685 A1 | 11/2004 | Matsuo et al. |
| 2004/0246226 A1 | 12/2004 | Moon |
| 2004/0255999 A1 | 12/2004 | Matsushita et al. |
| 2004/0258141 A1 | 12/2004 | Tustison et al. |
| 2004/0262998 A1 | 12/2004 | Kunow et al. |
| 2004/0263119 A1 | 12/2004 | Meyer et al. |
| 2004/0263183 A1 | 12/2004 | Naidu et al. |
| 2004/0264225 A1 | 12/2004 | Bhavaraju et al. |
| 2005/0002214 A1 | 1/2005 | Deng et al. |
| 2005/0005785 A1 | 1/2005 | Poss et al. |
| 2005/0006958 A1 | 1/2005 | Dubovsky |
| 2005/0017697 A1 | 1/2005 | Capel |
| 2005/0017701 A1 | 1/2005 | Hsu |
| 2005/0030772 A1 | 2/2005 | Phadke |
| 2005/0040800 A1 | 2/2005 | Sutardja |
| 2005/0041442 A1 | 2/2005 | Balakrishnan |
| 2005/0057214 A1 | 3/2005 | Matan |
| 2005/0057215 A1 | 3/2005 | Matan |
| 2005/0068012 A1 | 3/2005 | Cutler |
| 2005/0068820 A1 | 3/2005 | Radosevich et al. |
| 2005/0077879 A1 | 4/2005 | Near |
| 2005/0099138 A1 | 5/2005 | Wilhelm |
| 2005/0103376 A1 | 5/2005 | Matsushita et al. |
| 2005/0105224 A1 | 5/2005 | Nishi |
| 2005/0105306 A1 | 5/2005 | Deng et al. |
| 2005/0109386 A1 | 5/2005 | Marshall |
| 2005/0110454 A1 | 5/2005 | Tsai et al. |
| 2005/0121067 A1 | 6/2005 | Toyomura et al. |
| 2005/0122747 A1 | 6/2005 | Gaksch |
| 2005/0135031 A1 | 6/2005 | Colby et al. |
| 2005/0139258 A1 | 6/2005 | Liu et al. |
| 2005/0140335 A1 | 6/2005 | Lee et al. |
| 2005/0162018 A1 | 7/2005 | Realmuto et al. |
| 2005/0163063 A1 | 7/2005 | Kuchler et al. |
| 2005/0172995 A1 | 8/2005 | Rohrig et al. |
| 2005/0179420 A1 | 8/2005 | Satoh et al. |
| 2005/0191528 A1 | 9/2005 | Cortes et al. |
| 2005/0194937 A1 | 9/2005 | Jacobs |
| 2005/0201397 A1 | 9/2005 | Petite |
| 2005/0213272 A1 | 9/2005 | Kobayashi |
| 2005/0218876 A1 | 10/2005 | Nino |
| 2005/0225090 A1 | 10/2005 | Wobben |
| 2005/0226017 A1 | 10/2005 | Kotsopoulos et al. |
| 2005/0231183 A1 | 10/2005 | Li et al. |
| 2005/0234599 A1 | 10/2005 | Kurokami et al. |
| 2005/0242795 A1 | 11/2005 | Al-Kuran et al. |
| 2005/0248428 A1 | 11/2005 | Coleman et al. |
| 2005/0252545 A1 | 11/2005 | Nowlan et al. |
| 2005/0257827 A1 | 11/2005 | Gaudiana et al. |
| 2005/0269988 A1 | 12/2005 | Thrap |
| 2005/0275386 A1 | 12/2005 | Jepsen et al. |
| 2005/0275527 A1 | 12/2005 | Kates |
| 2005/0275979 A1 | 12/2005 | Xu |
| 2005/0281064 A1 | 12/2005 | Olsen et al. |
| 2005/0286510 A1 | 12/2005 | Nakajima et al. |
| 2005/0287402 A1 | 12/2005 | Maly et al. |
| 2006/0001406 A1 | 1/2006 | Matan |
| 2006/0017327 A1 | 1/2006 | Siri et al. |
| 2006/0034106 A1 | 2/2006 | Johnson |
| 2006/0038692 A1 | 2/2006 | Schnetker |
| 2006/0043792 A1 | 3/2006 | Hjort et al. |
| 2006/0043942 A1 | 3/2006 | Cohen |

(56) References Cited

U.S. PATENT DOCUMENTS

| | | |
|---|---|---|
| 2006/0053447 A1 | 3/2006 | Krzyzanowski et al. |
| 2006/0055384 A1 | 3/2006 | Jordan et al. |
| 2006/0066349 A1 | 3/2006 | Murakami |
| 2006/0068239 A1 | 3/2006 | Norimatsu et al. |
| 2006/0077046 A1 | 4/2006 | Endo |
| 2006/0085167 A1 | 4/2006 | Warfield et al. |
| 2006/0091958 A1 | 5/2006 | Bhatti et al. |
| 2006/0103360 A9 | 5/2006 | Cutler |
| 2006/0108979 A1 | 5/2006 | Daniel et al. |
| 2006/0109009 A1 | 5/2006 | Banke et al. |
| 2006/0113843 A1 | 6/2006 | Beveridge |
| 2006/0113979 A1 | 6/2006 | Ishigaki et al. |
| 2006/0116968 A1 | 6/2006 | Arisawa |
| 2006/0118162 A1 | 6/2006 | Saelzer et al. |
| 2006/0125449 A1 | 6/2006 | Unger |
| 2006/0132102 A1 | 6/2006 | Harvey |
| 2006/0149396 A1 | 7/2006 | Templeton |
| 2006/0152085 A1 | 7/2006 | Flett et al. |
| 2006/0162772 A1 | 7/2006 | Presher et al. |
| 2006/0163946 A1 | 7/2006 | Henne et al. |
| 2006/0164065 A1 | 7/2006 | Hoouk et al. |
| 2006/0167762 A1 | 7/2006 | Hahn-Carlson |
| 2006/0171182 A1 | 8/2006 | Siri et al. |
| 2006/0174939 A1 | 8/2006 | Matan |
| 2006/0176029 A1 | 8/2006 | McGinty et al. |
| 2006/0176031 A1 | 8/2006 | Forman et al. |
| 2006/0176036 A1 | 8/2006 | Flatness et al. |
| 2006/0176716 A1 | 8/2006 | Balakrishnan et al. |
| 2006/0185727 A1 | 8/2006 | Matan |
| 2006/0192540 A1 | 8/2006 | Balakrishnan et al. |
| 2006/0208660 A1 | 9/2006 | Shinmura et al. |
| 2006/0222912 A1 | 10/2006 | Smith |
| 2006/0222916 A1 | 10/2006 | Norimatsu et al. |
| 2006/0225781 A1 | 10/2006 | Locher |
| 2006/0227577 A1 | 10/2006 | Horiuchi et al. |
| 2006/0227578 A1 | 10/2006 | Datta et al. |
| 2006/0231132 A1 | 10/2006 | Neussner |
| 2006/0232220 A1 | 10/2006 | Melis |
| 2006/0235717 A1 | 10/2006 | Sharma et al. |
| 2006/0237058 A1 | 10/2006 | McClintock et al. |
| 2006/0238750 A1 | 10/2006 | Shimotomai |
| 2006/0243318 A1 | 11/2006 | Feldmeier et al. |
| 2006/0261751 A1 | 11/2006 | Okabe et al. |
| 2006/0266408 A1 | 11/2006 | Horne et al. |
| 2006/0267515 A1 | 11/2006 | Burke et al. |
| 2006/0290317 A1 | 12/2006 | McNulty et al. |
| 2007/0001653 A1 | 1/2007 | Xu |
| 2007/0013349 A1 | 1/2007 | Bassett |
| 2007/0019613 A1 | 1/2007 | Frezzolini |
| 2007/0024257 A1 | 2/2007 | Boldo |
| 2007/0027644 A1 | 2/2007 | Bettenwort et al. |
| 2007/0029468 A1 | 2/2007 | Sinton et al. |
| 2007/0029636 A1 | 2/2007 | Kanemaru et al. |
| 2007/0030068 A1 | 2/2007 | Motonobu et al. |
| 2007/0035975 A1 | 2/2007 | Dickerson et al. |
| 2007/0040540 A1 | 2/2007 | Cutler |
| 2007/0044837 A1 | 3/2007 | Simburger et al. |
| 2007/0075689 A1 | 4/2007 | Kinder et al. |
| 2007/0075711 A1 | 4/2007 | Blanc et al. |
| 2007/0081364 A1 | 4/2007 | Andreycak |
| 2007/0085523 A1 | 4/2007 | Scoones et al. |
| 2007/0089778 A1 | 4/2007 | Horne et al. |
| 2007/0103108 A1 | 5/2007 | Capp et al. |
| 2007/0103297 A1 | 5/2007 | Armstrong et al. |
| 2007/0107767 A1 | 5/2007 | Hayden et al. |
| 2007/0115635 A1 | 5/2007 | Low et al. |
| 2007/0119718 A1 | 5/2007 | Gibson et al. |
| 2007/0121648 A1 | 5/2007 | Hahn |
| 2007/0133241 A1 | 6/2007 | Mumtaz et al. |
| 2007/0133421 A1 | 6/2007 | Young |
| 2007/0147075 A1 | 6/2007 | Bang |
| 2007/0158185 A1 | 7/2007 | Andelman et al. |
| 2007/0159866 A1 | 7/2007 | Siri |
| 2007/0164612 A1 | 7/2007 | Wendt et al. |
| 2007/0164750 A1 | 7/2007 | Chen et al. |
| 2007/0165347 A1 | 7/2007 | Wendt et al. |
| 2007/0205778 A1 | 9/2007 | Fabbro et al. |
| 2007/0209656 A1 | 9/2007 | Lee |
| 2007/0211888 A1 | 9/2007 | Corcoran et al. |
| 2007/0217178 A1 | 9/2007 | Johnson et al. |
| 2007/0223165 A1 | 9/2007 | Itri et al. |
| 2007/0227574 A1 | 10/2007 | Cart |
| 2007/0235071 A1 | 10/2007 | Work et al. |
| 2007/0236187 A1 | 10/2007 | Wai et al. |
| 2007/0241720 A1 | 10/2007 | Sakamoto et al. |
| 2007/0246546 A1 | 10/2007 | Yoshida |
| 2007/0247135 A1 | 10/2007 | Koga |
| 2007/0247877 A1 | 10/2007 | Kwon et al. |
| 2007/0262802 A1 | 11/2007 | Huard et al. |
| 2007/0271006 A1 | 11/2007 | Golden et al. |
| 2007/0273240 A1 | 11/2007 | Steele et al. |
| 2007/0273339 A1* | 11/2007 | Haines .................. B64G 1/546 323/223 |
| 2007/0273342 A1 | 11/2007 | Kataoka et al. |
| 2007/0273351 A1 | 11/2007 | Matan |
| 2007/0284451 A1 | 12/2007 | Uramoto |
| 2007/0290636 A1 | 12/2007 | Beck et al. |
| 2007/0290656 A1 | 12/2007 | Lee Tai Keung |
| 2008/0021707 A1 | 1/2008 | Bou-Ghazale et al. |
| 2008/0023061 A1 | 1/2008 | Clemens et al. |
| 2008/0024098 A1 | 1/2008 | Hojo |
| 2008/0030198 A1 | 2/2008 | Kawata et al. |
| 2008/0036440 A1 | 2/2008 | Garmer |
| 2008/0042709 A1 | 2/2008 | Chen et al. |
| 2008/0055941 A1 | 3/2008 | Victor et al. |
| 2008/0072091 A1 | 3/2008 | Hanson et al. |
| 2008/0080177 A1 | 4/2008 | Chang |
| 2008/0088184 A1 | 4/2008 | Tung et al. |
| 2008/0088829 A1 | 4/2008 | Fuyuki |
| 2008/0089277 A1 | 4/2008 | Alexander et al. |
| 2008/0097655 A1 | 4/2008 | Hadar et al. |
| 2008/0106250 A1 | 5/2008 | Prior et al. |
| 2008/0111529 A1 | 5/2008 | Shah et al. |
| 2008/0115823 A1 | 5/2008 | Kinsey |
| 2008/0121272 A1 | 5/2008 | Besser et al. |
| 2008/0122449 A1 | 5/2008 | Besser et al. |
| 2008/0122518 A1 | 5/2008 | Besser et al. |
| 2008/0136367 A1 | 6/2008 | Adest et al. |
| 2008/0142071 A1 | 6/2008 | Dorn et al. |
| 2008/0143188 A1 | 6/2008 | Adest et al. |
| 2008/0143462 A1 | 6/2008 | Belisle et al. |
| 2008/0144294 A1 | 6/2008 | Adest et al. |
| 2008/0147335 A1 | 6/2008 | Adest et al. |
| 2008/0149167 A1 | 6/2008 | Liu |
| 2008/0150366 A1 | 6/2008 | Adest et al. |
| 2008/0150484 A1 | 6/2008 | Kimball et al. |
| 2008/0156551 A1 | 7/2008 | Kawahara et al. |
| 2008/0164766 A1 | 7/2008 | Adest et al. |
| 2008/0179949 A1 | 7/2008 | Besser et al. |
| 2008/0186004 A1 | 8/2008 | Williams |
| 2008/0191560 A1 | 8/2008 | Besser et al. |
| 2008/0191675 A1 | 8/2008 | Besser et al. |
| 2008/0192510 A1 | 8/2008 | Falk |
| 2008/0192519 A1 | 8/2008 | Iwata et al. |
| 2008/0198523 A1 | 8/2008 | Schmidt et al. |
| 2008/0205096 A1 | 8/2008 | Ai et al. |
| 2008/0218152 A1 | 9/2008 | Bo |
| 2008/0224652 A1 | 9/2008 | Zhu et al. |
| 2008/0236647 A1 | 10/2008 | Gibson et al. |
| 2008/0236648 A1 | 10/2008 | Klein et al. |
| 2008/0238195 A1 | 10/2008 | Shaver et al. |
| 2008/0238372 A1 | 10/2008 | Cintra et al. |
| 2008/0246460 A1 | 10/2008 | Smith |
| 2008/0246463 A1 | 10/2008 | Sinton et al. |
| 2008/0252273 A1 | 10/2008 | Woo et al. |
| 2008/0264470 A1 | 10/2008 | Masuda et al. |
| 2008/0266913 A1 | 10/2008 | Brotto et al. |
| 2008/0266919 A1 | 10/2008 | Mallwitz |
| 2008/0283118 A1 | 11/2008 | Rotzoll et al. |
| 2008/0291707 A1 | 11/2008 | Fang |
| 2008/0294472 A1 | 11/2008 | Yamada |
| 2008/0297963 A1 | 12/2008 | Lee et al. |
| 2008/0298608 A1 | 12/2008 | Wilcox |
| 2008/0303503 A1 | 12/2008 | Wolfs |

(56) References Cited

U.S. PATENT DOCUMENTS

| | | |
|---|---|---|
| 2008/0304296 A1 | 12/2008 | NadimpalliRaju et al. |
| 2008/0304298 A1 | 12/2008 | Toba et al. |
| 2009/0010035 A1 | 1/2009 | Williams |
| 2009/0012917 A1 | 1/2009 | Thompson et al. |
| 2009/0014050 A1 | 1/2009 | Haaf |
| 2009/0014057 A1 | 1/2009 | Croft et al. |
| 2009/0014058 A1 | 1/2009 | Croft et al. |
| 2009/0015071 A1 | 1/2009 | Iwata et al. |
| 2009/0020151 A1 | 1/2009 | Fornage |
| 2009/0021877 A1 | 1/2009 | Fornage et al. |
| 2009/0039833 A1 | 2/2009 | Kitagawa |
| 2009/0039852 A1 | 2/2009 | Fishelov et al. |
| 2009/0064252 A1 | 3/2009 | Howarter et al. |
| 2009/0066357 A1 | 3/2009 | Fornage |
| 2009/0066382 A1 | 3/2009 | Yousefzadeh et al. |
| 2009/0066399 A1 | 3/2009 | Chen et al. |
| 2009/0069950 A1 | 3/2009 | Kurokami et al. |
| 2009/0073726 A1 | 3/2009 | Babcock |
| 2009/0078300 A1 | 3/2009 | Ang et al. |
| 2009/0080226 A1 | 3/2009 | Fornage |
| 2009/0084570 A1 | 4/2009 | Gherardini et al. |
| 2009/0097172 A1 | 4/2009 | Bremicker et al. |
| 2009/0097283 A1 | 4/2009 | Krein et al. |
| 2009/0101191 A1 | 4/2009 | Beck et al. |
| 2009/0102440 A1 | 4/2009 | Coles |
| 2009/0114263 A1 | 5/2009 | Powell et al. |
| 2009/0120485 A1 | 5/2009 | Kikinis |
| 2009/0121549 A1 | 5/2009 | Leonard |
| 2009/0127448 A1 | 5/2009 | Fuyuki |
| 2009/0133736 A1 | 5/2009 | Powell et al. |
| 2009/0140715 A1 | 6/2009 | Adest et al. |
| 2009/0141522 A1 | 6/2009 | Adest et al. |
| 2009/0145480 A1 | 6/2009 | Adest et al. |
| 2009/0146667 A1 | 6/2009 | Adest et al. |
| 2009/0146671 A1 | 6/2009 | Gazit |
| 2009/0147554 A1 | 6/2009 | Adest et al. |
| 2009/0150005 A1 | 6/2009 | Hadar et al. |
| 2009/0160258 A1 | 6/2009 | Allen et al. |
| 2009/0179500 A1 | 7/2009 | Ragonese et al. |
| 2009/0179662 A1 | 7/2009 | Moulton et al. |
| 2009/0182532 A1 | 7/2009 | Stoeber et al. |
| 2009/0183763 A1 | 7/2009 | Meyer |
| 2009/0184746 A1 | 7/2009 | Fahrenbruch |
| 2009/0189456 A1 | 7/2009 | Skutt |
| 2009/0190275 A1 | 7/2009 | Gilmore et al. |
| 2009/0195081 A1 | 8/2009 | Quardt et al. |
| 2009/0206666 A1 | 8/2009 | Sella et al. |
| 2009/0207543 A1 | 8/2009 | Boniface et al. |
| 2009/0217965 A1 | 9/2009 | Dougal et al. |
| 2009/0224817 A1 | 9/2009 | Nakamura et al. |
| 2009/0234692 A1 | 9/2009 | Powell et al. |
| 2009/0237042 A1 | 9/2009 | Glovinski |
| 2009/0237043 A1 | 9/2009 | Glovinsky |
| 2009/0238444 A1 | 9/2009 | Su et al. |
| 2009/0242011 A1 | 10/2009 | Proisy et al. |
| 2009/0243385 A1 | 10/2009 | Ichikawa |
| 2009/0243547 A1 | 10/2009 | Andelfinger |
| 2009/0273241 A1 | 11/2009 | Gazit et al. |
| 2009/0278496 A1 | 11/2009 | Nakao et al. |
| 2009/0282755 A1 | 11/2009 | Abbott et al. |
| 2009/0283129 A1 | 11/2009 | Foss |
| 2009/0283130 A1 | 11/2009 | Gilmore et al. |
| 2009/0284078 A1 | 11/2009 | Zhang et al. |
| 2009/0284232 A1 | 11/2009 | Zhang et al. |
| 2009/0284240 A1 | 11/2009 | Zhang et al. |
| 2009/0284998 A1 | 11/2009 | Zhang et al. |
| 2009/0295225 A1 | 12/2009 | Asplund et al. |
| 2009/0296434 A1 | 12/2009 | De Rooij et al. |
| 2009/0302681 A1 | 12/2009 | Yamada et al. |
| 2009/0322494 A1 | 12/2009 | Lee |
| 2009/0325003 A1 | 12/2009 | Aberle et al. |
| 2010/0001587 A1 | 1/2010 | Casey et al. |
| 2010/0002349 A1 | 1/2010 | La Scala et al. |
| 2010/0013452 A1 | 1/2010 | Tang et al. |
| 2010/0019729 A1 | 1/2010 | Kaita et al. |
| 2010/0020576 A1 | 1/2010 | Falk |
| 2010/0026097 A1 | 2/2010 | Avrutsky et al. |
| 2010/0026736 A1 | 2/2010 | Plut |
| 2010/0038907 A1 | 2/2010 | Hunt et al. |
| 2010/0043781 A1 | 2/2010 | Jones et al. |
| 2010/0052735 A1 | 3/2010 | Burkland et al. |
| 2010/0057267 A1 | 3/2010 | Liu et al. |
| 2010/0060000 A1 | 3/2010 | Scholte-Wassink |
| 2010/0071742 A1 | 3/2010 | de Rooij et al. |
| 2010/0085670 A1 | 4/2010 | Palaniswami et al. |
| 2010/0103579 A1 | 4/2010 | Carkner et al. |
| 2010/0115093 A1 | 5/2010 | Rice |
| 2010/0124027 A1 | 5/2010 | Handelsman et al. |
| 2010/0124087 A1 | 5/2010 | Falk |
| 2010/0126550 A1 | 5/2010 | Foss |
| 2010/0127570 A1 | 5/2010 | Hadar et al. |
| 2010/0127571 A1 | 5/2010 | Hadar et al. |
| 2010/0131108 A1 | 5/2010 | Meyer |
| 2010/0132757 A1 | 6/2010 | He et al. |
| 2010/0132758 A1 | 6/2010 | Gilmore |
| 2010/0132761 A1 | 6/2010 | Echizenya et al. |
| 2010/0133911 A1 | 6/2010 | Williams et al. |
| 2010/0139734 A1 | 6/2010 | Hadar et al. |
| 2010/0139743 A1 | 6/2010 | Hadar et al. |
| 2010/0141041 A1 | 6/2010 | Bose et al. |
| 2010/0141153 A1 | 6/2010 | Recker et al. |
| 2010/0147362 A1 | 6/2010 | King et al. |
| 2010/0154858 A1 | 6/2010 | Jain |
| 2010/0176773 A1 | 7/2010 | Capel |
| 2010/0181957 A1 | 7/2010 | Goeltner |
| 2010/0191383 A1 | 7/2010 | Gaul |
| 2010/0195357 A1 | 8/2010 | Fornage et al. |
| 2010/0195361 A1 | 8/2010 | Stem |
| 2010/0206378 A1 | 8/2010 | Erickson, Jr. et al. |
| 2010/0207764 A1 | 8/2010 | Muhlberger et al. |
| 2010/0207770 A1 | 8/2010 | Thiemann |
| 2010/0208501 A1 | 8/2010 | Matan et al. |
| 2010/0213897 A1 | 8/2010 | Tse |
| 2010/0214808 A1 | 8/2010 | Rodriguez |
| 2010/0217551 A1 | 8/2010 | Goff et al. |
| 2010/0229915 A1 | 9/2010 | Ledenev et al. |
| 2010/0241375 A1 | 9/2010 | Kumar et al. |
| 2010/0244575 A1 | 9/2010 | Coccia et al. |
| 2010/0246223 A1 | 9/2010 | Xuan |
| 2010/0264736 A1 | 10/2010 | Mumtaz et al. |
| 2010/0269430 A1 | 10/2010 | Haddock |
| 2010/0277001 A1 | 11/2010 | Wagoner |
| 2010/0282290 A1 | 11/2010 | Schwarze et al. |
| 2010/0286836 A1 | 11/2010 | Shaver et al. |
| 2010/0288327 A1 | 11/2010 | Lisi et al. |
| 2010/0289337 A1 | 11/2010 | Stauth et al. |
| 2010/0294528 A1 | 11/2010 | Sella et al. |
| 2010/0294903 A1 | 11/2010 | Shmukler et al. |
| 2010/0295680 A1 | 11/2010 | Dumps |
| 2010/0297860 A1 | 11/2010 | Shmukler et al. |
| 2010/0301991 A1 | 12/2010 | Sella et al. |
| 2010/0308662 A1 | 12/2010 | Schatz et al. |
| 2010/0309692 A1 | 12/2010 | Chisenga et al. |
| 2010/0315043 A1 | 12/2010 | Chau |
| 2010/0321148 A1 | 12/2010 | Gevorkian |
| 2010/0326809 A1 | 12/2010 | Lang et al. |
| 2010/0327657 A1 | 12/2010 | Kuran |
| 2010/0327659 A1 | 12/2010 | Lisi et al. |
| 2010/0332047 A1 | 12/2010 | Arditi et al. |
| 2011/0006743 A1 | 1/2011 | Fabbro |
| 2011/0012430 A1 | 1/2011 | Cheng et al. |
| 2011/0019444 A1* | 1/2011 | Dargatz ............... H01H 9/50 361/93.2 |
| 2011/0025130 A1 | 2/2011 | Hadar et al. |
| 2011/0026282 A1 | 2/2011 | Chapman et al. |
| 2011/0027626 A1 | 2/2011 | Lattin |
| 2011/0031816 A1 | 2/2011 | Buthker et al. |
| 2011/0031946 A1 | 2/2011 | Egan et al. |
| 2011/0037600 A1 | 2/2011 | Takehara et al. |
| 2011/0043172 A1 | 2/2011 | Dearn |
| 2011/0045802 A1 | 2/2011 | Bland et al. |
| 2011/0049990 A1 | 3/2011 | Amaratunga et al. |
| 2011/0050002 A1 | 3/2011 | De Luca |
| 2011/0050190 A1 | 3/2011 | Avrutsky |

(56) References Cited

U.S. PATENT DOCUMENTS

| | | |
|---|---|---|
| 2011/0056533 A1 | 3/2011 | Kuan |
| 2011/0061705 A1 | 3/2011 | Croft et al. |
| 2011/0061713 A1 | 3/2011 | Powell et al. |
| 2011/0062784 A1 | 3/2011 | Wolfs |
| 2011/0068633 A1 | 3/2011 | Quardt et al. |
| 2011/0079263 A1 | 4/2011 | Avrutsky |
| 2011/0080147 A1 | 4/2011 | Schoenlinner et al. |
| 2011/0083733 A1 | 4/2011 | Marroquin et al. |
| 2011/0084553 A1 | 4/2011 | Adest et al. |
| 2011/0088741 A1 | 4/2011 | Dunton et al. |
| 2011/0101949 A1 | 5/2011 | Lopata et al. |
| 2011/0108087 A1 | 5/2011 | Croft et al. |
| 2011/0109158 A1 | 5/2011 | Olsen |
| 2011/0114154 A1 | 5/2011 | Lichy et al. |
| 2011/0115295 A1 | 5/2011 | Moon et al. |
| 2011/0115393 A1 | 5/2011 | He |
| 2011/0116294 A1 | 5/2011 | Wolf |
| 2011/0121441 A1 | 5/2011 | Halstead et al. |
| 2011/0121652 A1 | 5/2011 | Sella et al. |
| 2011/0125431 A1 | 5/2011 | Adest et al. |
| 2011/0132424 A1 | 6/2011 | Rakib |
| 2011/0133552 A1 | 6/2011 | Binder et al. |
| 2011/0133556 A1 | 6/2011 | Choi |
| 2011/0139213 A1 | 6/2011 | Lee |
| 2011/0140535 A1 | 6/2011 | Choi et al. |
| 2011/0140536 A1 | 6/2011 | Adest et al. |
| 2011/0141644 A1 | 6/2011 | Hastings et al. |
| 2011/0144822 A1 | 6/2011 | Choi |
| 2011/0161722 A1 | 6/2011 | Makhota et al. |
| 2011/0172842 A1 | 7/2011 | Makhota et al. |
| 2011/0173276 A1 | 7/2011 | Eizips et al. |
| 2011/0179726 A1 | 7/2011 | Pao et al. |
| 2011/0181251 A1 | 7/2011 | Porter et al. |
| 2011/0181340 A1 | 7/2011 | Gazit |
| 2011/0183537 A1 | 7/2011 | Fornage et al. |
| 2011/0198935 A1 | 8/2011 | Hinman et al. |
| 2011/0210610 A1 | 9/2011 | Mitsuoka et al. |
| 2011/0210611 A1 | 9/2011 | Edenev et al. |
| 2011/0210612 A1 | 9/2011 | Leutwein |
| 2011/0218687 A1 | 9/2011 | Hadar et al. |
| 2011/0227411 A1 | 9/2011 | Arditi |
| 2011/0232714 A1 | 9/2011 | Bhavaraju et al. |
| 2011/0240100 A1 | 10/2011 | Lu et al. |
| 2011/0245989 A1 | 10/2011 | Makhota et al. |
| 2011/0246338 A1 | 10/2011 | Eich |
| 2011/0254372 A1 | 10/2011 | Haines et al. |
| 2011/0260866 A1 | 10/2011 | Avrutsky et al. |
| 2011/0267721 A1 | 11/2011 | Chaintreuil et al. |
| 2011/0267859 A1 | 11/2011 | Chapman |
| 2011/0271611 A1 | 11/2011 | Maracci et al. |
| 2011/0273015 A1 | 11/2011 | Adest et al. |
| 2011/0273016 A1 | 11/2011 | Adest et al. |
| 2011/0273017 A1 | 11/2011 | Borup et al. |
| 2011/0273024 A1 | 11/2011 | Butzmann |
| 2011/0273302 A1 | 11/2011 | Fornage et al. |
| 2011/0278955 A1 | 11/2011 | Signorelli et al. |
| 2011/0285205 A1 | 11/2011 | Ledenev et al. |
| 2011/0285375 A1 | 11/2011 | Deboy |
| 2011/0290317 A1 | 12/2011 | Naumovitz et al. |
| 2011/0291486 A1 | 12/2011 | Adest et al. |
| 2011/0298288 A1 | 12/2011 | Cho et al. |
| 2011/0301772 A1 | 12/2011 | Zuercher et al. |
| 2011/0304204 A1 | 12/2011 | Avrutsky et al. |
| 2011/0304213 A1 | 12/2011 | Avrutsky et al. |
| 2011/0304215 A1 | 12/2011 | Avrutsky et al. |
| 2011/0316346 A1 | 12/2011 | Porter et al. |
| 2012/0007434 A1 | 1/2012 | Perreault et al. |
| 2012/0007558 A1 | 1/2012 | Pigott |
| 2012/0007613 A1 | 1/2012 | Gazit |
| 2012/0019966 A1 | 1/2012 | DeBoer |
| 2012/0026763 A1 | 2/2012 | Humphrey et al. |
| 2012/0026769 A1 | 2/2012 | Schroeder et al. |
| 2012/0032515 A1 | 2/2012 | Ledenev et al. |
| 2012/0033392 A1 | 2/2012 | Golubovic et al. |
| 2012/0033463 A1 | 2/2012 | Rodriguez |
| 2012/0039099 A1 | 2/2012 | Rodriguez |
| 2012/0042588 A1 | 2/2012 | Erickson, Jr. |
| 2012/0043818 A1 | 2/2012 | Stratakos et al. |
| 2012/0043823 A1 | 2/2012 | Stratakos et al. |
| 2012/0044014 A1 | 2/2012 | Stratakos et al. |
| 2012/0044717 A1 | 2/2012 | Suntio et al. |
| 2012/0048325 A1 | 3/2012 | Matsuo et al. |
| 2012/0049627 A1 | 3/2012 | Matsuo et al. |
| 2012/0049801 A1 | 3/2012 | Chang |
| 2012/0049819 A1 | 3/2012 | Mao et al. |
| 2012/0056483 A1 | 3/2012 | Capp et al. |
| 2012/0056591 A1 | 3/2012 | Abe et al. |
| 2012/0063177 A1 | 3/2012 | Garrity |
| 2012/0080943 A1 | 4/2012 | Phadke |
| 2012/0081009 A1 | 4/2012 | Shteynberg et al. |
| 2012/0081933 A1 | 4/2012 | Garrity |
| 2012/0081934 A1 | 4/2012 | Garrity et al. |
| 2012/0081937 A1 | 4/2012 | Phadke |
| 2012/0087159 A1 | 4/2012 | Chapman et al. |
| 2012/0091810 A1 | 4/2012 | Aiello et al. |
| 2012/0091817 A1 | 4/2012 | Seymour et al. |
| 2012/0098344 A1 | 4/2012 | Bergveld et al. |
| 2012/0104861 A1 | 5/2012 | Kojori et al. |
| 2012/0104863 A1 | 5/2012 | Yuan |
| 2012/0113554 A1 | 5/2012 | Paoletti et al. |
| 2012/0119584 A1 | 5/2012 | Hadar et al. |
| 2012/0127764 A1 | 5/2012 | Phadke et al. |
| 2012/0133372 A1 | 5/2012 | Tsai et al. |
| 2012/0134058 A1 | 5/2012 | Pamer et al. |
| 2012/0138123 A1 | 6/2012 | Newdoll et al. |
| 2012/0139343 A1 | 6/2012 | Adest et al. |
| 2012/0146420 A1 | 6/2012 | Wolfs |
| 2012/0146583 A1 | 6/2012 | Gaul et al. |
| 2012/0161526 A1 | 6/2012 | Huang et al. |
| 2012/0161528 A1 | 6/2012 | Mumtaz et al. |
| 2012/0169124 A1 | 7/2012 | Nakashima et al. |
| 2012/0169291 A1 | 7/2012 | Abe et al. |
| 2012/0174961 A1 | 7/2012 | Larson et al. |
| 2012/0175961 A1 | 7/2012 | Har-Shai et al. |
| 2012/0175963 A1 | 7/2012 | Adest et al. |
| 2012/0187769 A1 | 7/2012 | Spannhake et al. |
| 2012/0194003 A1 | 8/2012 | Schmidt et al. |
| 2012/0199172 A1 | 8/2012 | Avrutsky |
| 2012/0200311 A1 | 8/2012 | Chaintreuil |
| 2012/0212066 A1 | 8/2012 | Adest et al. |
| 2012/0215367 A1 | 8/2012 | Eizips et al. |
| 2012/0217797 A1 | 8/2012 | Butzmann |
| 2012/0217973 A1 | 8/2012 | Avrutsky |
| 2012/0228931 A1 | 9/2012 | Butzmann |
| 2012/0240490 A1 | 9/2012 | Gangemi |
| 2012/0242156 A1 | 9/2012 | Butzmann et al. |
| 2012/0253533 A1 | 10/2012 | Eizips et al. |
| 2012/0253541 A1 | 10/2012 | Arditi et al. |
| 2012/0255591 A1 | 10/2012 | Arditi et al. |
| 2012/0268969 A1 | 10/2012 | Cuk |
| 2012/0271576 A1 | 10/2012 | Kamel et al. |
| 2012/0274145 A1 | 11/2012 | Taddeo |
| 2012/0274264 A1 | 11/2012 | Mun et al. |
| 2012/0280571 A1 | 11/2012 | Hargis |
| 2012/0299380 A1 | 11/2012 | Haupt |
| 2012/0318320 A1 | 12/2012 | Robbins |
| 2013/0002335 A1 | 1/2013 | DeGraaff |
| 2013/0026839 A1 | 1/2013 | Grana |
| 2013/0026840 A1 | 1/2013 | Arditi et al. |
| 2013/0026842 A1 | 1/2013 | Arditi et al. |
| 2013/0026843 A1 | 1/2013 | Arditi et al. |
| 2013/0038124 A1 | 2/2013 | Newdoll et al. |
| 2013/0039028 A1 | 2/2013 | Korman et al. |
| 2013/0049710 A1 | 2/2013 | Kraft et al. |
| 2013/0057223 A1 | 3/2013 | Lee |
| 2013/0062956 A1 | 3/2013 | Meyer et al. |
| 2013/0062958 A1 | 3/2013 | Erickson, Jr. et al. |
| 2013/0063119 A1 | 3/2013 | Lubomirsky |
| 2013/0069438 A1 | 3/2013 | Liu et al. |
| 2013/0082724 A1 | 4/2013 | Noda et al. |
| 2013/0094112 A1 | 4/2013 | Burghardt et al. |
| 2013/0094262 A1 | 4/2013 | Avrutsky |
| 2013/0134790 A1 | 5/2013 | Amaratunga et al. |
| 2013/0175971 A1 | 7/2013 | Har-Shai et al. |

(56) References Cited

U.S. PATENT DOCUMENTS

| | | |
|---|---|---|
| 2013/0181533 A1 | 7/2013 | Capp et al. |
| 2013/0192657 A1 | 8/2013 | Hadar et al. |
| 2013/0193765 A1 | 8/2013 | Yoscovich |
| 2013/0194706 A1 | 8/2013 | Har-Shai et al. |
| 2013/0200709 A1 | 8/2013 | Kirchner et al. |
| 2013/0200710 A1 | 8/2013 | Robbins |
| 2013/0214607 A1 | 8/2013 | Harrison |
| 2013/0222144 A1 | 8/2013 | Hadar et al. |
| 2013/0229834 A1 | 9/2013 | Garrity et al. |
| 2013/0229842 A1 | 9/2013 | Garrity |
| 2013/0234518 A1 | 9/2013 | Mumtaz et al. |
| 2013/0235637 A1 | 9/2013 | Rodriguez |
| 2013/0269181 A1 | 10/2013 | McBride et al. |
| 2013/0271096 A1 | 10/2013 | Inagaki |
| 2013/0279210 A1 | 10/2013 | Chisenga et al. |
| 2013/0285459 A1 | 10/2013 | Jaoui et al. |
| 2013/0294126 A1 | 11/2013 | Garrity et al. |
| 2013/0307556 A1 | 11/2013 | Ledenev et al. |
| 2013/0313909 A1 | 11/2013 | Storbeck et al. |
| 2013/0320778 A1 | 12/2013 | Hopf et al. |
| 2013/0321013 A1 | 12/2013 | Pisklak et al. |
| 2013/0328541 A1 | 12/2013 | Euler et al. |
| 2013/0332093 A1 | 12/2013 | Adest et al. |
| 2013/0335861 A1 | 12/2013 | Laschinski et al. |
| 2014/0062206 A1 | 3/2014 | Bryson |
| 2014/0077756 A1 | 3/2014 | Kataoka et al. |
| 2014/0097808 A1 | 4/2014 | Clark et al. |
| 2014/0119072 A1* | 5/2014 | Behrends .......... H01L 31/02021 363/55 |
| 2014/0119076 A1 | 5/2014 | Chang et al. |
| 2014/0165524 A1 | 6/2014 | Schygge et al. |
| 2014/0167715 A1 | 6/2014 | Wu et al. |
| 2014/0169053 A1 | 6/2014 | Ilic et al. |
| 2014/0191583 A1 | 7/2014 | Chisenga et al. |
| 2014/0210485 A1 | 7/2014 | Lang et al. |
| 2014/0233136 A1* | 8/2014 | Heerdt ................ H02H 9/042 361/2 |
| 2014/0246915 A1 | 9/2014 | Mumtaz |
| 2014/0246927 A1 | 9/2014 | Mumtaz |
| 2014/0252859 A1 | 9/2014 | Chisenga et al. |
| 2014/0265551 A1 | 9/2014 | Willis |
| 2014/0265579 A1 | 9/2014 | Mumtaz |
| 2014/0265629 A1 | 9/2014 | Gazit et al. |
| 2014/0265638 A1 | 9/2014 | Orr et al. |
| 2014/0268913 A1 | 9/2014 | Zheng et al. |
| 2014/0277796 A1* | 9/2014 | Peskin ............ H02J 13/00034 700/291 |
| 2014/0293491 A1 | 10/2014 | Robbins |
| 2014/0306543 A1 | 10/2014 | Garrity et al. |
| 2014/0327313 A1 | 11/2014 | Arditi et al. |
| 2014/0327995 A1 | 11/2014 | Panjwani et al. |
| 2014/0354245 A1 | 12/2014 | Batikoff et al. |
| 2015/0022006 A1 | 1/2015 | Garrity et al. |
| 2015/0028683 A1 | 1/2015 | Hadar et al. |
| 2015/0028692 A1 | 1/2015 | Makhota et al. |
| 2015/0061409 A1 | 3/2015 | Dunton et al. |
| 2015/0069844 A1 | 3/2015 | Wu et al. |
| 2015/0100265 A1* | 4/2015 | Duchemin ............ F02D 41/28 702/98 |
| 2015/0131187 A1 | 5/2015 | Krein et al. |
| 2015/0161872 A1 | 6/2015 | Beaulieu et al. |
| 2015/0171789 A1 | 6/2015 | Har-Shai et al. |
| 2015/0188415 A1 | 7/2015 | Abido et al. |
| 2015/0214889 A1 | 7/2015 | Nam et al. |
| 2015/0236589 A1 | 8/2015 | Baba |
| 2015/0263609 A1 | 9/2015 | Weida et al. |
| 2015/0318410 A1 | 11/2015 | Higuma |
| 2015/0351264 A1 | 12/2015 | Linderman |
| 2015/0364918 A1 | 12/2015 | Singh et al. |
| 2015/0372490 A1 | 12/2015 | Bakas et al. |
| 2015/0381108 A1 | 12/2015 | Hoft et al. |
| 2015/0381111 A1 | 12/2015 | Nicolescu et al. |
| 2016/0006392 A1 | 1/2016 | Hoft |
| 2016/0036235 A1 | 2/2016 | Getsla |
| 2016/0126367 A1 | 5/2016 | Dunton et al. |
| 2016/0172900 A1 | 6/2016 | Welch, Jr. |
| 2016/0181802 A1 | 6/2016 | Jacobson et al. |
| 2016/0190931 A1 | 6/2016 | Zhang |
| 2016/0211841 A1 | 7/2016 | Harrison |
| 2016/0226252 A1 | 8/2016 | Kravtiz et al. |
| 2016/0226257 A1 | 8/2016 | Porter et al. |
| 2016/0241039 A1 | 8/2016 | Cheng et al. |
| 2016/0268809 A1 | 9/2016 | Ledenev et al. |
| 2016/0270245 A1 | 9/2016 | Linderman |
| 2016/0276820 A1 | 9/2016 | Olivas et al. |
| 2016/0293115 A1 | 10/2016 | Yamashita et al. |
| 2016/0329715 A1 | 11/2016 | Orr et al. |
| 2016/0336899 A1 | 11/2016 | Ledenev et al. |
| 2016/0380436 A1 | 12/2016 | Porter et al. |
| 2017/0104413 A1 | 4/2017 | Busch et al. |
| 2017/0138804 A1* | 5/2017 | Lebental .............. G01G 19/021 |
| 2017/0179876 A1 | 6/2017 | Freeman et al. |
| 2017/0179886 A1 | 6/2017 | Oishi et al. |
| 2017/0184343 A1 | 6/2017 | Freer et al. |
| 2017/0207746 A1 | 7/2017 | Yoscovich et al. |
| 2017/0211190 A1 | 7/2017 | Glasscock et al. |
| 2017/0222542 A1 | 8/2017 | Adest et al. |
| 2017/0271879 A1 | 9/2017 | Ledenev et al. |
| 2017/0278375 A1 | 9/2017 | Galin et al. |
| 2017/0288384 A1 | 10/2017 | Loewenstern et al. |
| 2017/0331325 A1 | 11/2017 | Ristau |
| 2018/0034411 A1* | 2/2018 | Charles .................. H02S 50/10 |
| 2018/0145593 A1 | 5/2018 | Xi et al. |
| 2018/0191292 A1 | 7/2018 | Ehlmann |
| 2018/0248513 A1 | 8/2018 | Höft |
| 2018/0287484 A1 | 10/2018 | Braginsky et al. |
| 2018/0351401 A1 | 12/2018 | Binder et al. |
| 2019/0379279 A1 | 12/2019 | Adest et al. |
| 2019/0393834 A1 | 12/2019 | Har-Shai et al. |
| 2020/0176937 A1 | 6/2020 | Azad |
| 2020/0279963 A1 | 9/2020 | Yoscovich et al. |
| 2020/0373841 A1 | 11/2020 | Xie et al. |
| 2021/0036557 A1 | 2/2021 | Haug et al. |

FOREIGN PATENT DOCUMENTS

| | | |
|---|---|---|
| AU | 2009202125 A1 | 12/2009 |
| AU | 2012225199 A1 | 10/2013 |
| CA | 1183574 A | 3/1985 |
| CA | 2063243 A1 | 12/1991 |
| CA | 2301657 A1 | 3/1999 |
| CA | 2394761 A1 | 6/2001 |
| CA | 2658087 A1 | 6/2001 |
| CA | 2443450 A1 | 3/2005 |
| CA | 2572452 A1 | 1/2006 |
| CA | 2613038 A1 | 1/2007 |
| CA | 2704605 A1 | 5/2009 |
| CA | 2702392 C | 9/2015 |
| CN | 2071396 U | 2/1991 |
| CN | 1106523 A | 8/1995 |
| CN | 2284479 Y | 6/1998 |
| CN | 1188453 A | 7/1998 |
| CN | 2305016 Y | 1/1999 |
| CN | 1236213 A | 11/1999 |
| CN | 1244745 A | 2/2000 |
| CN | 1262552 A | 8/2000 |
| CN | 1064487 C | 4/2001 |
| CN | 1309451 A | 8/2001 |
| CN | 1362655 A | 8/2002 |
| CN | 2514538 Y | 10/2002 |
| CN | 1122905 C | 10/2003 |
| CN | 2579063 Y | 10/2003 |
| CN | 1474492 A | 2/2004 |
| CN | 1523726 A | 8/2004 |
| CN | 1551377 A | 12/2004 |
| CN | 1185782 C | 1/2005 |
| CN | 2672668 Y | 1/2005 |
| CN | 2672938 Y | 1/2005 |
| CN | 1588773 A | 3/2005 |
| CN | 1201157 C | 5/2005 |
| CN | 1614854 A | 5/2005 |
| CN | 2706955 Y | 6/2005 |
| CN | 1245795 C | 3/2006 |
| CN | 1787717 A | 6/2006 |

(56) References Cited

FOREIGN PATENT DOCUMENTS

| | | | |
|---|---|---|---|
| CN | 1794537 A | 6/2006 |
| CN | 1838191 A | 9/2006 |
| CN | 1841254 A | 10/2006 |
| CN | 1841823 A | 10/2006 |
| CN | 1848588 A | 10/2006 |
| CN | 1892239 A | 1/2007 |
| CN | 1902809 A | 1/2007 |
| CN | 1929276 A | 3/2007 |
| CN | 1930925 A | 3/2007 |
| CN | 1933315 A | 3/2007 |
| CN | 2891438 Y | 4/2007 |
| CN | 101030752 A | 9/2007 |
| CN | 101050770 A | 10/2007 |
| CN | 101107712 A | 1/2008 |
| CN | 100371843 C | 2/2008 |
| CN | 101128974 A | 2/2008 |
| CN | 101136129 A | 3/2008 |
| CN | 101180781 A | 5/2008 |
| CN | 101257221 A | 9/2008 |
| CN | 100426175 C | 10/2008 |
| CN | 201167381 Y | 12/2008 |
| CN | 201203438 Y | 3/2009 |
| CN | 100487970 C | 5/2009 |
| CN | 101488271 A | 7/2009 |
| CN | 101521459 A | 9/2009 |
| CN | 101523230 A | 9/2009 |
| CN | 101647172 A | 2/2010 |
| CN | 101672252 A | 3/2010 |
| CN | 101697462 A | 4/2010 |
| CN | 101779291 A | 7/2010 |
| CN | 101847939 A | 9/2010 |
| CN | 201601477 U | 10/2010 |
| CN | 201623478 U | 11/2010 |
| CN | 201623651 U | 11/2010 |
| CN | 101902051 A | 12/2010 |
| CN | 101902171 A | 12/2010 |
| CN | 101904015 A | 12/2010 |
| CN | 201663167 U | 12/2010 |
| CN | 101939660 A | 1/2011 |
| CN | 101951011 A | 1/2011 |
| CN | 101951190 A | 1/2011 |
| CN | 101953051 A | 1/2011 |
| CN | 101953060 A | 1/2011 |
| CN | 101976855 A | 2/2011 |
| CN | 101980409 A | 2/2011 |
| CN | 102084584 A | 6/2011 |
| CN | 102089883 A | 6/2011 |
| CN | 102117815 A | 7/2011 |
| CN | 102148584 A | 8/2011 |
| CN | 201926948 U | 8/2011 |
| CN | 201956938 U | 8/2011 |
| CN | 202034903 U | 11/2011 |
| CN | 102273039 A | 12/2011 |
| CN | 202103601 U | 1/2012 |
| CN | 102362550 A | 2/2012 |
| CN | 102386259 A | 3/2012 |
| CN | 202178274 U | 3/2012 |
| CN | 102474112 A | 5/2012 |
| CN | 102565635 A | 7/2012 |
| CN | 102771017 A | 11/2012 |
| CN | 102845136 A | 12/2012 |
| CN | 202871823 U | 4/2013 |
| CN | 103227475 A | 7/2013 |
| CN | 103280768 A | 9/2013 |
| CN | 103299501 A | 9/2013 |
| CN | 203367304 U | 12/2013 |
| CN | 103548226 A | 1/2014 |
| CN | 103580463 A | 2/2014 |
| CN | 103875144 A | 6/2014 |
| CN | 104143916 A | 11/2014 |
| CN | 104158482 A | 11/2014 |
| CN | 104253585 A | 12/2014 |
| CN | 104488155 A | 4/2015 |
| CN | 104685785 A | 6/2015 |
| CN | 104779636 A | 7/2015 |
| CN | 105075046 A | 11/2015 |
| CN | 105164915 A | 12/2015 |
| CN | 105490298 A | 4/2016 |
| CN | 105553422 A | 5/2016 |
| CN | 205609261 U | 9/2016 |
| CN | 106093721 A | 11/2016 |
| CN | 207304483 U | 5/2018 |
| DE | 1161639 B | 1/1964 |
| DE | 3236071 A1 | 1/1984 |
| DE | 3525630 A1 | 1/1987 |
| DE | 3729000 A1 | 3/1989 |
| DE | 4019710 A1 | 1/1992 |
| DE | 4032569 A1 | 4/1992 |
| DE | 4041672 A1 | 6/1992 |
| DE | 9312710 U1 | 10/1993 |
| DE | 4232356 A1 | 3/1994 |
| DE | 4325436 A1 | 2/1995 |
| DE | 4328511 A1 | 3/1995 |
| DE | 19515786 A1 | 11/1995 |
| DE | 19502762 A1 | 8/1996 |
| DE | 19614861 A1 | 7/1997 |
| DE | 19609189 A1 | 9/1997 |
| DE | 19618882 A1 | 11/1997 |
| DE | 19701897 A1 | 7/1998 |
| DE | 19718046 A1 | 11/1998 |
| DE | 19732218 C1 | 3/1999 |
| DE | 19737286 A1 | 3/1999 |
| DE | 19838230 A1 | 2/2000 |
| DE | 19846818 A1 | 4/2000 |
| DE | 19859732 A1 | 6/2000 |
| DE | 19904561 C1 | 8/2000 |
| DE | 19928809 A1 | 1/2001 |
| DE | 019937410 A1 | 2/2001 |
| DE | 19961705 A1 | 7/2001 |
| DE | 10064039 A1 | 12/2001 |
| DE | 10060108 A1 | 6/2002 |
| DE | 10103431 A1 | 8/2002 |
| DE | 10136147 A1 | 2/2003 |
| DE | 10219956 A1 | 4/2003 |
| DE | 10222621 A1 | 11/2003 |
| DE | 202004001246 U1 | 4/2004 |
| DE | 10345302 A1 | 4/2005 |
| DE | 102004043478 A1 | 4/2005 |
| DE | 102004053942 A1 | 5/2006 |
| DE | 102004037446 A1 | 6/2006 |
| DE | 69734495 T2 | 7/2006 |
| DE | 69735169 T2 | 8/2006 |
| DE | 102005012213 A1 | 8/2006 |
| DE | 102005018173 A1 | 10/2006 |
| DE | 20 2005 020161 U1 | 11/2006 |
| DE | 102005036153 A1 | 12/2006 |
| DE | 102005030907 A1 | 1/2007 |
| DE | 102005032864 A1 | 1/2007 |
| DE | 102006023563 A1 | 11/2007 |
| DE | 102006026073 A1 | 12/2007 |
| DE | 202007002077 U1 | 4/2008 |
| DE | 102006060815 A1 | 6/2008 |
| DE | 602004011201 T2 | 12/2008 |
| DE | 102007051134 A1 | 3/2009 |
| DE | 202008012345 U1 | 3/2009 |
| DE | 102007037130 B3 | 4/2009 |
| DE | 102007050031 B3 | 4/2009 |
| DE | 202009007318 U1 | 8/2009 |
| DE | 102008042199 A1 | 4/2010 |
| DE | 102008057874 A1 | 5/2010 |
| DE | 102009051186 A1 | 5/2010 |
| DE | 102009022569 A1 | 12/2010 |
| DE | 102010023549 A1 | 12/2011 |
| DE | 202011109688 U1 | 3/2012 |
| DE | 102013101314 A1 | 8/2014 |
| DE | 102013106255 A1 | 12/2014 |
| DE | 102013106808 A1 | 12/2014 |
| DE | 102016117229 A1 | 3/2018 |
| EP | 0027405 A1 | 4/1981 |
| EP | 169673 A1 | 1/1986 |
| EP | 0178757 A2 | 4/1986 |
| EP | 0206253 A1 | 12/1986 |
| EP | 0231211 A1 | 8/1987 |
| EP | 0293219 A2 | 11/1988 |

(56) References Cited

FOREIGN PATENT DOCUMENTS

| | | | |
|---|---|---|---|
| EP | 0340006 A2 | 11/1989 |
| EP | 0418612 A1 | 3/1991 |
| EP | 419093 A2 | 3/1991 |
| EP | 420295 A1 | 4/1991 |
| EP | 0521467 A2 | 1/1993 |
| EP | 0576271 A2 | 12/1993 |
| EP | 0577334 A2 | 1/1994 |
| EP | 604777 A1 | 7/1994 |
| EP | 0628901 A2 | 12/1994 |
| EP | 0642199 A1 | 3/1995 |
| EP | 653692 A2 | 5/1995 |
| EP | 0670915 A1 | 9/1995 |
| EP | 677749 A2 | 10/1995 |
| EP | 0677749 A3 | 1/1996 |
| EP | 756178 A2 | 1/1997 |
| EP | 0756372 A1 | 1/1997 |
| EP | 0780750 A2 | 6/1997 |
| EP | 0809293 A1 | 11/1997 |
| EP | 824273 A2 | 2/1998 |
| EP | 827254 A2 | 3/1998 |
| EP | 0895146 A1 | 2/1999 |
| EP | 0906660 A1 | 4/1999 |
| EP | 0947904 A2 | 10/1999 |
| EP | 0947905 A2 | 10/1999 |
| EP | 964415 A1 | 12/1999 |
| EP | 964457 A2 | 12/1999 |
| EP | 0978884 A3 | 3/2000 |
| EP | 1012886 A1 | 6/2000 |
| EP | 1024575 A2 | 8/2000 |
| EP | 1034465 A1 | 9/2000 |
| EP | 1035640 A1 | 9/2000 |
| EP | 1039361 A1 | 9/2000 |
| EP | 1039620 A2 | 9/2000 |
| EP | 1039621 A2 | 9/2000 |
| EP | 1047179 A1 | 10/2000 |
| EP | 1130770 A2 | 9/2001 |
| EP | 1143594 A2 | 10/2001 |
| EP | 1187291 A2 | 3/2002 |
| EP | 1235339 A2 | 8/2002 |
| EP | 1239573 A1 | 9/2002 |
| EP | 1239576 A2 | 9/2002 |
| EP | 1254505 A2 | 11/2002 |
| EP | 1271742 A2 | 1/2003 |
| EP | 1291997 A2 | 3/2003 |
| EP | 1330009 A2 | 7/2003 |
| EP | 1339153 A2 | 8/2003 |
| EP | 1369983 A1 | 12/2003 |
| EP | 1376706 A2 | 1/2004 |
| EP | 1388774 A1 | 2/2004 |
| EP | 1400988 A2 | 3/2004 |
| EP | 1407534 A2 | 4/2004 |
| EP | 1120895 A3 | 5/2004 |
| EP | 1418482 A1 | 5/2004 |
| EP | 1429393 A2 | 6/2004 |
| EP | 1442473 A2 | 8/2004 |
| EP | 1447561 A1 | 8/2004 |
| EP | 1457857 A2 | 9/2004 |
| EP | 1463188 A2 | 9/2004 |
| EP | 1475882 A2 | 11/2004 |
| EP | 1503490 A1 | 2/2005 |
| EP | 1521345 A1 | 4/2005 |
| EP | 1526633 A2 | 4/2005 |
| EP | 1531542 A2 | 5/2005 |
| EP | 1531545 A2 | 5/2005 |
| EP | 1532727 A2 | 5/2005 |
| EP | 1552563 A2 | 7/2005 |
| EP | 1562281 A1 | 8/2005 |
| EP | 1580862 A1 | 9/2005 |
| EP | 1603212 A2 | 12/2005 |
| EP | 1610571 A2 | 12/2005 |
| EP | 1623495 A1 | 2/2006 |
| EP | 1642355 A2 | 4/2006 |
| EP | 0964457 A3 | 5/2006 |
| EP | 1657557 A1 | 5/2006 |
| EP | 1657797 A1 | 5/2006 |
| EP | 1684397 A2 | 7/2006 |
| EP | 1691246 A2 | 8/2006 |
| EP | 1706937 A1 | 10/2006 |
| EP | 1708070 A1 | 10/2006 |
| EP | 1716272 A1 | 11/2006 |
| EP | 1728413 A1 | 12/2006 |
| EP | 1734373 A2 | 12/2006 |
| EP | 1750193 A1 | 2/2007 |
| EP | 1766490 A1 | 3/2007 |
| EP | 1782146 A2 | 5/2007 |
| EP | 1785800 A1 | 5/2007 |
| EP | 1837985 A2 | 9/2007 |
| EP | 1842121 A2 | 10/2007 |
| EP | 1609250 B1 | 1/2008 |
| EP | 1887675 A2 | 2/2008 |
| EP | 1901419 A2 | 3/2008 |
| EP | 1902349 A2 | 3/2008 |
| EP | 1911101 A1 | 4/2008 |
| EP | 1914857 A1 | 4/2008 |
| EP | 2048679 A1 | 4/2009 |
| EP | 2054944 A2 | 5/2009 |
| EP | 2061088 A2 | 5/2009 |
| EP | 2092625 A2 | 8/2009 |
| EP | 2092631 A2 | 8/2009 |
| EP | 2130286 A1 | 12/2009 |
| EP | 2135296 A2 | 12/2009 |
| EP | 2135348 A2 | 12/2009 |
| EP | 2144133 A1 | 1/2010 |
| EP | 2179451 A1 | 4/2010 |
| EP | 2206159 A2 | 7/2010 |
| EP | 2232690 A1 | 9/2010 |
| EP | 2234237 A1 | 9/2010 |
| EP | 2249457 A1 | 11/2010 |
| EP | 2256819 A1 | 12/2010 |
| EP | 2315328 A2 | 4/2011 |
| EP | 2355268 A1 | 8/2011 |
| EP | 2374190 A1 | 10/2011 |
| EP | 2386122 A2 | 11/2011 |
| EP | 2393178 A2 | 12/2011 |
| EP | 2395648 A2 | 12/2011 |
| EP | 2495766 A1 | 9/2012 |
| EP | 2515424 A2 | 10/2012 |
| EP | 2533299 A1 | 12/2012 |
| EP | 2549635 A1 | 1/2013 |
| EP | 2561596 A2 | 2/2013 |
| EP | 2581941 A2 | 4/2013 |
| EP | 2615644 A2 | 7/2013 |
| EP | 2621045 A2 | 7/2013 |
| EP | 2666222 A1 | 11/2013 |
| EP | 2722979 A1 | 4/2014 |
| EP | 2779251 A1 | 9/2014 |
| EP | 3176933 A1 | 6/2017 |
| EP | 2139104 B1 | 10/2017 |
| EP | 3252909 A1 | 12/2017 |
| EP | 3382871 A1 | 10/2018 |
| ES | 2249147 A1 | 3/2006 |
| ES | 2249149 A1 | 3/2006 |
| FR | 2796216 A1 | 1/2001 |
| FR | 2819653 A1 | 7/2002 |
| FR | 2894401 A1 | 6/2007 |
| GB | 310362 A | 9/1929 |
| GB | 612859 A | 11/1948 |
| GB | 1211885 A | 11/1970 |
| GB | 1231961 A | 5/1971 |
| GB | 1261838 A | 1/1972 |
| GB | 1571681 A | 7/1980 |
| GB | 1597508 A | 9/1981 |
| GB | 2128017 A | 4/1984 |
| GB | 2327208 A | 1/1999 |
| GB | 2339465 A | 1/2000 |
| GB | 2376801 A | 12/2002 |
| GB | 2399463 A | 9/2004 |
| GB | 2399465 A | 9/2004 |
| GB | 2415841 A | 1/2006 |
| GB | 2419968 A | 5/2006 |
| GB | 2421847 A | 7/2006 |
| GB | 2434490 A | 7/2007 |
| GB | 2476508 A | 6/2011 |
| GB | 2480015 A | 11/2011 |

(56) References Cited

FOREIGN PATENT DOCUMENTS

| | | | |
|---|---|---|---|
| GB | 2480015 B | 12/2011 |
| GB | 2482653 A | 2/2012 |
| GB | 2483317 A | 3/2012 |
| GB | 2485527 A | 5/2012 |
| GB | 2486408 A | 6/2012 |
| GB | 2487368 A | 7/2012 |
| GB | 2497275 A | 6/2013 |
| GB | 2498365 A | 7/2013 |
| GB | 2498790 A | 7/2013 |
| GB | 2498791 A | 7/2013 |
| GB | 2499991 A | 9/2013 |
| IN | 101976952 A | 2/2011 |
| JP | S56042365 A | 4/1981 |
| JP | S60027964 A | 2/1985 |
| JP | S60148172 A | 8/1985 |
| JP | 61065320 A | 4/1986 |
| JP | 862154122 A | 7/1987 |
| JP | S62154121 A | 7/1987 |
| JP | H01311874 A | 12/1989 |
| JP | H04219982 A | 8/1992 |
| JP | H04364378 A | 12/1992 |
| JP | H05003678 A | 1/1993 |
| JP | H06035555 A | 2/1994 |
| JP | H06141261 A | 5/1994 |
| JP | H07026849 A | 1/1995 |
| JP | H07058843 A | 3/1995 |
| JP | H07-222436 A | 8/1995 |
| JP | H07322529 A | 12/1995 |
| JP | 8009557 A | 1/1996 |
| JP | H08033347 A | 2/1996 |
| JP | H08066050 A | 3/1996 |
| JP | H0897460 A | 4/1996 |
| JP | 08138754 A | 5/1996 |
| JP | H08116628 A | 5/1996 |
| JP | H08181343 A | 7/1996 |
| JP | H08185235 A | 7/1996 |
| JP | H08204220 A | 8/1996 |
| JP | H08227324 A | 9/1996 |
| JP | H08316517 A | 11/1996 |
| JP | H08317664 A | 11/1996 |
| JP | 097644 A | 1/1997 |
| JP | H094692 A | 1/1997 |
| JP | H09097918 A | 4/1997 |
| JP | H09148611 A | 6/1997 |
| JP | H09148613 A | 6/1997 |
| JP | H109275644 A | 10/1997 |
| JP | 2676789 B2 | 11/1997 |
| JP | H1017445 A | 1/1998 |
| JP | H1075580 A | 3/1998 |
| JP | H10201086 A | 7/1998 |
| JP | H10201105 A | 7/1998 |
| JP | H10308523 A | 11/1998 |
| JP | 11041832 A | 2/1999 |
| JP | H1146457 A | 2/1999 |
| JP | 11103538 A | 4/1999 |
| JP | 2892183 B2 | 5/1999 |
| JP | 11206038 A | 7/1999 |
| JP | H11266545 A | 9/1999 |
| JP | 11289891 A | 10/1999 |
| JP | 11318042 A | 11/1999 |
| JP | H11332088 A | 11/1999 |
| JP | 2000020150 A | 1/2000 |
| JP | 2000051074 A | 2/2000 |
| JP | 3015512 B2 | 3/2000 |
| JP | 2000-112545 A | 4/2000 |
| JP | 2000-116010 A | 4/2000 |
| JP | 2000160789 A | 6/2000 |
| JP | 2000166097 A | 6/2000 |
| JP | 2000174307 A | 6/2000 |
| JP | 2000232791 A | 8/2000 |
| JP | 2000232793 A | 8/2000 |
| JP | 2000316282 A | 11/2000 |
| JP | 2000324852 A | 11/2000 |
| JP | 2000339044 A | 12/2000 |
| JP | 2000341974 A | 12/2000 |
| JP | 2000347753 A | 12/2000 |
| JP | 2000358330 A | 12/2000 |
| JP | 200185716 A | 3/2001 |
| JP | 2001060120 A | 3/2001 |
| JP | 2001075662 A | 3/2001 |
| JP | 2001086765 A | 3/2001 |
| JP | 2001178145 A | 6/2001 |
| JP | 2001189476 A | 7/2001 |
| JP | 2001224142 A | 8/2001 |
| JP | 2001238466 A | 8/2001 |
| JP | 2001250964 A | 9/2001 |
| JP | 2001-320827 A | 11/2001 |
| JP | 2002073184 A | 3/2002 |
| JP | 2002231578 A | 8/2002 |
| JP | 2002238246 A | 8/2002 |
| JP | 2002-262461 A | 9/2002 |
| JP | 2002270876 A | 9/2002 |
| JP | 2002300735 A | 10/2002 |
| JP | 2002339591 A | 11/2002 |
| JP | 2002354677 A | 12/2002 |
| JP | 2003068312 A | 3/2003 |
| JP | 2003102134 A | 4/2003 |
| JP | 2003124492 A | 4/2003 |
| JP | 2003132959 A | 5/2003 |
| JP | 2003132960 A | 5/2003 |
| JP | 2003134661 A | 5/2003 |
| JP | 2003134667 A | 5/2003 |
| JP | 2003168487 A | 6/2003 |
| JP | 2003282916 A | 10/2003 |
| JP | 2003289674 A | 10/2003 |
| JP | 3499941 B2 | 2/2004 |
| JP | 2004047279 A | 2/2004 |
| JP | 2004055603 A | 2/2004 |
| JP | 2004-096090 A | 3/2004 |
| JP | 2004111754 A | 4/2004 |
| JP | 2004-147465 A | 5/2004 |
| JP | 2004194500 A | 7/2004 |
| JP | 2004260944 A | 9/2004 |
| JP | 2004-334704 A | 11/2004 |
| JP | 2004312994 A | 11/2004 |
| JP | 2005-151662 A | 6/2005 |
| JP | 3656531 B2 | 6/2005 |
| JP | 2005192314 A | 7/2005 |
| JP | 2005-235082 A | 9/2005 |
| JP | 2005251039 A | 9/2005 |
| JP | 2005-276942 A | 10/2005 |
| JP | 2005283516 A | 10/2005 |
| JP | 2005-312287 A | 11/2005 |
| JP | 2006041440 A | 2/2006 |
| JP | 2006262619 A | 9/2006 |
| JP | 2006271083 A | 10/2006 |
| JP | 2006278755 A | 10/2006 |
| JP | 2007058845 A | 3/2007 |
| JP | 2007104872 A | 4/2007 |
| JP | 2007225625 A | 9/2007 |
| JP | 4174227 B2 | 10/2008 |
| JP | 2010-146047 A | 7/2010 |
| JP | 2010245532 A | 10/2010 |
| JP | 2011-055634 A | 3/2011 |
| JP | 2011-249790 A | 12/2011 |
| JP | 2012-60714 A | 3/2012 |
| JP | 2012511299 A | 5/2012 |
| JP | 2012178535 A | 9/2012 |
| JP | 2015-233386 A | 12/2015 |
| KR | 20010044490 A | 6/2001 |
| KR | 20030050390 A | 6/2003 |
| KR | 20040086088 A | 10/2004 |
| KR | 100468127 B1 | 1/2005 |
| KR | 200402282 Y1 | 11/2005 |
| KR | 20060060825 A | 6/2006 |
| KR | 20070036528 A | 4/2007 |
| KR | 100725755 B1 | 5/2007 |
| KR | 20080092747 A | 10/2008 |
| KR | 100912892 B1 | 8/2009 |
| KR | 101073143 B1 | 10/2011 |
| NL | 1011483 C2 | 9/2000 |
| NO | 2007007360 A2 | 1/2007 |
| TW | 497326 B | 8/2002 |
| TW | 200913291 A | 3/2009 |

(56) References Cited

FOREIGN PATENT DOCUMENTS

| | | |
|---|---|---|
| WO | 8202134 A1 | 6/1982 |
| WO | 1982002134 A1 | 6/1982 |
| WO | 1984003402 A1 | 8/1984 |
| WO | 1988004801 A1 | 6/1988 |
| WO | 9003680 A1 | 4/1990 |
| WO | 1992007418 A1 | 4/1992 |
| WO | 1993013587 A1 | 7/1993 |
| WO | 95/25374 A1 | 9/1995 |
| WO | 95/34121 A1 | 12/1995 |
| WO | 1996007130 A1 | 3/1996 |
| WO | 1996013093 A1 | 5/1996 |
| WO | 1998023021 A2 | 5/1998 |
| WO | 1999028801 A1 | 6/1999 |
| WO | 00/00839 A1 | 1/2000 |
| WO | 00/21178 A1 | 4/2000 |
| WO | 0042689 A1 | 7/2000 |
| WO | 0075947 A1 | 12/2000 |
| WO | 0077522 A1 | 12/2000 |
| WO | 01/13502 A1 | 2/2001 |
| WO | 01047095 A2 | 6/2001 |
| WO | 02/17469 A1 | 2/2002 |
| WO | 0231517 | 4/2002 |
| WO | 02056126 A1 | 7/2002 |
| WO | 2002073785 A1 | 9/2002 |
| WO | 0278164 A1 | 10/2002 |
| WO | 02078164 A1 | 10/2002 |
| WO | 02093655 A1 | 11/2002 |
| WO | 03012569 A1 | 2/2003 |
| WO | 2003012569 A1 | 2/2003 |
| WO | 03/026114 A2 | 3/2003 |
| WO | 2003036688 A2 | 5/2003 |
| WO | 2003050938 A2 | 6/2003 |
| WO | 2003071655 A1 | 8/2003 |
| WO | 03084041 A1 | 10/2003 |
| WO | 2003098703 | 11/2003 |
| WO | 2004001942 A1 | 12/2003 |
| WO | 2004006342 A1 | 1/2004 |
| WO | 2004008619 A2 | 1/2004 |
| WO | 2004023278 A2 | 3/2004 |
| WO | 2004053993 A1 | 6/2004 |
| WO | 2004090993 A2 | 10/2004 |
| WO | 2004098261 A2 | 11/2004 |
| WO | 2004100344 A2 | 11/2004 |
| WO | 2004100348 A1 | 11/2004 |
| WO | 2004107543 A2 | 12/2004 |
| WO | 2005015584 A2 | 2/2005 |
| WO | 2005027300 A1 | 3/2005 |
| WO | 2005036725 A1 | 4/2005 |
| WO | 2005053189 A1 | 6/2005 |
| WO | 2005069096 A1 | 7/2005 |
| WO | 2005076444 A1 | 8/2005 |
| WO | 2005076445 A1 | 8/2005 |
| WO | 2005089030 A1 | 9/2005 |
| WO | 2005112551 A2 | 12/2005 |
| WO | 2005119278 A1 | 12/2005 |
| WO | 2005119609 A2 | 12/2005 |
| WO | 2005124498 A1 | 12/2005 |
| WO | 2006002380 A2 | 1/2006 |
| WO | 2006005125 A1 | 1/2006 |
| WO | 2006007198 A1 | 1/2006 |
| WO | 2006011071 A2 | 2/2006 |
| WO | 2006011359 A1 | 2/2006 |
| WO | 2006013600 A2 | 2/2006 |
| WO | 2006033143 A1 | 3/2006 |
| WO | 2006045016 A2 | 4/2006 |
| WO | 2006/013600 A3 | 5/2006 |
| WO | 2006048688 A1 | 5/2006 |
| WO | 2006048689 A2 | 5/2006 |
| WO | 2006/074561 A1 | 7/2006 |
| WO | 2006071436 A2 | 7/2006 |
| WO | 2006078685 A2 | 7/2006 |
| WO | 2006079503 A2 | 8/2006 |
| WO | 2006089778 A2 | 8/2006 |
| WO | 2006110613 A2 | 10/2006 |
| WO | 2006/125664 A1 | 11/2006 |
| WO | 2006117551 A2 | 11/2006 |
| WO | 2006130520 A2 | 12/2006 |
| WO | 2006137948 A2 | 12/2006 |
| WO | 2007006564 A2 | 1/2007 |
| WO | 2007010326 A1 | 1/2007 |
| WO | 2007/020419 A1 | 2/2007 |
| WO | 2007048421 A2 | 5/2007 |
| WO | 2007072517 A1 | 6/2007 |
| WO | 2007073951 A1 | 7/2007 |
| WO | 2007080429 A2 | 7/2007 |
| WO | 2007084196 A2 | 7/2007 |
| WO | 2007090476 A2 | 8/2007 |
| WO | 2006124130 A9 | 10/2007 |
| WO | 2007113358 A1 | 10/2007 |
| WO | 2007124518 A1 | 11/2007 |
| WO | 2007129808 A1 | 11/2007 |
| WO | 2007142693 A2 | 12/2007 |
| WO | 2008008528 A2 | 1/2008 |
| WO | 2008026207 A2 | 3/2008 |
| WO | 2008/046370 A1 | 4/2008 |
| WO | 2008077473 A2 | 7/2008 |
| WO | 2008069926 A3 | 8/2008 |
| WO | 2008097591 A2 | 8/2008 |
| WO | 2008119034 A1 | 10/2008 |
| WO | 2008121266 A2 | 10/2008 |
| WO | 2008125915 A2 | 10/2008 |
| WO | 2008132551 A2 | 11/2008 |
| WO | 2008132553 A2 | 11/2008 |
| WO | 2008142480 A2 | 11/2008 |
| WO | 2009003680 A1 | 1/2009 |
| WO | 2009006879 A2 | 1/2009 |
| WO | 2009007782 A2 | 1/2009 |
| WO | 2009011780 A2 | 1/2009 |
| WO | 2009020917 A2 | 2/2009 |
| WO | 2009/026602 A1 | 3/2009 |
| WO | 2009007782 A3 | 3/2009 |
| WO | 2009046533 A1 | 4/2009 |
| WO | 2009051221 A1 | 4/2009 |
| WO | 2009051222 A1 | 4/2009 |
| WO | 2009051853 A1 | 4/2009 |
| WO | 2009051854 A1 | 4/2009 |
| WO | 2009051870 A1 | 4/2009 |
| WO | 2009055474 A1 | 4/2009 |
| WO | 2009/059877 A1 | 5/2009 |
| WO | 2009056957 A2 | 5/2009 |
| WO | 2009059028 A2 | 5/2009 |
| WO | 2009064683 A2 | 5/2009 |
| WO | 2009/072075 A2 | 6/2009 |
| WO | 2009/073867 A1 | 6/2009 |
| WO | 2009072076 A2 | 6/2009 |
| WO | 2009072077 A1 | 6/2009 |
| WO | 2009073868 A1 | 6/2009 |
| WO | 2009073995 A1 | 6/2009 |
| WO | 2009075985 A2 | 6/2009 |
| WO | 2009/075985 A3 | 7/2009 |
| WO | 2009098729 A1 | 8/2009 |
| WO | 2009114341 A2 | 9/2009 |
| WO | 2009118682 A2 | 10/2009 |
| WO | 2009118683 A2 | 10/2009 |
| WO | 2009118683 A3 | 11/2009 |
| WO | 2009136358 A1 | 11/2009 |
| WO | 2009140536 A2 | 11/2009 |
| WO | 2009140539 A2 | 11/2009 |
| WO | 2009140543 A2 | 11/2009 |
| WO | 2009140551 A2 | 11/2009 |
| WO | 2009118682 A3 | 12/2009 |
| WO | 2009155392 A1 | 12/2009 |
| WO | 2010/002960 A1 | 1/2010 |
| WO | 2010/003941 A2 | 1/2010 |
| WO | 2009136358 A4 | 1/2010 |
| WO | 2009/140536 A3 | 2/2010 |
| WO | 2009/140543 A3 | 2/2010 |
| WO | 2009/140551 A3 | 2/2010 |
| WO | 2010014116 A1 | 2/2010 |
| WO | 2010020385 A2 | 2/2010 |
| WO | 2010/042124 A1 | 4/2010 |
| WO | 2010037393 A1 | 4/2010 |
| WO | 2010056777 A1 | 5/2010 |
| WO | 2010/071855 A2 | 6/2010 |

(56) References Cited

FOREIGN PATENT DOCUMENTS

| | | | |
|---|---|---|---|
| WO | 2010062410 A1 | 6/2010 | |
| WO | 2010062662 A2 | 6/2010 | |
| WO | 2010065043 A1 | 6/2010 | |
| WO | 2010065388 A1 | 6/2010 | |
| WO | 2010072717 A1 | 7/2010 | |
| WO | 2010078303 A2 | 7/2010 | |
| WO | 2010080672 A2 | 7/2010 | |
| WO | 2010091025 A2 | 8/2010 | |
| WO | 2010094012 A1 | 8/2010 | |
| WO | 2010118503 A1 | 10/2010 | |
| WO | 2010120315 A1 | 10/2010 | |
| WO | 2010/132369 A1 | 11/2010 | |
| WO | 2010134057 A1 | 11/2010 | |
| WO | 20100134057 A1 | 11/2010 | |
| WO | 2011005339 A1 | 1/2011 | |
| WO | 2011011711 A2 | 1/2011 | |
| WO | 2011014275 A1 | 2/2011 | |
| WO | 2011017721 A1 | 2/2011 | |
| WO | 2011019936 A1 | 2/2011 | |
| WO | 2011023732 A2 | 3/2011 | |
| WO | 2011028456 A2 | 3/2011 | |
| WO | 2011028457 A2 | 3/2011 | |
| WO | 2011044641 A1 | 4/2011 | |
| WO | 2011049985 A1 | 4/2011 | |
| WO | 2011059067 A1 | 5/2011 | |
| WO | 2011074025 A1 | 6/2011 | |
| WO | 2011076707 A2 | 6/2011 | |
| WO | 2011085259 A2 | 7/2011 | |
| WO | 2011089607 A1 | 7/2011 | |
| WO | 2011109746 A2 | 9/2011 | |
| WO | 2011119587 A2 | 9/2011 | |
| WO | 2011133843 A2 | 10/2011 | |
| WO | 2011133928 A2 | 10/2011 | |
| WO | 2011151672 A1 | 12/2011 | |
| WO | 2012024538 A3 | 5/2012 | |
| WO | 2012100263 A2 | 7/2012 | |
| WO | 2013015921 A1 | 1/2013 | |
| WO | 2013019899 A2 | 2/2013 | |
| WO | 2013064828 A1 | 5/2013 | |
| WO | 2013130563 A1 | 9/2013 | |
| WO | 2014143021 A1 | 9/2014 | |
| WO | 2017/125375 A1 | 7/2017 | |
| WO | 2018122835 A1 | 7/2018 | |

OTHER PUBLICATIONS

Mar. 5-9, 1995—Naik et al., A Novel Grid Interface for Photovoltaic, Wind-Electric, and Fuel-Cell Systems With a Controllable Power Factor or Operation, IEEE, 1995, pp. 995-998.
Petkanchin, Processes following changes of phase angle between current and voltage in electric circuits, Aug. 1999, Power Engineering Review, IEEE vol. 19, Issue 8, pp. 59-60.
Mumtaz, Asim, et al., "Grid Connected PV Inverter Using a Commercially Available Power IC," PV in Europe Conference, Oct. 2002, 3 pages, Rome, Italy.
Koutroulis, Eftichios, et al., "Development of a Microcontroller-Based, Photovoltaic Maximum Power Point Tracking Control System," IEEE Transactions on Power Electronics, Jan. 2001, pp. 46-54, vol. 16, No. 1, IEEE.
European Search Report—EP App. 14159457.2—mailed Jun. 12, 2015.
European Search Report and Written Opinion—EP Appl. 12150819.6—dated Jul. 6, 2015.
Alonso, O. et al. "Cascaded H-Bridge Multilevel Converter for Grid Connected Photovoltaic Generators With Independent Maximum Power Point Tracking of Each Solar Array." IEEE 34th Annual Power Electronics Specialists Conference. vol. 2, Jun. 15, 2003.
Alonso, et al., "Cascaded H-Bridge Multilevel Converter for Grid Connected Photovoltaic Generators with Independent Maximum Power Point Tracking of Each Solar Array", 2003 IEEE 34th, Annual Power Electronics Specialists Conference, Acapulco, Mexico, Jun. 15-19, 2003, pp. 731-735, vol. 2.
Chinese Office Action—CN Appl. 201280006369.2—dated Aug. 4, 2015.
Chinese Office Action—CN Appl. 201210253614.1—dated Aug. 18, 2015.
Extended European Search Report, EP Application 04753488.8, mailed Apr. 29, 2015.
International Search Report from PCT/US04/16668, form PCT/ISA/220, filing date May 27, 2004.
Office Action U.S. Appl. No. 13/785,857, dated Jun. 6, 2013.
Partial Extended European Search Report, EP Application 04753488.8, mailed Feb. 2, 2015.
The International Search Report (Form PCT /ISA/220) Issued in corresponding international application No. PCT/US04/16668, filed May 27, 2004.
International Search Report—PCT/US2004/016668, form PCT/ISA/220—filing date May 27, 2004—mailed Jan. 19, 2005.
Written Opinion of the International Searching Authority—PCT/US2004/016668, form PCT/ISA/220—filing date May 27, 2004—mailed Jan. 19, 2005.
Extended European Search Report—EP Appl. 04753488.8—mailed Apr. 29, 2015.
Supplementary Partial European Search Report—EP Appl. 04753488.8—mailed Feb. 2, 2015.
US Office Action—U.S. Appl. No. 13/785,857—mailed Jun. 6, 2013.
European Office Action—EP Appl. 09725443.7—dated Aug. 18, 2015.
Definition of Isomorphism by Merriam-Webster, <http://www.merriaum-webster.com/dictionary/isomorphism, dated Oct. 20, 2015.
Definition of Isomorphic by Merriam-Webster, <http://www.merriam-webster.com/dictionary/isomorphic, dated Oct. 20, 2015.
Chinese Office Action—CN Appl. 201110349734.7—dated Oct. 13, 2015.
Chinese Office Action—CN Appl. 201210007491.3—dated Nov. 23, 2015.
European Office Action—EP Appl. 12176089.6—dated Dec. 16, 2015.
Chinese Office Action—CN Appl. 201310035223.7—dated Dec. 29, 2015.
Chinese Office Action—CN Application 201210334311.2—dated Jan. 20, 2016.
European Search Report—EP Appl. 13800859.4—mailed Feb. 15, 2016.
Chinese Office Action—CN App. 201310035221.8—mailed Mar. 1, 2016.
PCT/2008/058473 International Preliminary Report, 6 pages, Nov. 2, 2009.
International Search Report and Written Opinion, WO 2010080672, dated Aug. 19, 2010.
PCT/US2010/045352 International Search Report and Written Opinion; 12 pages; Oct. 26, 2010.
International Search Report and Written Opinion mailed Feb. 6, 2009,. In counteprart PCT/US2008/008451, 13 pages.
European Search Report: dated Jan. 10, 2013 in corresponding EP application No. 09838022.3, 7 pages.
D. Ton and W. Bower; Summary Report of the DOE High-Tech Inverter Workshop; Jan. 2005.
First Action Interview Pre-Interview Communication from U.S. Appl. No. 13/174,495 mailed Jun. 18, 2014, 7 pgs.
Johnson et al., "Arc-fault detector algorithm evaluation method utilizing prerecorded arcing signatures", Photovoltaic Specialists Conference (PVSC), Jun. 2012.
Aug. 6, 2007—Philippe Welter, et al. "Electricity at 32 kHz," Photon International, The Photovoltaic Magazine, Http://www.photon-magazine.com/archiv/articles.aspx?criteria=4&HeftNr=0807 &Title=Elec . . . printed May 27, 2011).
PCT/US2009/069582 Int. Search Report—dated Aug. 19, 2010.
Chinese Office Action—CN Appl. 201210007491.3—mailed Apr. 25, 2016.
CN Office Action—CN Appl. 201310004123.8—dated May 5, 2016.

(56) References Cited

OTHER PUBLICATIONS

Law et al, "Design and Analysis of Switched-Capacitor-Based Step-Up Resonant Converters," IEEE Transactions on Circuits and Systems, vol. 52, No. 5, published May 2005.
CN Office Action—CN Appl. 201310066888.4—dated May 30, 2016.
European Search Report—EP Appl. 13152966.1—dated Jul. 21, 2016.
European Search Report—EP Appl. 12183811.4—dated Aug. 4, 2016.
European Notice of Opposition—EP Patent 2374190—dated Jul. 19, 2016.
"Es werde Dunkelheit. Freischaltung von Solarmodulen im Brandfall"—"Let there be Darkness: Quality control of Solar Modules in Case of Fire"; Photon, May 2005, 75-77, ISSN 1430-5348, English translation provided.
Chinese Office Action—CN Appl. 201380029450.7—dated Jul. 28, 2016.
QT Technical Application Papers, "ABB Circuit Breakers for Direct current Applications", Abb SACE S.p.A., An ABB Group Company, L.V. Breakers, Via Baioni, 35, 24123 Bergamo-Italy, Tel.: +39 035.395.111—Telefax: +39 035.395.306-433, Sep. 2007.
Woyte, et al., "Mains Monitoring and Protection in a European Context", 17th European Photovoltaic Solar Energy Conference and Exhibition, Munich, Germany, Oct. 22-26, 2001, Achim, Woyte, et al., pp. 1-4.
"Implementation and testing of Anti-Islanding Algorithms for IEEE 929-2000 Compliance of Single Phase Photovoltaic Inverters", Raymond M. Hudson, Photovoltaic Specialists Conference, 2002. Conference Record of the Twenty-Ninth IEEE, May 19-24, 2002.
Fairchild Semiconductor, Application Note 9016, IGBT Basics 1, by K.S. Oh Feb. 1, 2001.
"Disconnect Switches in Photovoltaic Applications", ABB, Inc., Low Voltage Control Products & Systems, 1206 Hatton Road, Wichita Falls, TX 86302, Phone 888-385-1221, 940-397-7000, Fax: 940-397-7085, 1SXU301197B0201, Nov. 2009.
Walker, "A DC Circuit Breaker for an Electric Vehicle Battery Pack", Australasian Universities Power Engineering Conference and IEAust Electric Energy Conference, Sep. 26-29, 1999.
Combined Search and Examination Report for GB1018872.0 dated Apr. 15, 2011, 2 pages.
International Search Report and Opinion of International Patent Application PCT/2009/051221, dated Oct. 19, 2009.
International Search Report and Opinion of International Patent Application PCT/2009/051222, dated Oct. 7, 2009.
Communication in EP07874025.5 dated Aug. 17, 2011.
IPRP for PCT/IB2008/055095 dated Jun. 8, 2010, with Written Opinion.
ISR for PCT/IB2008/055095 dated Apr. 30, 2009.
ISR for PCT/IL07/01064 dated Mar. 25, 2008.
IPRP for PCT/IB2007/004584 dated Jun. 10, 2009, with Written Opinion.
IPRP for PCT/IB2007/004591 dated Jul. 13, 2010, with Written Opinion.
IPRP for PCT/IB2007/004643 dated Jun. 10, 2009, with Written Opinion.
Written Opinion for PCT/IB2008/055092 submitted with IPRP dated Jun. 8, 2010.
IPRP for PCT/US2008/085754 dated Jun. 8, 2010, with Written Opinion dated Jan. 21, 2009.
IPRP for PCT/US2008/085755 dated Jun. 8, 2010, with Written Opinion dated Jan. 20, 2009.
IPRP for PCT/IB2009/051221 dated Sep. 28, 2010, with Written Opinion.
IPRP for PCT/IB2009/051222 dated Sep. 28, 2010, with Written Opinion.
IPRP for PCT/IB2009/051831 dated Nov. 9, 2010, with Written Opinion.
IPRP for PCT/US2008/085736 dated Jun. 7, 2011, with Written Opinion.
IPRP for PCT/IB2010/052287 dated Nov. 22, 2011, with Written Opinion.
ISR for PCT/IB2010/052413 dated Sep. 7, 2010.
UK Intellectual Property Office, Application No. GB1109618.7, Patents Act 1977, Examination Report Under Section 18(3), Sep. 16, 2011.
UK Intellectual Property Office, Patents Act 1977: Patents Rules Notification of Grant: Patent Serial No. GB2480015, Nov. 29, 2011.
Walker, et al. "PV String Per-Module Maximum Power Point Enabling Converters", School of Information Technology and Electrical Engineering The University of Queensland, Sep. 28, 2003.
Walker, "Cascaded DC-DC Converter Connection of Photovoltaic Modules", 33rd Annual IEEE Power Electronics Specialists Conference. PESC 2002. Conference Proceedings. Cairns, Queensland, Australia, Jun. 23-27, 2002; [Annual Power Electronics Specialists Conference], New York, NY: IEEE US, vol. 1, Jun. 23, 2002, pp. 24-29, XP010596060 ISBN: 978-0-7803-7262-7, figure 1.
Baggio, "Quasi-ZVS Activity Auxiliary Commutation Circuit for Two Switches Forward Converter", 32nd Annual IEEE Power Electronics Specialists Conference. PESC 2001. Conference Proceedings. Vancouver, Canada, Jun. 17-21, 2001; [Annual Power Electronics Specialists Conference] New York, NY: IEEE, US.
Ilic, "Interleaved Zero-Current-Transition Buck Converter", IEEE Transactions on Industry Applications, IEEE Service Center, Piscataway, NJ, US, vol. 43, No. 6, Nov. 1, 2007, pp. 1619-1627, XP011197477 ISSN: 0093-9994, bages 1619-1922.
Lee: "Novel Zero-Voltage-Transition and Zero-Current-Transition Pulse-Width-Modulation Converters", Power Electronics Specialists Conference, 1997, PESC '97, Record, 28th Annual IEEE St. Louis, MO, USA, Jun. 22-27, 1997, New York, NY, USA IEEE, US, vol. 1, Jun. 22, 1997, pp. 233-239, XP010241553, ISBN: 978-0-7803-3840-1, pp. 233-236.
Sakamoto, "Switched Snubber for High-Frequency Switching Converters", Electronics & Communications in Japan, Part 1—Communications, Wiley, Hoboken, NJ, US, vol. 76, No. 2, Feb. 1, 1993, pp. 30-38, XP000403018 ISSN: 8756-6621, pp. 30-35.
Duarte, "A Family of ZVX-PWM Active-Clamping DC-to-DC Converters: Synthesis, Analysis and Experimentation", Telecommunications Energy Conference, 1995, INTELEC '95, 17th International The Hague, Netherlands, Oct. 29-Nov. 1, 1995, New York, NY, US, IEEE, US, Oct. 29, 1995, pp. 502-509, XP010161283 ISBN: 978-0-7803-2750-4 p. 503-504.
IPRP for PCT/IL2007/001064 dated Mar. 17, 2009, with Written Opinion dated Mar. 25, 2008.
IPRP for PCT/IB2007/004586 dated Jun. 10, 2009, with Written Opinion.
Gao, et al., "Parallel-Connected Solar PV System to Address Partial and Rapidly Fluctuating Shadow Conditions", IEEE Transactions on Industrial Electronics, vol. 56, No. 5, May 2009, pp. 1548-1556.
IPRP PCT/IB2007/004610—date of issue Jun. 10, 2009.
Extended European Search Report—EP12176089.6—Mailing date: Nov. 8, 2012.
Gwon-Jong Yu et al: "Maximum power point tracking with temperature compensation of photovoltaic for air conditioning system with fuzzy controller", May 13, 1996; May 13, 1996-May 17, 1996, May 13, 1996 (May 13, 1996), pp. 1429-1432, XP010208423.
Extended European Search Report—EP12177067.1—Mailing Date: Dec. 7, 2012.
GB Combined Search and Examination Report—GB1200423.0—Mailing date: Apr. 30, 2012.
GB Combined Search and Examination Report—GB1201499.9—Mailing date: May 28, 2012.
GB Combined Search and Examination Report—GB1201506.1—Mailing date: May 22, 2012.
"Study of Energy Storage Capacitor Reduction for Single Phase PWM Rectifier", Ruxi Wang et al., Virginia Polytechnic Institute and State University, Feb. 2009.
"Multilevel Inverters: A Survey of Topologies, Controls, and Applications", José Rodríguez et al., IEEE Transactions on Industrial Electronics, vol. 49, No. 4, Aug. 2002.
Extended European Search Report—EP 08878650.4—Mailing date: Mar. 28, 2013.

(56) References Cited

OTHER PUBLICATIONS

Satcon Solstice—Satcon Solstice 100 kW System Solution Sheet—2010.
John Xue, "PV Module Series String Balancing Converters", University of Queensland—School of Information Technology & Electrical Engineering, Nov. 6, 2002.
Robert W. Erickson, "Future of Power Electronics for Photovoltaics", IEEE Applied Power Electronics Conference, Feb. 2009.
Chinese Office Action—CN Appl. 201310035221.8—dated Aug. 11, 2016.
Zhou, Wilson and Theo Phillips—"Industry's First 4-Switch Buck-Boost Controller Achieves Highest Efficiency Using a Single Inducutor—Design Note 369"—Linear Technology Corporation—www.linear.com—2005.
"Micropower Synchronous Buck-Boost DC/DC Converter"—Linear Technology Corporation—www.linear.com/LTC3440—2001.
Mar. 5-9, 1995—Caricchi, F. et al.—20 kW Water-Cooled Prototype of a Buck-Boost Bidirectional DC-DC Converter Topology for Electrical Vehicle Motor Drives—University of Rome—IEEE 1995—pp. 887-892.
Roy, Arunanshu et al—"Battery Charger using Bicycle"—EE318 Electronic Design Lab Project Report, EE Dept, IIT Bombay, Apr. 2006.
Jun. 20-25, 2004—Viswanathan, K. et al—Dual-Mode Control of Cascade Buck-Boost PFC Converter—35th Annual IEEE Power Electronics Specialists Conference—Aachen, Germany, 2004.
Zhang, Pei et al.—"Hardware Design Experiences in ZebraNet"—Department of Electrical Engineering, Princeton University—SenSys '04, Nov. 3-5, 2004.
"High Efficiency, Synchronous, 4-Switch Buck-Boost Controller"—Linear Technology Corporation—www.linear.com/LTC3780—2005.
May 19-24, 2002—Chomsuwan, Komkrit et al. "Photovoltaic Grid-Connected Inverter Using Two-Switch Buck-Boost Converter"—Department of Electrical Engineering, King Mongkut's Institute of Technology Ladkrabang, Thailand, National Science and Technology Development Agency, Thailand—IEEE—2002.
Midya, Pallab et al.—"Buck or Boost Tracking Power Converter"—IEEE Power Electronics Letters, vol. 2, No. 4—Dec. 2004.
Chinese Office Action—CN Appl. 201510111948.9—dated Sep. 14, 2016.
Chinese Office Action—CN Appl. 201310066888.4—dated Nov. 2, 2016.
"Power-Switching Converters—the Principle, Simulation and Design of the Switching Power (the Second Edition)", Ang, Oliva, et al., translated by Xu Dehong, et al., China Machine Press, Aug. 2010, earlier publication 2005.
European Notice of Opposition—EP Patent 2092625—mailed Nov. 29, 2016.
Mar. 8, 2003—Vishay Siliconix "Si 7884DP—n-Channel 40-V (D-S) MOSFET" (2003).
Chinese Office Action—CN 201510423458.2—mailed Jan. 3, 2017 (english translation provided).
Chinese Office Action—CN 201410098154.9—mailed Mar. 3, 2017 (english translation provided).
European Search Report—EP Appl. 13150911.9—Apr. 7, 2017.
Howard et al., "Relaxation on a Mesh: a Formalism for Generalized Localization." Proceedings of the IEEE/RSJ International Conference on Intelligent Robots and Systems (IROS 2001). Wailea, Hawaii, Oct. 2001.
Chinese Office Action and Search Report—CN 201510578586.4—mailed Apr. 19, 2017.
Jul. 13, 2017—Chinese Office Action—CN201210007491.3.
Jul. 31, 2014—Huimin Zhou et. al—"PV Balancers: Concept, Architectures, and Realization"—IEEE Transactions on Power Electronics, vol. 30, No. 7, pp. 3479-3487.
Sep. 15, 2012—Huimin Zhou et al.—"PV balancers: Concept, architectures, and realization"—Energy Conversion Congress and Exposition (ECCE), 2012 IEEE, IEEE pp. 3749-3755.

Jul. 17, 2017—International Search Report—PCT/US2017/031571.
Aug. 4, 2017—European Search Report—EP 17165027.
Jul. 19, 2016—Notice of Opposition—EP 2374190—EP App No. 08878650.4.
Sep. 28, 2017—European Office Action—EP 08857835.6.
Nov. 2, 2017—EP Search Report App No. 13157876.7.
Nov. 11, 2017—EP Search Report—App No. 17171489.2.
Dec. 14, 2017—EP Search Report App No. 17188362.2.
Dec. 15, 2017—EP Search Report App No. 17188365.5.
2000; Bascope, G.V.T. Barbi, I; "Generation of Family of Non-isolated DC-DC PWM Converters Using New Three-state Switching Cells"; 2000 IEEE 31st Annual Power Electronics Specialists Conference in Galway, Ireland; vol. 2.
Jan. 20, 2005; Duncan, Joseph, A Global Maximum Power Point Tracking DC-DC Converter, Massachussetts Institute of Technology, Dept. of Electrical Engineering and Computer Science Dissertation; 8 pages.
2005; Edelmoser, K.H et al.; High Efficiency DC-to-AC Power Inverter with Special DC Interface; Professional Paper, ISSN 0005-1144, Automatika 46 (2005) 3-4, 143-148, 6 pages.
2006; Esmaili, Gholamreza; "Application of Advanced Power Electornics in Renewable Energy Sources and Hygrid Generating Systems" Ohio State Univerty, Graduate Program in Electrical and Computer Engineering, Dissertation. 169 pages.
Nov. 13, 2007; Gomez, M; "Consulting in the Solar Power Age," IEEE-CNSV: Consultants' Network of Scilion Valley; 30 pages.
Jul. 25, 1995—Jun. 30, 1998; Kern, G; "SunSine (TM)300: Manufacture of an AC Photovoltaic Module," Final Report, Phases I & II; National Renewable Energy Laboratory, Mar. 1999; NREL-SR-520-26085; 33 pages.
May 1, 2000; Kroposki, H. Thomas and Witt, B & C; "Progress in Photovoltaic Components and Systems, " National Renewable Energy Laboratory; NREL-CP-520-27460; 7 pages.
Jan. 22-23, 1998 Oldenkamp, H. et al.; "AC Modules: Past, Present and Future" Workshop Installing the Solar Solution; Hatfield, UK; 6 pages.
Linear Technology Specification Sheet, LTC3443—"High Current Micropower 600kHz Synchronous Buck-Boost DC/ DC Converter"—2004.
Linear Technology Specification Sheet, LTC3780—"High Efficiency Synchronous, 4-Switch Buck-Boost Controller"—2005.
Apr. 22, 2004—MICREL—MIC2182 High Efficiency Synchronous Buck Controller.
Apr. 1972—Methods for Utilizing Maximum Power From a Solar Array—Decker, DK.
2000—Evaluating MPPT converter topologies using a Matlab PV model—Walker, Geoffrey.
Jun. 30, 2008—Wang, Ucilia; Greentechmedia; "National Semi Casts Solarmagic"; www.greentechmedia.com; 3 pages; accessed Oct. 24, 2017.
Sep. 2004; Yuvarajan, S; Dchuan Yu; Shanguang, Xu; "A Novel Power Converter for PHotovoltaic Applications," Journal of Power Sources; vol. 135, No. 1-2, pp. 327-331.
Jun. 1998—Stern M., et al., "Development of a Low-Cost Integrated 20-kW-AC Solar Tracking Subarray for Grid-Connected PV Power System Applications—Final Technical Report"—National Renewable Energy Laboratory; 41 pages.
1997; Verhoeve, C.W.G., et al., "Recent Test Results of AC_Module inverters," Netherlands Energy Research Foundation ECN, 1997; 3 pages.
2004—Nobuyoshi, M. et al., "A Controlling Method for Charging Photovoltaic Generation Power Obtained by a MPPT Control Method to Series Connected Ultra-Electric Double Layer Capacitors"—Industry Application Conference, 2004. 39th IAS Annual Meeting. Conference Record of the 2004 IEEE.
Feb. 23-27, 1992—Miwa, Brett et al., "High Efficiency Power Factor Correction Using Interleaving Techniques"—Applied Power Electronics Conference and Exposition, 1992. APEC '92. Conference Proceedings 1992., Seventh Annual.
Ciobotaru, et al., Control of single-stage single-phase PV inverter, Aug. 7, 2006.
International Search Report and Written Opinion for PCT/IB2007/004591 dated Jul. 5, 2010.

(56) References Cited

OTHER PUBLICATIONS

European Communication for EP07873361.5 dated Jul. 12, 2010.
European Communication for EP07874022.2 dated Oct. 18, 2010.
European Communication for EP07875148.4 dated Oct. 18, 2010.
Chen, et al., "A New Low-Stress Buck-Boost Converter for Universal-Input PFC Applications", IEEE Applied Power Electronics Conference, Feb. 2001, Colorado Power Electronics Center Publications.
Chen, et al., "Buck-Boost PWM Converters Having Two Independently Controlled Switches", IEEE Power Electronics Specialists Conference, Jun. 2001, Colorado Power Electronics Center Publications.
Esram, et al., "Comparison of Photovoltaic Array Maximum Power Point Tracking Techniques", IEEE Transactions on Energy Conversion, vol. 22, No. 2, Jun. 2007, pp. 439-449.
Walker, et al., "Photovoltaic DC-DC Module Integrated Converter for Novel Cascaded and Bypass Grid Connection Topologies-Design and Optimisation", 37th IEEE Power Electronics Specialists Conference, Jun. 18-22, 2006, Jeju, Korea.
Geoffrey R. Walker Affidavit re: U.S. Appl. No. 11/950,271, submitted in an IDS for U.S. Appl. No. 11/950,271, filed Mar. 9, 2010.
International Search Report for PCT/IB2007/004610 dated Feb. 23, 2009.
International Search Report for PCT/IB2007/004584 dated Jan. 28, 2009.
International Search Report for PCT/IB2007/004586 dated Mar. 5, 2009.
International Search Report for PCT/IB2007/004643 dated Jan. 30, 2009.
International Search Report for PCT/US2008/085736 dated Jan. 28, 2009.
International Search Report for PCT/US2008/085754 dated Feb. 9, 2009.
International Search Report for PCT/US2008/085755 dated Feb. 3, 2009.
Kajihara, et al., "Model of Photovoltaic Cell Circuits Under Partial Shading", 2005 IEEE, pp. 866-870.
Knaupp, et al., "Operation of a 10 KW PV Façade with 100 W AC Photovoltaic Modules", 1996 IEEE, 25th PVSC, May 13-17, 1996, pp. 1235-1238, Washington, DC.
Myrzik, et al., "String and Module Integrated Inverters for Single-Phase Grid Connected Photovoltaic Systems—A Review", Power Tech Conference Proceedings, 2003 IEEE Bologna, Jun. 23-26, 2003, p. 8, vol. 2.
Chen, et al., "Predictive Digital Current Programmed Control", IEEE Transactions on Power Electronics, vol. 18, Issue 1, Jan. 2003.
Wallace, et al., "DSP Controlled Buck/Boost Power Factor Correction for Telephony Rectifiers", Telecommunications Energy Conference 2001, INTELEC 2001, Twenty-Third International, Oct. 18, 2001, pp. 132-138.
Alonso, "A New Distributed Converter Interface for PV Panels", 20th European Photovoltaic Solar Energy Conference, Jun. 6-10, 2005, Barcelona, Spain, pp. 2288-2291.
Alonso, "Experimental Results of Intelligent PV Module for Grid-Connected PV Systems", 21st European Photovoltaic Solar Energy Conference, Sep. 4-8, 2006, Dresden, Germany, pp. 2297-2300.
Enslin, "Integrated Photovoltaic Maximum Power Point Tracking Converter", IEEE Transactions on Industrial Electronics, vol. 44, No. 6, Dec. 1997, pp. 769-773.
Sep. 7-9, 1999—Lindgren, "Topology for Decentralised Solar Energy Inverters with a Low Voltage AC-Bus", Chalmers University of Technology, Department of Electrical Power Engineering, EPE '99—Lausanne.
Jun. 20-25, 2004—Nikraz, "Digital Control of a Voltage Source Inverter in a Photovoltaic Applications", 2004 35th Annual IEEE Power Electronics Specialists Conference, Aachen, Germany, 2004, pp. 3266-3271.
Orduz, "Evaluation Test Results of a New Distributed MPPT Converter", 22nd European Photovoltaic Solar Energy Conference, Sep. 3-7, 2007, Milan, Italy.

Jun. 17-21, 2007—Palma, "A Modular Fuel Cell, Modular DC-DC Converter Concept for High Performance and Enhanced Reliability", IEEE 2007, pp. 2633-2638.
Sep. 16-19, 1996—Quaschning, "Cost Effectiveness of Shadow Tolerant Photovoltaic Systems", Berlin University of Technology, Institute of Electrical Energy Technology, Renewable Energy Section. EuroSun '96, pp. 819-824.
Roman, "Intelligent PV Module for Grid-Connected PV Systems", IEEE Transactions on Industrial Electronics, vol. 52, No. 4, Aug. 2006, pp. 1066-1073.
Roman, "Power Line Communications in Modular PV Systems", 20th European Photovoltaic Solar Energy Conference, Jun. 6-10, 2005, Barcelona, Spain, pp. 2249-2252.
Uriarte, "Energy Integrated Management System for PV Applications", 20th European Photovoltaic Solar Energy Conference, Jun. 6-10, 2005, Barcelona, Spain, pp. 2292-2295.
Walker, "Cascaded DC-DC Converter Connection of Photovoltaic Modules", IEEE Transactions on Power Electronics, vol. 19, No. 4, Jul. 2004, pp. 1130-1139.
Oct. 3-7, 1999—Matsui, et al., "A New Maximum Photovoltaic Power Tracking Control Scheme Based on Power Equilibrium at DC Link", IEEE, 1999, pp. 804-809.
Hou, et al., Application of Adaptive Algorithm of Solar Cell Battery Charger, Apr. 2004.
Sep. 15-22, 2000—Stamenic, et al., "Maximum Power Point Tracking for Building Integrated Photovoltaic Ventilation Systems".
International Preliminary Report on Patentability for PCT/IB2008/055092 dated Jun. 8, 2010.
International Search Report for PCT/IB2008/055092 dated Sep. 8, 2009.
International Search Report and Opinion of International Patent Application WO2009136358 (PCT/IB2009/051831), dated Sep. 16, 2009.
Informal Comments to the International Search Report dated Dec. 3, 2009.
PCT/IB2010/052287 International Search Report and Written Opinion dated Sep. 2, 2010.
UK Intellectual Property office, Combined Search and Examination Report for GB1100450.4 under Sections 17 and 18 (3), Jul. 14, 2011.
Jain, et al., "A Single-Stage Grid Connected Inverter Topology for Solar PV Systems with Maximum Power Point Tracking", IEEE Transactions on Power Electronics, vol. 22, No. 5, Sep. 2007, pp. 1928-1940.
Lynch, et al., "Flexible DER Utility Interface System: Final Report", Sep. 2004-May 2006, Northern Power Systems, Inc., Waitsfield, Vermont B. Kroposki, et al., National Renewable Energy Laboratory Golden, Colorado Technical Report NREL/TP-560-39876, Aug. 2006.
Schimpf, et al., "Grid Connected Converters for Photovoltaic, State of the Art, Ideas for improvement of Transformerless Inverters", NORPIE/2008, Nordic Workshop on Power and Industrial Electronics, Jun. 9-11, 2008.
Sandia Report SAND96-2797 I UC-1290 Unlimited Release, Printed Dec. 1996, "Photovoltaic Power Systems and The National Electrical Code: Suggested Practices", by John Wiles, Southwest Technology Development Institute New Mexico State University Las Cruces, NM.
United Kingdom Intellectual Property Office, Combined Search and Examination Report Under Sections 17 and 18(3), GB1020862.7, dated Jun. 16, 2011.
Storfer, Lior, "Enhancing Cable Modem TCP Performance," Texas Instruments Inc. white paper, Jul. 2003.
Philips Semiconductors, Data Sheet PSMN005-55B; PSMN005-55P N-channel logic trenchMOS transistor, Oct. 1999, Product specification, pp. 1-11.
International Preliminary Report on Patentability Issued in corresponding international application No. PCT/US04/16668, filed May 27, 2004.
International Application No. PCT/US13/27965, International Preliminary Examination Report, Sep. 2, 2014.
International Patent Application PCT/US13/027965, International Search Report and Written Opinion, Jun. 2, 2013.

(56) References Cited

OTHER PUBLICATIONS

International Application No. PCT/US12/44045, International Preliminary Examination Report, Jan. 28, 2014.
International Patent Application No. PCT/US2012/044045, International Search Report and Written Opinion, Jan. 2, 2013.
International Patent Application No. PCT/US2009/047734, International Search Report and Written Opinion, May 4, 2010.
Linares, Leonor et al., "Improved Energy Capture in Series String Photovoltaics via Smart Distributed Power Electronics," 24th Annual IEEE Applied Power Electronics Conference and Exposition, pp. 904-910, Feb. 15, 2009.
International Patent Application No. PCT/US2010/029929, International Search Report and Written Opinion, Oct. 27, 2010.
Lowe, Electronics Basis: What is a Latch Circuit, http://www.dummies.com/how-to/content/electronics-basics-what-is-a-latch-circuit.html, from Electronics All-in-One for Dummies, Feb. 2012, downloaded Jul. 13, 2014.
International Patent Application No. PCT/US2011/020591, International Search Report and Written Opinion, Aug. 8, 2011.
International Patent Application No. PCT/US2011/033544, International Search Report and Written Opinion, Nov. 24, 2011.
J. Keller and B. Kroposki, titled, "Understanding Fault Characteristics of Inverter-Based Distributed Energy Resources", In a Technical Report NREL/TP-550-46698, published Jan. 2010, pp. 1 through 48.
International Patent Application No. PCT/US2008/081827, International Search Report and Written Opinion, Jun. 24, 2009.
International Patent Application No. PCT/US2010/046274 International Search Report and Written Opinion, Apr. 22, 2011.
International Patent Application No. PCT/US2011/033658, International Search Report and Written Opinion, Jan. 13, 2012.
International Patent Application No. PCT/US2011/029392, International Search Report and Written Opinion, Oct. 24, 2011.
European Patent Application No. 09829487.9, Extended Search Report, Apr. 21, 2011.
International Patent Application No. PCT/US2009/062536, International Search Report and Written Opinion, Jun. 17, 2010.
International Patent Application No. PCT/US2010/022915, International Search Report and Written Opinion, Aug. 23, 2010.
International Patent Application No. PCT/US2010/046272, International Search Report and Written Opinion, Mar. 31, 2011.
Exell et al., "The Design and Development of a Solar Powered Refrigerator", [retrieved on Feb. 13, 2013], Retrieved from the Internet <URL: http://www.appropedia.org/The_Design_and_Development_of_a_Solar_Powered_Refrigerator>, pp. 1-64.
"Development of Water-Lithium Bromide Low-Temperature Absorption Refridgerating Machine", 2002 Energy & Environment on Database on Noteworthy contributions for Science and Technology (Japan), Research Data (No. 1748) [online], [retrieved on Aug. 29, 2012]. Retrieved from the Internet: <URL: http://dbnstl.nii.ac.jp/english/detail/1748>, pp. 1-4.
Dictionary.com, "air conditioning" [online], [retrieved on Aug. 28, 2012]. Retrieved from the Internet: <URL: http://dictionary.reference.com/browse/air+conditioning?s=t>, pp. 1-3.
International Patent Application No. PCT/US2010/029936, International Search Report and Written Opinion, Nov. 12, 2010.
International Patent Application No. PCT/US08/75127, International Search Report and Written Opinion, Apr. 28, 2009.
International Patent Application No. PCT/US09/35890, International Search Report and Written Opinion, Oct. 1, 2009.
European Patent Application No. 08845104.2, Extended Search Report, Jul. 31, 2014.
European Patent Application No. 11772811.3, Extended Search Report, Dec. 15, 2014.
International Patent Application No. PCT/US2008/082935, International Search Report and Written Opinion, Jun. 25, 2009.
Bhatnagar et al., Silicon Carbide High Voltage (400 V) Shottky Barrier Diodes, IEEE Electron Device Letters, vol. 13 (10) p. 501-503 Oct. 10, 1992.
Jun. 6-10, 2004—Rodriguez, C., and G. A. J. Amaratunga. "Dynamic stability of grid-connected photovoltaic systems." Power Engineering Society General Meeting, 2004. IEEE, pp. 2194-2200.
Nov. 3, 1999-Dec. 29—Kikuchi, Naoto, et al. "Single phase amplitude modulation inverter for utility interaction photovoltaic system." Industrial Electronics Society, 1999. IECON'99 Proceedings. The 25th Annual Conference of the IEEE. vol. 1. IEEE, 1999.
Oct. 7-12, 1990—Nonaka, Sakutaro, et al. "Interconnection system with single phase IGBT PWM CSI between photovoltaic arrays and the utility line." Industry Applications Society Annual Meeting, 1990., Conference Record of the 1990 IEEE.
Jun. 23-27, 2002—Calais, Martina, et al. "Inverters for single-phase grid connected photovoltaic systems-an overview." Power Electronics Specialists Conference, 2002. pesc 02. 2002 IEEE 33rd Annual. vol. 4. IEEE, 2002.
Jul. 1999—Marra, Enes Goncalves, and José Antenor Pomilio. "Self-excited induction generator controlled by a VS-PWM bidirectional converter for rural applications." Industry Applications, IEEE Transactions on 35.4 (1999): 877-883.
Apr. 2-5, 2002—Xiaofeng Sun, Weiyang Wu, Xin Li, Qinglin Zhao: A Research on Photovoltaic Energy Controlling System with Maximum Power Point Tracking:; Proceedings of the Power Conversion Conference-Osaka 2002 (Cat. No. 02TH8579) IEEE-Piscataway, NJ, USA, ISBN 0-7803-7156-9, vol. 2, p. 822-826, XP010590259: the whole document.
International Search Report for corresponding PCT/GB2005/050198 completed Jun. 28, 2006 by C. Wirner of the EPO.
Brunello, Gustavo, et al., "Shunt Capacitor Bank Fundamentals and Protection," 2003 Conference for Protective Relay Engineers, Apr. 8-10, 2003, pp. 1-17, Texas A&M University, College Station, TX, USA.
Cordonnier, Charles-Edouard, et al., "Application Considerations for Sensefet Power Devices," PCI Proceedings, May 11, 1987, pp. 47-65.
Jun. 9-11, 2003—Kotsopoulos, Andrew, et al., "Predictive DC Voltage Control of Single-Phase PV Inverters with Small DC Link Capacitance," IEEE International Symposium, Month Unknown, 2003, pp. 793-797.
Meinhardt, Mike, et al., "Multi-String-Converter with Reduced Specific Costs and Enhanced Functionality," Solar Energy, May 21, 2001, pp. 217-227, vol. 69, Elsevier Science Ltd.
Mar. 6-10, 2005—Kimball, et al.: "Analysis and Design of Switched Capacitor Converters"; Grainger Center for Electric Machinery and Electromechanics, University of Illinois at Urbana-Champaign, 1406 W. Green St, Urbana, IL 61801 USA, © 2005 IEEE; pp. 1473-1477.
Martins, et al.: "Interconnection of a Photovoltaic Panels Array to a Single-Phase Utility Line From a Static Conversion System"; Power Electronics Specialists Conference, 2000. PESC 00. 2000 IEEE 31st Annual; Jun. 18, 2000-Jun. 23, 2000; ISSN: 0275-9306; pp. 1207-1211, vol. 3.
International Search Report for corresponding PCT/GB2005/050197, completed Dec. 20, 2005 by K-R Zettler of the EPO.
Kjaer, Soeren Baekhoej, et al., "Design Optimization of a Single Phase Inverter for Photovoltaic Applications," IEEE 34th Annual Power Electronics Specialist Conference, Jun. 15-19, 2003, pp. 1183-1190, vol. 3, IEEE.
Jun. 23-27, 2002—Shimizu, Toshihisa, et al., "A Flyback-type Single Phase Utility Interactive Inverter with Low-frequency Ripple Current Reduction on the DC Input for an AC Photovoltaic Module System," IEEE 33rd Annual Power Electronics Specialist Conference 2002, pp. 1483-1488, vol. 3, IEEE.
Written Opinion of PCT/GB2005/050197, Feb. 14, 2006 (mailing date), Enecsys Limited.
Jun. 17-21, 2001—Yatsuki, Satoshi, et al., "A Novel AC Photovoltaic Module System based on the Impedance-Admittance Conversion Theory," IEEE 32nd Annual Power Electronics Specialists Conference, Month Unknown, 2001, pp. 2191-2196, vol. 4, IEEE.
Jul. 7, 2023—European Search Report—EP App. No. 22191698.4.
Dec. 12, 2023—Japanese Office Action—JP App. No. 2020-004452.
GB Combined Search and Examination Report—GB1203763.6—Mailing date: Jun. 25, 2012.

(56) References Cited

OTHER PUBLICATIONS

Mohammad Reza Amini et al., "Quasi Resonant DC Link Inverter with a Simple Auxiliary Circuit", Journal of Power Electronics, vol. 11, No. 1, Jan. 2011.
Khairy Fathy et al., "A Novel Quasi-Resonant Snubber-Assisted ZCS-PWM Dc-Dc Converter with High Frequency Link", Journal of Power Electronics, vol. 7, No. 2, Apr. 2007.
May 22, 1998—Cheng K.W.E., "New Generation of Switched Capacitor Converters", Department of Electrical Engineering, The Hong Kong Polytechnic University, Hung Hom, Hong Kong, Power Electronics Conference, PESC 98.
1999—Per Karlsson, "Quasi Resonant DC Link Converters—Analysis and Design for a Battery Charger Application", Universitetstryckeriet, Lund University, 1999, ISBN 91-88934-14-4; Added to Lund University Publications on Jun. 4, 2012.
Hsiao Sung-Hsin et al., "ZCS Switched-Capacitor Bidirectional Converters with Secondary Output Power Amplifier for Biomedical Applications", Power Electronics Conference (IPEC) Jun. 21, 2010.
Nov. 27-30, 2007—Yuang-Shung Lee et al., "A Novel QR ZCS Switched-Capacitor Bidirectional Converter", IEEE, 2007.
Antti Tolvanen et al., "Seminar on Solar Simulation Standards and Measurement Principles", May 9, 2006 Hawaii.
J.A. Eikelboom and M.J. Jansen, "Characterisation of PV Modules of New Generations—Results of tests and simulations", Jun. 2000.
Yeong-Chau Kuo et al., "Novel Maximum-Power-Point-Tracking Controller for Photovoltaic Energy Conversion System", IEEE Transactions on Industrial Electronics, vol. 48, No. 3, Jun. 2001.
C. Liu et al., "Advanced Algorithm for MPPT Control of Photovoltaic Systems", Canadian Solar Buildings Conference, Montreal, Aug. 20-24, 2004.
May 22, 1998—Chihchiang Hua and Chihming Shen, "Study of Maximum Power Tracking Techniques and Control of DC/DC Converters for Photovoltaic Power System", IEEE.
Tore Skjellnes et al., "Load sharing for parallel inverters without communication", Nordic Workshop in Power and Industrial Electronics, Aug. 12-14, 2002.
Jun. 23, 2000—Giorgio Spiazzi at el., "A New Family of Zero-Current-Switching Variable Frequency dc-dc Converters", IEEE.
Nayar, C.V., M. Ashari and W.W.L Keerthiphala, "A Grid Interactive Photovoltaic Uninterruptible Power Supply System Using Battery Storage and a Back up Diesel Generator", IEEE Transactions on Energy Conversion, vol. 15, No. 3, Sep. 2000, pp. 348?353.
Ph. Strauss et al., "AC coupled PV Hybrid systems and Micro Grids-state of the art and future trends", 3rd World Conference on Photovoltaic Energy Conversion, Osaka, Japan May 11-18, 2003.
Jul. 16-20, 2000—Nayar, C.V., abstract, Power Engineering Society Summer Meeting, 2000. IEEE, 2000, pp. 1280-1282 vol. 2.
Mar. 15, 2004—D. C. Martins et al., "Analysis of Utility Interactive Photovoltaic Generation System using a Single Power Static Inverter", Asian J. Energy Environ., vol. 5, Issue 2, (2004), pp. 115-137.
Rafael C. Beltrame et al., "Decentralized Multi String PV System With Integrated ZVT Cell", Congresso Brasileiro de Automática / 12 a Sep. 16, 2010, Bonito-MS.
Sergio Busquets-Monge et al., "Multilevel Diode-clamped Converter for Photovoltaic Generators With Independent Voltage Control of Each Solar Array", IEEE Transactions on Industrial Electronics, vol. 55, No. 7, Jul. 2008.
Soeren Baekhoej Kjaer et al., "A Review of Single-Phase Grid-Connected Inverters for Photovoltaic Modules", IEEE Transactions on Industry Applications, vol. 41, No. 5, Sep./Oct. 2005.
Office Action—JP 2011-539491—Mailing date: Mar. 26, 2013.
Supplementary European Search Report—EP08857456—Mailing Date Dec. 6, 2013.
Extended European Search Report—EP14151651.8—Mailing date: Feb. 25, 2014.
Iyomori H et al: "Three-phase bridge power block module type auxiliary resonant AC link snubber-assisted soft switching inverter for distributed AC power supply", INTELEC 2003. 25th. International Telecommunications Energy Conference. Yokohama, Japan, Oct. 19-23, 2003; Tokyo, IEICE, JP, Oct. 23, 2003 (Oct. 23, 2003), pp. 650-656, XP031895550, ISBN: 978-4-88552-196-6.
Yuqing Tang: "High Power Inverter EMI characterization and Improvement Using Auxiliary Resonant Snubber Inverter", Dec. 17, 1998 (Dec. 17, 1998), XP055055241, Blacksburg, Virginia Retrieved from the Internet: URL:http: jscholar.lib.vt.edu/theses/available/etd-012299-165108/unrestricted/THESIS. PDF, [retrieved on Mar. 5, 2013].
Yoshida M et al: "Actual efficiency and electromagnetic noises evaluations of a single inductor resonant AC link snubber-assisted three-phase soft-switching inverter", INTELEC 2003. 25th. International Telecommunications Energy Conference. Yokohama, Japan, Oct. 19-23, 2003; Tokyo, IEICE, JP, Oct. 23, 2003 (Oct. 23, 2003), pp. 721-726, XP031895560, ISBN: 978-4-88552-196-6.
Third party observation—EP07874025.5—Mailing date: Aug. 6, 2011.
Extended European Search Report—EP 13152967.9—Mailing date: Aug. 28, 2014.
Extended European Search Report—EP 14159696—Mailing Date: Jun. 20, 2014.
Gow Ja A et al.: "A Modular DC-DC Converter and Maximum Power Tracking Controller For Medium to Large Scale Photovoltaic Generating Plant"8th European Conference on Power Electronics and Applications. Lausaane, CH, Sep. 7-9, 1999, EPE. European Conference on Power Electronics and Applications, Brussls: EPE Association, BE, vol. Conf. 8, Sep. 7, 1999, pp. 1-8, XP000883026.
Chihchiang Hua et al.: "Comparative Study of Peak Power Tracking Techniques for Solar Storage System" Applied Power Electronics Conference and Exposition, 1998. APEC '98. Conference Proceedings 1998, Thirteenth Annual Anaheim, CA USA Feb. 15-19, 1998, New York, NY, USA, IEEE, US, Feb. 15, 1998, pp. 679-685, XP010263666.
Matsuo H et al: "Novel Solar Cell Power Supply System Using the Multiple-input DC-DC Converter" 20th International telecommunications Energy Conference. Intelec '98 San Francisco, CA, Oct. 4-8, 1998, Intelec International Telecommunications Energy Conference, New York, NY: IEEE, US, Oct. 4, 1998, pp. 797-802, XP000896384.
Chihchiang Hua et al: "DSP-based controller application in battery storage of photovoltaic system" Industrial Electronics, Control, and Instrumentation, 1996, Proceedings of the 1996 IEEE IECON 22nd International Conference on Taipei, Taiwan Aug. 5-10, 1996, New York, NY, USA, IEEE, US, Aug. 5, 1996, pp. 1705-1710, XP010203239.
Hua C et al.: "Implementation of a DSP-Controlled Photovoltaic System with Peak Power Tracking" IEEE Transactions on industrial Electronics, IEEE, Inc. New York, US, vol. 45, No. 1, Feb. 1, 1998, pp. 99-107, XP000735209.
I. Weiss et al.: "A new PV system technology—the development of a magnetic power transmission from the PV module to the power bus" 16th European Photovoltaic Solar Energy Conference, vol. III, May 1-5, 2000, pp. 2096-2099, XP002193468 Glasgow, UK cited in the application.
Basso, Tim, "IEEE Standard for Interconnecting Distributed Resources With the Electric Power System," IEEE PES Meeting, Jun. 9, 2004.
Feb. 11, 2003—Boostbuck.com, "The Four Boostbuck Topologies," located at http://www.boostbuck.com/ TheFourTopologies.html.
Apr. 2002—Gautam, Nalin K et al., "An Efficient Algorithm to Simulate the Electrical Performance of Solar Photovoltaic Arrays," Energy, vol. 27, No. 4, pp. 347-361, 2002.
Nordmann, T. et al., "Performance of PV Systems Under Real Conditions," European Workshop on Life Cycle Analysis and Recycling of Solar Modules, The "Waste" Challenge, Brussels, Belgium, Mar. 18-19, 2004.
Wiles, John, "Photovoltaic Power Systems and the National Electrical Code: Suggested Practices," Sandia National Laboratories, document No. SAND2001-0674, Mar. 2001.
Hewes, J. "Relays," located at http://web.archive.org/web/20030816010159/www.kpsec.freeuk.com/components/relay.htm, Aug. 16, 2003.
Jan. 1, 1993—Definition of "remove" from Webster's Third New International Dictionary, Unabridged, 1993.

(56) References Cited

OTHER PUBLICATIONS

Jan. 1, 1993—Definition of "removable" from Webster's Third New International Dictionary, Unabridged, 1993.
Advanced Energy Group, "The Basics of Solar Power Systems," located at http://web.archive.org/web/20010331044156/http://www.solar4power.com/solar-power-basics.html, Mar. 31, 2001.
International Patent Application No. PCT/AU2005/001017, International Search Report and Written Opinion, Aug. 18, 2005.
Baek, Ju-Won et al., "High Boost Converter using Voltage Multiplier," 2005 IEEE Conference, IECON 05, pp. 567-572, Nov. 2005.
Wikimedia Foundation, Inc., "Electric Power Transmission," located at http://web.archive.org/web/20041210095723/en.wikipedia.org/wiki/Electric-power-transmission, Nov. 17, 2004.
Jacobsen, K.S., "Synchronized Discrete Multi-Tone (SDMT) Modulation for Cable Modems: Making the Most of the Scarce Reverse Channel Bandwidth," Conference Proceedings of Wescon/97, pp. 374-380, Nov. 4, 1997.
Loyola, L. et al., "A Multi-Channel Infrastructure based on DCF Access Mechanism for Wireless LAN Mesh Networks Compliant with IEEE 802.11," 2005 Asia-Pacific Conference on Communications, pp. 497-501, Oct. 5, 2005.
Oct. 5, 2023—European Search Report—EP App. No. 23180721.5.
Mar. 4-8, 2001—Andersen Gert, et al.,—Aalborg University, Institute of Energy Technology, Denmark—"Currect Programmed Control of a Single Phase Two-Switch Buck-Boost Power Factor Correction Circut" - Applied Power Electronics Conference and Exposition, 2001. APEC 2001. Sixteenth Annual IEEE.
Feb. 22-26, 2004—Andersen, Gert et al.,—"Utilizing the free running Current Programmed Control as a Power Factor Correction Technique for the two switch Buck-Boost converter"—Applied Power Electronic Conference and Exposition, 2004. APEC '04. Nineteenth Annual IEEE.
Mar. 3-7, 1996—Caricchi F et al.,—"Prototype of Innovative Wheel Direct Drive With Water-Cooled Exial-Flux Motor for Electric Vehicle Applications"—Applied Power Electronics Conference and Expositions, 1996. APEC '96. Conference Proceedings 1996., Eleventh Annual IEEE.
Feb. 15-19, 1998—Caricchi, F. et al.,—"Study of Bi-Directional Buck-Boost Converter Topologies for Application in Electrical Vehicle Motor Drives"—Applied Power Electronics Conference and Exposition, 1998, APEC '98. COnference Proeedings 1998., Thirteenth Annual IEEE.
Nov. 27-30, 1990—Ensling, JHR—"Maximum Power Point Tracking: A Cost Saving Necessity in Solar Energy Systems" Industrial Electornics Society, 1990. IECON '90., 16th Annual Conference of IEEE.
Feb. 22-26, 2004—Gaboriault, Mark et al.,—"A High Efficiency, Non-Inverting, Buck-Boost DC-DC Converter"—Applied Power Electronics Conference and Exposition, 2004. APEC '04. Nineteenth Annual IEEE.
Feb. 15-19, 1998—Hua, et al.,—"Comparative Study of Peak Power Tracking Techniques for Solar Storage System"—Applied Power Electronics Conference and Exposition, 1998. APEC'98. Conferenced Proceedings 1998., Thirteenth Annual IEEE.
Jun. 20-24, 1993—Sullivan, et al., "A High-Efficiency Maximum Power Point Tracker for Photovoltaic Arrays in a Solar-Powered Race Vehicle"—University of California, Berkeley, Department of Electrical Engineering and OCmputer Sciences—Power Electronics Specialists Conference, 1993. PESC '93 Record., 24th Annual IEEE.
May 19-24, 2002—Bower et at.,—"Certification of Photovoltaic Inverters: The Initial Step Toward PV System Certification"—Photovoltaic Specialists Conferences, 2002. Conference Record of the Twenty-Ninth IEEE.
Jun. 17-21, 2001—Tse et al., "A Novel Maximum Power Point Tracking Technique for PV Panels"—Power Electronics Specialists Conferences, 2001. PESC. 2001 IEEE 32nd Annual.
May 12-18, 2008—Cuadras et al., "Smart Interfaces for Low Power Energy Harvesting Systems"—Instrumentation and Measurement Technology Conferences Proceedings, 2008. IMTC 2008. IEEE.

Dec. 5-9, 1994—Haan, et al., "Test Results of a 130 W AC Module; a modular solar as power station"—Photovoltaic Energy Conversion 1994. Conference Record of the Twenty Fourth. IEEE Phtovoltaic Specialists Conference—1994.
Sep. 1-3, 2008—Jung, et al., "Soft Switching Boost Converter for Photovoltaic Power Generation System"—Power Electronics and Motion Control Conference, 2008. EPE-PEMC 2008.
Jun. 3-5, 2008—Duan, et al., "A Novel High-Efficiency Inverter for Stand Alone and Grid-Connected Systems"—Industrial Electronics and Applications, 2008. ICIEA 2008.
Nov. 7, 2002—Ertl, et al., "A Novel Multicell DC-AC Converter for Applicaiton in Renewable Energy Systems"—IEEE Transactions on Industrial Electronics (vol. 49, Issue 5, Oct. 2002).
Oct. 8-12, 2000 Hashimoto, et al., "A Novel High Peforamance Utility Interactive Photovoltain Inverter System"—Industry Applications Conference, 2000. Conference Record of the 2000 IEEE.
Feb. 22-26, 2004—Ho, et al., "An Integrated Inverter with Maximum Power Tracking for Grid-Connected PV Systems"—Applied Power Electronics Conference and Exposition, 2004. APEC '04. Nineteenth Annual IEEE.
Nov. 14, 1997, Hua et al., "Control of DC/DC Converters for Solar Energy System with Maximum Power Tracking"—Industrial Electronics, Control and Instrumentation, 1997. IECON 97. 23rd International Conference on Industrial Electronics, Control and Instrumentation vol. 4 of 4.
Sep. 1-3, 2008, Lee et al., "Soft Switching Mutli-Phase Boost Converter for Photovoltaic System"—Power Electronics and Motion Control Conference, 2008. EPE-PEMC 2008.
Jul. 5, 2005, Yao et al., "Tapped-Inductor Buck Converter for High-Step-Down DC-DC Conversion" IEEE Transactions on Power Electronics (vol. 20, Issue 4, Jul. 2005).
Sep. 21-23, 1998, Kretschmar, et al., "An AC Converter with a Small DC Link Capacitor for a 15KW Permanent Magnet Synchronous Integral Motor"—Power Electronics and Variable Speed Drives, 1998. Sevent International Converterest (Conf. Publ. No. 456).
May 25, 2000—Hong Lim, et al., "Simple Maximum Power Point Tracker for Photovoltaic Arrays"—Electronics Letters (vol. 36, Issue 11, May 25, 2000).
Aug. 14-16, 2004, Nishida et al., "A Novel Type of Utility-Interactive Inverter for Phtovoltaic System"—Power Electronics and Mtion Control Conference, 2004. IPEMC 2004.
May 30-Jun. 3, 2011, Jung, et al., "DC-Link Ripple Reduction of Series-connected Module Integrated Converter for Photovoltaic Systems."—Power Electronics and ECCE Asia (ICPE & ECCE).
Jan. 8, 2007, Li et al., "An Analysis of ZVS Two-Inductor Boost Converter under Variable Frequency Operation" - IEEE Transactions on Power Electronics (vol. 22, Issue 1, Jan. 2007).
Sep. 17, 2007, Rodriguez et al., "Analytic Solution to the Photovoltaic Maximum Power Point Problem"—IEEE Transactions on Circuits and Systems I: Regular Papers (vol. 54, Issue 9, Sep. 2007).
Jun. 27, 1997, Reimann et al., "A Novel Control Principle of Bi-Directional DC-DC Power Conversion"—Powre Electronics Specialists Conference 1997. PESC '97 Record.
Sep. 15-22, 2000, Russell et al., "The Massachusetts Electric Solar Project: A Pilot Project to Commercialize Residential PV Systems"—Photovoltaic Specialists Conference, 2000, Conference Record of the Twenty-Eighth IEEE Photovoltaic Specialists Conference—2000.
May 2001, Shimizu et al., "Generation Control Circuit for Photvoltaic Modules"—IEEE Transactions of Power Electronics (vol. 16, Issue 3, May 2001).
Feb. 6-10, 2000, Siri, Kasemsan "Study of System Instability in Current-Mode Converter Power Systems Operating in Solar Array Voltage Regulation Mode"—Applied Power Electronics Conference and Exposition, 2000. APEC 2000. Fiftheenth Annual IEEE.
Aug. 13-16, 1990—Rajan, Anita "A Maximum Power Point Tracker Optimized for Solar Powered Cars"—Future Transportation Technology Conference and Expostion.
Jul. 10, 1995—"Battery I.D. chip from Dallas Semiconductor monitors and reports battery pack temperature"—Business Wire.
Nov. 3, 1999—Takahashi et al., "Development of a Long-Life Three-Phase Flywheel UPS Using an Electrolytic Capacitorless Converter/Inverter"—Electrical Engineering in Japan, vol. 127.

(56) References Cited

OTHER PUBLICATIONS

Jan. 2001—Walker, Geoffrey "Evaluating MPPT Converter Topologies Using a Matlab PV Model"—"Journal of Electrical and Electronics Engineering, Australia".
Feb. 13, 2007—Roman et al., "Experimental Results of Controlled PV Module for Building Integrated PV Systems"—Solar Energy 82 (2008) 471-480.
2006—Bower et al., "Innovative PV Micro-Inverter Topology Eliminates Electrolytic Capacitors for Longer Lifetime"—IEEE 1-4244-0016-3/06/ pp. 2038-2041.
Aug. 23-27, 1993—Case et al., "A Minimum Component Photovoltaic Array Maximum Power Point Tracker"—European Space Power Conference vol. 1. Power Systems, Power Electronics.
Jun. 4, 1997—Maranda et al., "Optimization of the Master-Slave Inverter System for Grid-Connected Photovoltaic Plants"—Energy Convers. Mgmt. vol. 39, No. 12 pp. 1239-1246.
2005—Kang et al., "Photovoltaic Power Interface Circuit Incorporated with a Buck-Boost Converter and a Full-Bridge Inverter"—Applied Energy 82, pp. 266-283.
Nov. 21, 1997—Feuermann et al., "Reversable Low Soalr Heat Gain Windows for Energy Savings"—Solar Energy vol. 62, No. 3 pp. 169-175.
May 16, 2005—Enrique et al., "Theoretical assessment of the maximum power point tracking efficiency of photovoltaic facilities with different converter topologies"—Solar Energy 81 (2007) p. 31-38.
Dehbonei, Hooman "Power Conditioning for Distrbuted Renewable Energy Generation"—Curtin University of Technology, School of Electrical and Computer Engineering, 2003 568 pages Dissertation: Thesis. Abstract, 1 page—retrieved on Nov. 13, 2017 on https://books.google.com/books/about/Power_Conditioning_for_Distributed_Renew.html?id=3wVXuAAACAAJ.
Korean Patent Application No. 102005-7008700, filed May 13, 2015. Applicant: Exar Corporation.
Jan. 23, 2018—EP Search Report, EP App No. 17187230.2.
Apr. 16, 2018—EP Examination Report 12707899.6.
Aug. 9, 2010, Hong, Wei, et al., "Charge Equalization of Battery POwer Modules in Series" The 2010 International Power Electronics Conference, IEEE, p. 1568-1572.
Jun. 6, 2018—EP Search Report EP App No. 18151594.1.
Jun. 29, 2018—EP Search Report—EP App No. 18175980.4.
Jun. 23, 2000; Bascope, G.V.T. Barbi, I; "Generation of Family of Non-isolated DC-DC PWM Converters Using New Three-state Switching Cells"; 2000 IEEE 31st Annual Power Electronics Specialists Conference in Galway, Ireland; vol. 2.
Oct. 3-7, 2004; Nobuyoshi, M. et al., "A Controlling Method for Charging Photovoltaic Generation Power Obtained by a MPPT Control Method to Series Connected Ultra-Electric Double Layer Capacitors"—Industry Application Conference, 2004. 39th IAS Annual Meeting. Conference Record of the 2004 IEEE.
Jan. 1, 2005; Linear Technology Specification Sheet, LTC3780—"High Efficiency Synchronous, 4-Switch Buck-Boost Controller".
Dec. 19, 2005; Edelmoser, K.H. et al.; High Efficiency DC-to-AC Power Inverter with Special DC Interface; Professional Paper, ISSN 0005-1144, Automatika 46 (2005) 3-4, 143-148, 6 pages.
Jan. 29, 2019—European Search Report for EP App No. 18199117.5.
Jul. 12, 2019—European Search Report—EP 19170538.3.
Sep. 4, 2019—Extended European Search Report—EP 19181247.8.
Aug. 6, 2019—Notice of Opposition of European Patent 2232663—Fronius International GmbH.
Sep. 5, 2019—Notice of Opposition of European Patent 2549635—Huawei Technologies Co.
Sep. 5, 2019—Notice of Opposition of European Patent 2549635—Fronius International GmbH.
Solide Arbeit, Heinz Neuenstein, Dec. 2007.
Spitzenwirkungsgrad mit drei Spitzen, Heinz Neuenstien and Andreas Schlumberger, Jan. 2007.
Technical Information, Temperature Derating for Sunny Boy, Sunny Mini Central, Sunny Tripower, Aug. 9, 2019.
Prinout from Energy Matters online Forum, Jul. 2011.
Wayback Machine Query for Energy Matters Online Forum Jul. 2011.
Nov. 27, 2019—European Search Report—3567562.
Baocheng, DC to AC Inverter with Improved One Cycle Control, 2003.
Brekken, Utility-Connected Power Converter for Maximizing Power Transfer From a Photovoltaic Source While Drawing Ripple-Free Current, 2002.
Cramer, Modulorientierter Stromrichter Geht In Serienfertigung, SPVSE, 1994.
Cramer, Modulorientierter Stromrichter, Juelich, Dec. 31, 1995.
Cramer, String-Wechselrichter Machen Solarstrom Billiger, Elektronik, Sep. 1996.
Dehbonei, A Combined Voltage Controlled and Current Controlled "Dual Converter" for a Weak Grid Connected Photovoltaic System with Battery Energy Storage, 2002.
Engler, Begleitende Untersuchungen zur Entwicklung eines Multi-String-Wechselrichters, SPVSE, Mar. 2002.
Geipel, Untersuchungen zur Entwicklung modulorientierter Stromrichter Modulorientierter Stromrichter für netzgekoppelte Photovoltaik-Anlagen, SPVSE, 1995.
Hoor, DSP-Based Stable Control Loops Design for a Single Stage Inverter, 2006.
Isoda, Battery Charging Characteristics in Small Scaled Photovoltaic System Using Resonant DC-DC Converter With Electric Isolation, 1990.
Jones, Communication Over Aircraft Power lines, Dec. 2006/ Jan. 2007.
Kalaivani, A Novel Control Strategy for the Boost DC-AC Inverter, 2006.
Lee, Powering The Dream, IET Computing & Control Engineering, Dec. 2006/ Jan. 2007.
Lee, A Novel Topology for Photovoltaic Series Connected DC/DC Converter with High Efficiency Under Wide Load Range, Jun. 2007.
Lin, LLC DC/DC Resonant Converter with PLL Control Scheme, 2007.
Niebauer, Solarenergie Optimal Nutzen, Stromversorgung, Elektronik, 1996.
Rodrigues, Experimental Study of Switched Modular Series Connected DC-DC Converters, 2001.
Sanchis, Buck-Boost DC-AC Inverter: Proposal for a New Control Strategy, 2004.
Sen, A New DC-To-AC Inverter With Dynamic Robust Performance, 1998.
Shaojun, Research on a Novel Inverter Based on DC/DC Converter Topology, 2003.
Siri, Sequentially Controlled Distributed Solar-Array Power System with Maximum Power Tracking, 2004.
Walko, Poised For Power, IEE Power Engineer, Feb./ Mar. 2005.
White, Electrical Isolation Requirements In Power-Over-Ethernet (POE) Power Sourcing Equipment (PSE), 2006.
Yu, Power Conversion and Control Methods for Renewable Energy Sources, May 2005.
Zacharias, Modularisierung in der PV-Systemtechnik-Schnittstellen zur Standardisierung der Komponenten, Institut für Solare Energieversorgungstechnik (ISET), 1996.
Dec. 24, 2019—CN Office Action—CN Application 201610946835.5.
Jan. 30, 2020—EP Office Action—EP 18204177.2.
Feb. 3, 2020—Chinese Office Action—201710749388.9.
Mar. 24, 2020—Non-Final Rejection—U.S. Appl. No. 15/593,761.
Apr. 20, 2020—European Search Report—EP 20151729.9.
Apr. 23, 2020—European Search Report—EP 19217486.0.
May 12, 2020—Extended European Search Report—EP 20161381.7.
Jul. 8, 2020—CN Office Action—CN 201710362679.2.
Sep. 17, 2020—Extended European Search Report—EP Application 20176744.9.
Oct. 12, 20202—CN Office Action—CN 201610946835.5.
Nov. 12, 2020—Preliminary Opinion by EPO—EP 12188944.8.
Dec. 31, 2020—CN Invalidation Decision—CN 200780045351.2.
Dec. 31, 2020—CN Invalidation Decision—CN 201210253614.1.

(56) References Cited

OTHER PUBLICATIONS

Mar. 3, 2021—EP Office Action—EP 17188365.5.
May 7, 2021—Chinese Office Action—CN 20181025083.8.
Jun. 21, 2021—Japanese Office Action—JP 2017-158887.
Zhao Junjian & al.: "Analysis of high efficiency DC/DC converter processing partial input/output power", 14th Workshop on Control and Modeling for Power Electronics, Jun. 23, 2013 (Jun. 23, 2013), DOI: 10.1109/COMPEL.2013.6626440.
Apr. 14, 20214—European Summons to Oral Proceedings—EP 17724234.4.
PV Balancers: Concept, Architectures, and Realization—Huimmin Zhou—IEEE Transactions on Power Electronics vol. 30 No. 7—Jul. 7, 2015.
Petition for Inter Partes Review of U.S. Pat. No. 10,256,770; IPR 2021-00540; Petitioner *Altenergy Power Systems Inc* vs. Patent Owner *Tigo Energy Inc*.
Declaration in Support of Petition for Inter Partes Review of U.S. Pat. No. 10,256,770; IPR 2021-00540; Petitioner *Altenergy Power Systems Inc* vs. Patent Owner *Tigo Energy Inc*.
Petition for Inter Partes Review of U.S. Pat. No. 8,988,321; IPR 2021-00541; Petitioner *Altenergy Power Systems Inc* vs. Patent Owner *Tigo Energy Inc*.
Declaration in Support of Petition for Inter Partes Review of U.S. Pat. No. 8,933,321; IPR 2021-00541; Petitioner *Altenergy Power Systems Inc* vs. Patent Owner *Tigo Energy Inc*.
Petition for Inter Partes Review of U.S. Pat. No. 8,933,321; IPR 2021-01286; Petitioner *SunSpec Alliance* vs. Patent Owner *Tigo Energy Inc*.
Declaration in Support of Petition for Inter Partes Review of U.S. Pat. No. 8,933,321; IPR 2021-01286; Petitioner *SunSpec Alliance* vs. Patent Owner *Tigo Energy Inc*.
Petition for Inter Partes Review of U.S. Pat. No. 10,256,770; IPR 2021-01287; Petitioner *SunSpec Alliance* vs. Patent Owner *Tigo Energy Inc*.
Declaration in Support of Petition for Inter Partes Review of U.S. Pat. No. 10,256,770; IPR 2021-01287; Petitioner *SunSpec Alliance* vs. Patent Owner *Tigo Energy Inc*.
Maxouris, et al. "United States sets record for most Covid-19 deaths reported in one day," Jan. 13, 2021, CNN, https://www.cnn.com/2021/01/12/health/us-coronavirus-tuesday/index.html.
Texas Instruments, CMOS Ripple-Carry Binary Counter/Dividers, acquired from Harris Semiconductor SCHS030D—Revised Dec. 2003.
Excerpts from IEEE 100—The Authoritative Dictionary of IEEE Standards Terms (7th Ed. 2000).
Excerpts from Paul Horowitz & Winfield Hill—The Art of Electronics (2d. Ed. 1989).
Webeck, Evan, "Coronavirus: California sets another daily case record in possible first sign of 'surge on top of a surge,'" Jan. 5, 2021, The Mercury News (California).
Declaration of Randy R. Dunton in Support of Petition for Inter Partes Review of U.S. Pat. No. 8,933,321, Petitioner Altenergy *POwer Systems, Inc.* v. *Tigo Energy Inc.*, IPR2021-00541.
Declaration of Randy R. Dunton in Support of Petition for Inter Partes Review of U.S. Pat. No. 10,256,770, Petitioner *Altenergy Power Systems, Inc.* v. *Tigo Energy Inc.*, IPR2021-00540.
Declaration of Randy R. Dunton in Support of Petition for Inter Partes Review of U.S. Pat. No. 8,933,321, Petitioner *SunSpec Alliance* v. Patent Owner *Tigo Energy Inc.*, IPR2021-01286.
Declaration of Randy R. Dunton in Support of Petition for Inter Partes Review of U.S. Pat. No. 10,256,770, Petitioner *SunSpec Alliance* v. Patent Owner *Tigo Energy Inc.*, IPR2021-01287.
Nov. 17, 2021—CN Office Action—CN App No. 201810025083.8.
Dec. 16, 2021—EP Office Action—EP App. No. 19178054.3.
Noguchi, Short-Current Pulse-Based Maximum-Power-Point Tracking Method for Multiple Photovoltaic-and-Converter Module System, IECON, Feb. 2002.
Siri, Maximum Power Tracking in Parallel Connected Converters, IEEE, Jul. 1993.
Solero, Performance of A 10 kW Power Electronic Interface For Combined Wind/PV Isolated Generating Systems, PESC, 1996.
Wu, An Improved Dynamic Power Distribution Control Scheme for PWM Controlled Converter Modules, IEEE, 1992.
Jun. 30, 2022—Extended EP Search Report—EP App. No. 22150308.9.
Jan. 18, 2023—Chinese Notice of Allowance—CN App. No. 202010044554.7.
Jan. 30, 2024—CN Office Action—CN 202110858752.1.
Summons to Oral Proceedings Pursuant to Rule 115(1) EPC, dated Feb. 26, 2024 regarding EP Patent No. 2557650.
"Parallel connection and shunt of resistors", Fundamentals of Circuit, Wang Lianqi, Xidian university Publishing House, pp. 19-21, 2000.
Jun. 1, 2024—Chinese Office Action—CN App. No. 202110496807.9.
Subudhi et al., "A Comparative Study on Maximum Power Point Tracking Techniques for Photovoltaic Power Systems," IEEE Transactions on Sustainable Energy, vol. 4, No. 1, Jan. 2013.

\* cited by examiner

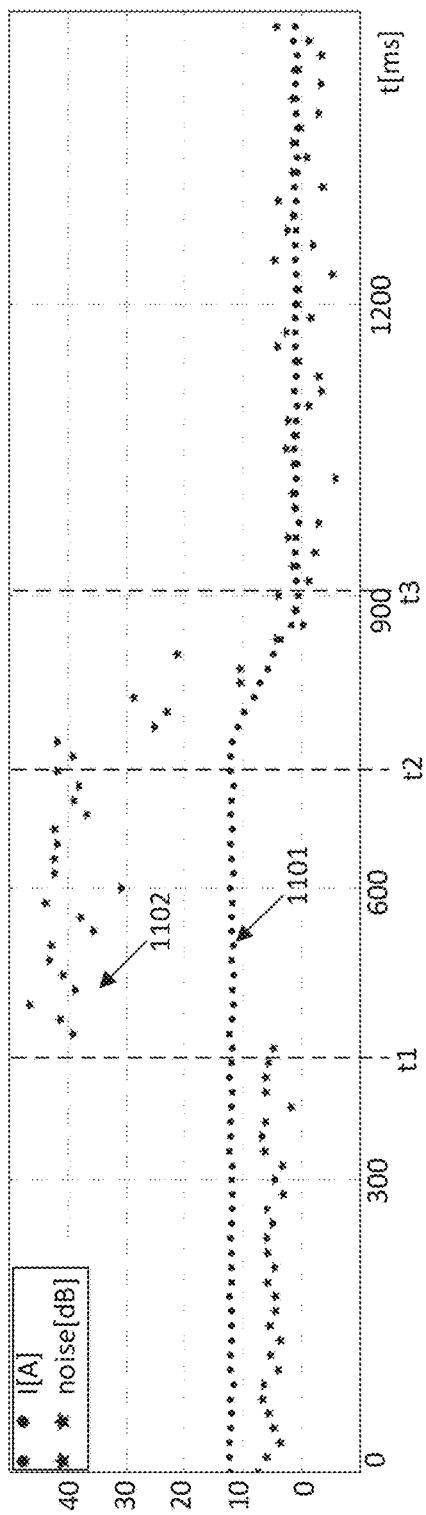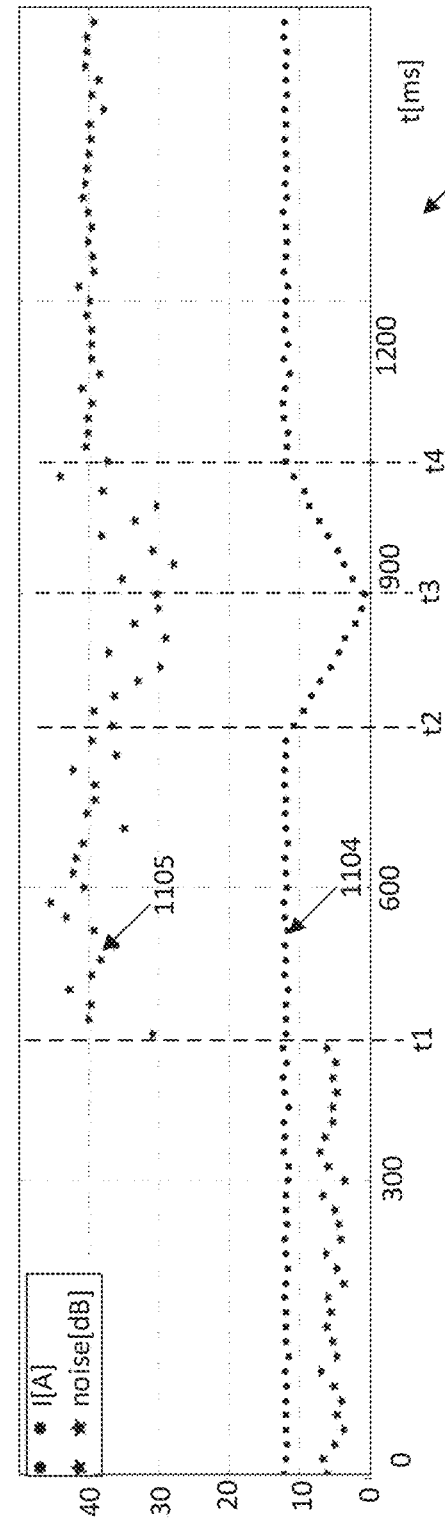

ARC DETECTION AND PREVENTION IN A POWER GENERATION SYSTEM

CROSS REFERENCE TO RELATED APPLICATIONS

The present application is a continuation of U.S. application Ser. No. 17/344,436 filed Jun. 10, 2021, which is a continuation of U.S. application Ser. No. 16/856,683 filed Apr. 23, 2020 (now U.S. Pat. No. 11,070,051), which is a continuation of U.S. application Ser. No. 15/819,903 filed Nov. 21, 2017 (now U.S. Pat. No. 10,673,229), which is a continuation-in-part (CIP) application of U.S. application Ser. No. 15/407,881, filed Jan. 17, 2017 (now U.S. Pat. No. 10,673,222), which is a continuation-in-part (CIP) application of U.S. application Ser. No. 13/290,528, filed Nov. 7, 2011 (now U.S. Pat. No. 9,647,442), which claims priority to United Kingdom Application GB1018872.0, filed Nov. 9, 2010, all of which are incorporated herein by reference in their entirety. U.S. application Ser. No. 15/407,881 is also a continuation-in-part (CIP) application of U.S. application Ser. No. 15/250,068, filed Aug. 29, 2016 (now U.S. Pat. No. 10,230,310), which claims priority to U.S. Provisional Application Ser. No. 62/318,303, filed Apr. 5, 2016 and to U.S. Provisional Application Ser. No. 62/341,147, filed May 25, 2016, all of which are incorporated herein by reference in their entirety. U.S. application Ser. No. 15/407,881 also claims priority to U.S. Provisional Application Ser. No. 62/395,461, filed Sep. 16, 2016, which is incorporated herein by reference in its entirety.

FIELD

The present disclosure is related to distributed power generation systems and specifically to arc detection and prevention in photovoltaic power generation systems.

BACKGROUND

A distributed photovoltaic power generation system may be variously configured, for example, to incorporate one or more photovoltaic panels mounted in a manner to receive sunlight such as on a roof of a building. An inverter may be connected to the photovoltaic panels. The inverter typically converts the direct current (DC) power from the photovoltaic panels to alternating current (AC) power.

Arcing may occur in switches, circuit breakers, relay contacts, fuses and poor cable terminations. When a circuit is switched off or a bad connection occurs in a connector, an arc discharge may form across the contacts of the connector. An arc discharge is an electrical breakdown of a gas, which produces an ongoing plasma discharge, resulting from a current flowing through a medium such as air, which is normally non-conducting. At the beginning of a disconnection, the separation distance between the two contacts is very small. As a result, the voltage across the air gap between the contacts produces a very large electrical field in terms of volts per millimeter. This large electrical field causes the ignition of an electrical arc between the two sides of the disconnection. If a circuit has enough current and voltage to sustain an arc, the arc can cause damage to equipment such as melting of conductors, destruction of insulation, and fire. The zero crossing of alternating current (AC) power systems may cause an arc not to reignite. A direct current system may be more prone to arcing than AC systems because of the absence of zero crossing in DC power systems.

Electric arcing can have detrimental effects on electric power distribution systems and electronic equipment, and in particular, photovoltaic systems, which are often arranged in a manner that increases the risk of arching. For example, photovoltaic panels often operate at extreme temperatures due to their necessary exposure to the sun. Such conditions cause accelerated deterioration in insulation and other equipment that can lead to exposed wires. Such systems are also exposed to environmental conditions, such as rain, snow, and high humidity. Further, typical residential and/or industrial photovoltaic applications often utilize several panels connected in series to produce high voltage. Exposed conductors with high voltage in wet/humid conditions create an environment in which the probability of arching increases.

This problem of arching raises system maintenance cost and reduces the lifespan of photovoltaic panels, because photovoltaic panels and other related equipment will need to be repaired and/or replaced more frequently. Arching in photovoltaic systems also increases the risk of fire, thereby increasing operating and/or insurance cost on facilities having photovoltaic systems. The net effect of arching in photovoltaic systems is to increase the threshold at which a photovoltaic system becomes cost competitive with nonrenewable sources of energy, such as natural gas, oil, and coal.

BRIEF SUMMARY

As newly described herein, systems and methods are presented to address the problem of arching in photovoltaic systems, thereby reducing the overall cost, and extending the useful lifespan of such systems. The embodiments described herein, therefore, make deployment of photovoltaic systems in residential and industrial application more competitive with nonrenewable energy alternatives.

Methods are provided for arc detection in a photovoltaic panel system, which may include a load connectible to the photovoltaic panel with one or more mechanisms such as a power line, e.g. a DC power line. An exemplary method may measure power delivered to the load and power produced by the photovoltaic panel. These measurements may be analyzed using a suitable technique. One example of a suitable technique includes a comparison to generate, for example, a differential power measurement result. The differential power measurement result may be further analyzed using, for example, one or more static and/or dynamic threshold values. The analysis may trigger, for example, an alarm condition when the differential power measurement results deviate from one or more threshold values, either at an instant in time or over a time period when the signal is integrated or smoothed. One or more of the measurements (e.g., the second measurement), the static and/or dynamic thresholds, and/or the power measurements may be converted to a suitable format and/or modulation scheme and transmitted to a remote location. In one exemplary method, one or more of the foregoing items (e.g., the second measurement) may be modulated and transmitted (e.g., over the DC power line) to a remote location.

According to further aspects, a device for arc detection in a system may include a photovoltaic panel and a load connectible to the photovoltaic panel using, for example, a power line (e.g. a DC power line). In this aspect, the device may be variously configured to include one or more electronic modules adapted for measuring power produced by one or more photovoltaic panels and/or a distributed and/or centralized controller adapted for measuring power delivered to, for example, the load. Aspects may be variously configured to include one or more mechanisms to analyze power associated with the photovoltaic panel and/or power delivered to the load, dynamically and/or statically, in an instantaneous and/or integrated manner. The analysis may be variously configured to include, for example, dynamic and/or static comparisons of an instantaneous and/or integrated signal. Suitable comparisons may or may not include one or more thresholds. The analysis may collect historical data and determine variations from this historical data. Additionally, the analysis may include predetermined threshold values based on prior test data. Based on the dynamic and/or static comparison, one or more of the mechanisms may be operable to detect arcing when the power output of one or more photovoltaic panels is greater than the power delivered to the load.

According to further aspects, a method for arc detection may be performed in a system having, for example, a photovoltaic string and a load connectible to the photovoltaic string using, for example, a DC power line. The method for arc detection measurement may be variously configured, for example, to quantify a value associated with a noise voltage of the load and/or a noise voltage of one or more of the photovoltaic panels in the photovoltaic string. The quantities associated with the various measured noise voltages may be analyzed using a suitable technique. In one technique, a dynamic and/or static comparison is made between the various noise voltages e.g., (the noise voltage of the load compared with the noise voltage of one or more (e.g. all) of the photovoltaic panels in the photovoltaic string) producing a quantitative value such as a differential noise voltage value(s). The differential noise voltage value(s) may then be analyzed either statically and/or dynamically. In one embodiment, the differential noise voltage values(s) may be compared against one or more threshold values, statically and/or dynamically, instantaneously and/or integrated over time and then compared. Where a threshold is utilized, an alarm condition may be triggered where one or more of the aforementioned values exceed a threshold. For example, upon the differential noise voltage result being more than a threshold value then an alarm condition may be set; upon the alarm condition being set, the photovoltaic string may be disconnected. The various parameters discussed above may be analyzed locally and/or transmitted to a remote location. In one embodiment, one or more of the values may be modulated and transmitted over a DC power line. Upon the power of one or more or all of the photovoltaic panels or the power of photovoltaic string(s) being greater than the power as delivered to the load, then an alarm condition is set according to a previously defined static and/or dynamic criterion.

According to further aspects, one of the methods for arc detection may include software and/or circuits for measuring power delivered to the load and/or power produced by the photovoltaic string.

The measurement of the power of the photovoltaic string may be variously configured. In one example, the measurement involves sending instructions to measure the power output of each photovoltaic panel. The power value of each photovoltaic panel may then be transmitted and received. The power value of each photovoltaic panel may be added, thereby giving the second measurement result. The second measurement result may then be subsequently modulated and transmitted over the DC power line.

The load impedance may be changed according to a predetermined value. The power of the photovoltaic string, in this example, may then be measured again, thereby producing a third measurement result of the power of the photovoltaic string. Followed by the power of the load being measured, thereby producing a measurement result of the power of the load. The various measurements may be compared, thereby producing another differential power result. The various differential power results may thereby produce a total differential power result. In this example, upon the total differential power result being more than a threshold value, an alarm condition may be set. Upon the alarm condition being set, the photovoltaic string may be disconnected in the example. The third measurement result may be modulated and transmitted over the DC power line.

In this example, the measuring of the power of the photovoltaic string may involve sending one or more instruction to measure the power of each photovoltaic panel. The power value of each photovoltaic panel may then be transmitted and received. The power value of each photovoltaic panel may be added, thereby giving the third measurement result. The third measurement result may then be subsequently modulated and transmitted over the DC power line.

In a further example, the sending of instructions to measure power in the string may be to a master module connected to one of the panels of the string. Embodiments may also include slave modules respectively connected to other panels of the string, which may be instructed to measure power. Power measurement results may then be transmitted from the slave modules to the master module. The power measurement results may then be received by the master module, added up by the master module to produce a string power result, which may be transmitted to a central and/or distributed controller in this example.

In some embodiments disclosed herein, a plurality of photovoltaic power devices may be configured to measure voltages in a synchronized manner, which may provide increased accuracy of a summed voltage measurement. In some embodiments, both the voltage measurements and the transmission of associated voltage measurements may be synchronized (e.g., time-synchronized, etc.). The voltage measurements may be taken at input and/or at output terminals of photovoltaic generators (e.g., photovoltaic panels, cells, substrings, etc.), in serial or in parallel photovoltaic strings. According to some aspects, the voltage measurements may be retransmitted in response to a transmission error and/or as a redundancy feature, which may prevent transmission errors or may address other issues.

In some embodiments, photovoltaic power devices may feature multiple output voltage terminals. In some embodiments, photovoltaic generators and photovoltaic power devices may be coupled together and/or may be arranged to provide a plurality of lower-impedance voltage loops. Designing photovoltaic string to have lower-impedance voltage loops may, in some embodiments, provide certain advantages. These advantages may include increasing a voltage sensor's ability to detect high-frequency voltage components, which may indicate an arcing condition. According to some aspects, a lower-impedance voltage loop may also provide a way of determining a location of an arcing condition.

BRIEF DESCRIPTION OF THE DRAWINGS

The disclosure herein makes reference to the accompanying drawings, wherein:

FIG. 11a shows a first example result of carrying out the method of FIG. 10b.

FIG. 11b shows a second example result of carrying out the method of FIG. 10b.

DETAILED DESCRIPTION

Figure 1A:
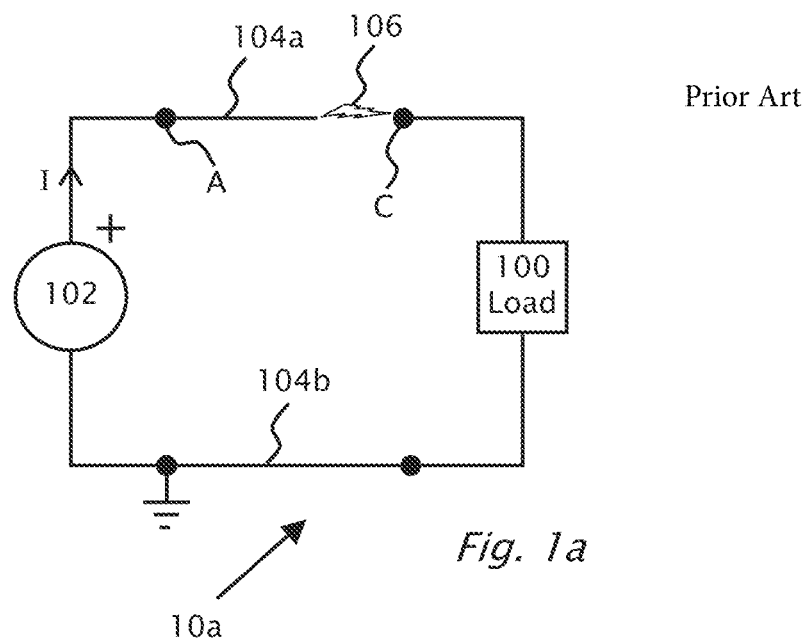
FIG. 1a illustrates an example of a circuit showing serial arcing.

Reference will now be made in detail to embodiments, examples of which are illustrated in the accompanying drawings, wherein like reference numerals refer to the like elements throughout. The embodiments are described below to explain the present disclosure by referring to the figures.

Reference is made to FIG. 1a which shows serial arcing 106 in a circuit 10a according to background art. In FIG. 1a, a direct current (DC) power supply 102 provides power between power lines 104a and 104b. Power line 104b is shown at ground potential. Load 100 connects power line 104b to power line 104a. Serial arcing may occur in any part of circuit 10a in power lines 104a, 104b or internally in load 100 or supply 102 for example. A disconnection or poor connection in power line 104a between point C and point A is shown which causes an instance 106 of serial arcing. Typically, if series arc 106 can be detected, circuit breakers (not shown) located at supply 102 or load 100 can be tripped to prevent continuous serial arcing 106.

Figure 1B:
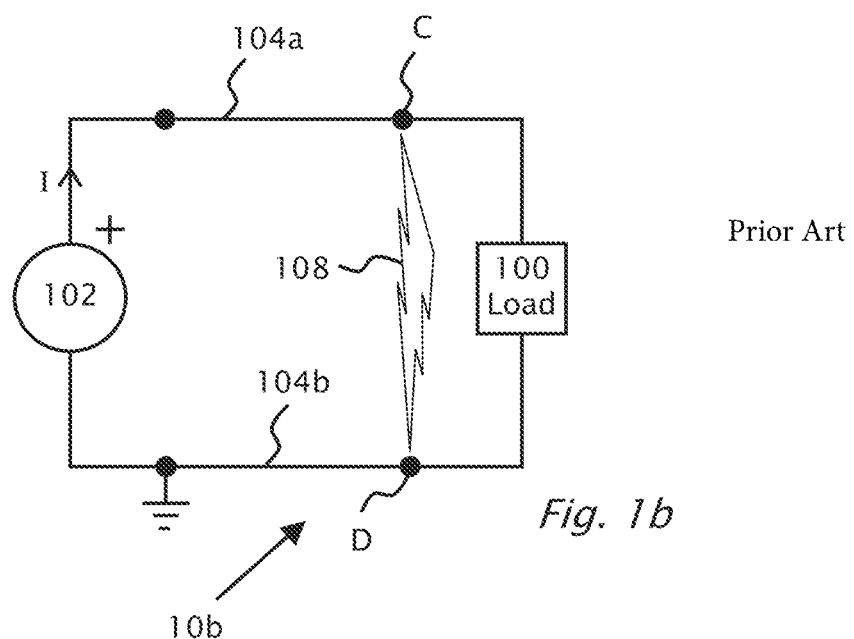
FIG. 1b illustrates the circuit of FIG. 1a showing an example of parallel or shunt arcing.

Reference is made to FIG. 1b, which shows parallel or shunt arcing 108 in a circuit 10b according to background art. In circuit 10b, a direct current (DC) power supply 102 provides power between power lines 104a and 104b. Load 100 connects power lines 104a and 104b. Parallel arcing may occur in many parts of circuit 10b, examples may include arcing between the positive of supply 102 and the ground/chassis of supply 102, if power supply cable 104a/b is a two core cable; arcing may occur between the two cores, or between the positive terminal 104a and ground 104b of load 100. Parallel arcing 108 may occur as shown between power line 104b at point D and high potential on power line 104a at point C.

Arc noise is approximate to white noise, meaning that the power spectral density is nearly equal throughout the frequency spectrum. Additionally, the amplitude of the arc noise signal has very nearly a Gaussian probability density function. The root mean square (RMS) arc noise voltage signal ($V_n$) is given in equation Eq. 1, as follows:

$$V_N = \sqrt{4KTBR} \qquad \text{Eq. 1,}$$

where:

K=Boltzmann's constant=$1.38 \times 10^{-23}$ Joules per Kelvin;

T=the temperature in degrees Kelvin;

B=bandwidth in Hertz (Hz) over which the noise voltage ($V_N$) is measured; and

R=resistance (ohms) of a resistor/circuit/load.

Figure 2:
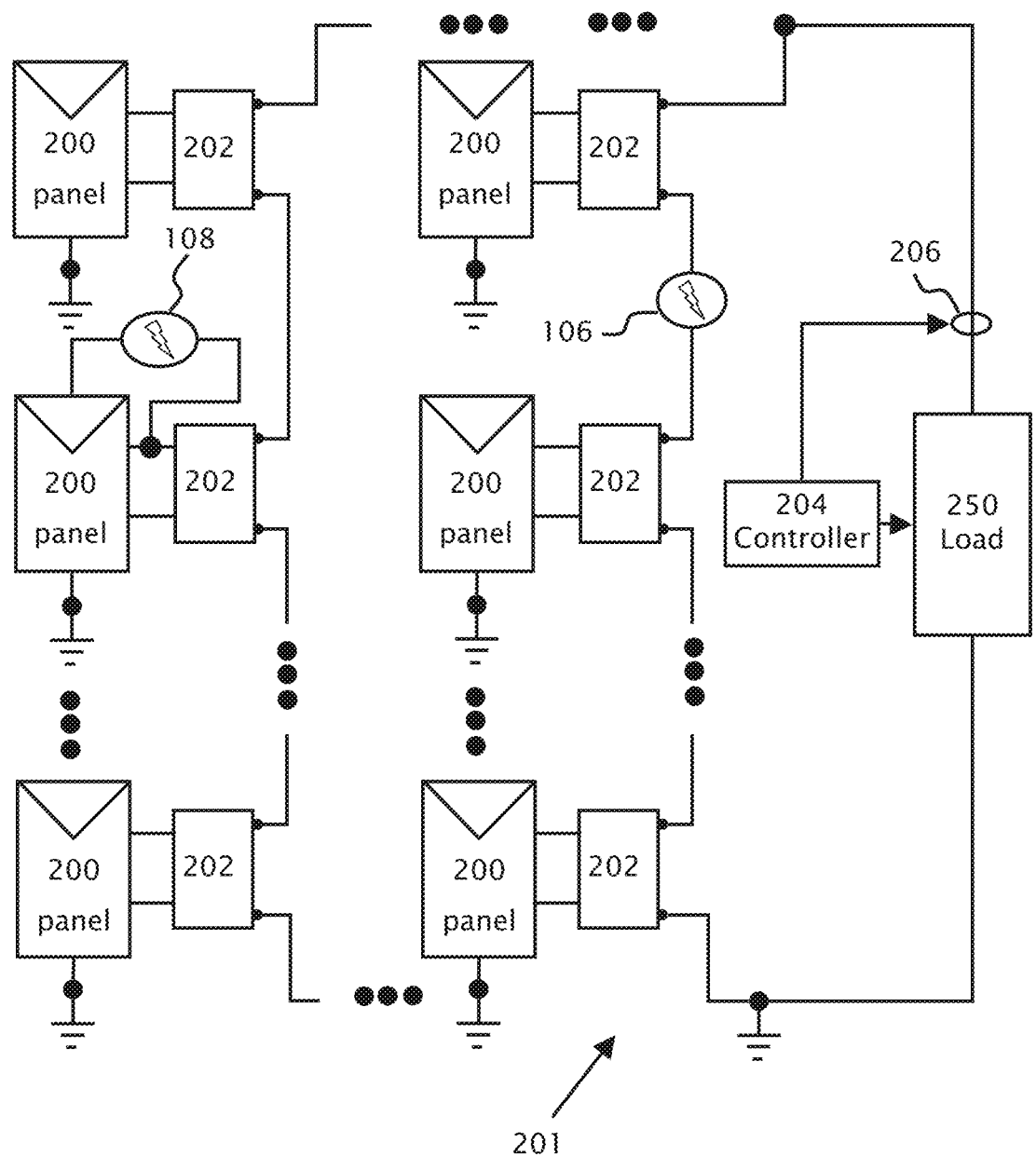
FIG. 2 shows a power generation system including an arc detection feature.

Reference is now made to FIG. 2, which shows a power generation system 201 including an arc detection feature according to an embodiment. A photovoltaic panel 200 is preferable connected to an input of a module 202. Multiple panels 200 and multiple modules 202 may be connected together to form a serial string. The serial string may be formed by connecting the outputs of modules 202 in series. Multiple serial strings may be connected in parallel across a load 250. Load 250 may be, for example, a direct current (DC) to alternating current (AC) inverter or DC-to-DC converter. An electronic module 202 may be included to measures the voltage and/or current produced by a panel 200. Module 202 may be capable of indicating the power output of a panel 200. Attached to load 250 may be a controller 204. Controller 204 may be operatively attached to modules 202 via power line communications over DC power lines connecting load 250 to the serial strings and/or by a wireless connection. Controller 204 may be configured to measure via sensor 206, the power received by load 250. Each panel 200 has a chassis, which may be connected to ground. An instance of serial arcing 106 may occur between two panels 200. An instance of parallel arcing 108 may be shown between the positive terminal of a panel 200 and ground of the panel 200.

Figure 3:
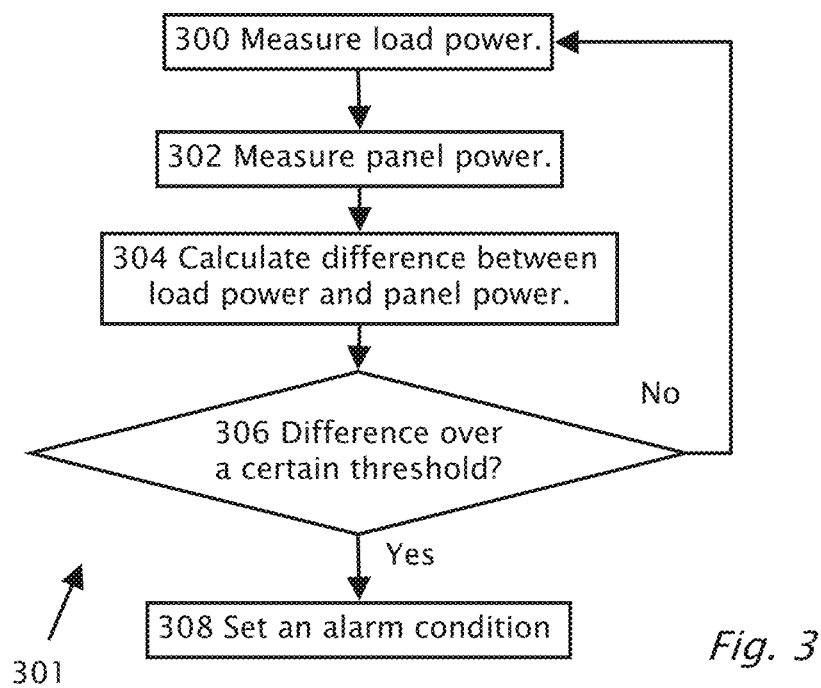
FIG. 3 shows a method for detecting serial and/or parallel arcing.

Reference is now made to FIG. 3, which shows a method 301 for detecting serial and/or parallel arcing. Central controller 204 may be configured to measure one or more parameters such as the power received by load 250 (step 300). Module 202 may be variously configured such as to measure the power of one or more panels 200 (step 302). Module 202 may be variously configured. In one embodiment, it transmits a datum representing the power measured of the one or more panels 200 via wireless or power line communications to controller 204. Controller 204 calculates the difference between power generated at panel(s) 200 and the power received at load 250 (step 304). In this example, if the difference calculated in step 304 shows that the power generated at panel(s) 200 may be greater than the power received at load 250 (step 306) according to a predefined criteria, an alarm condition of potential arcing may be set (step 308). Otherwise, in this example, the arc detection continues with step 300.

Figure 4:
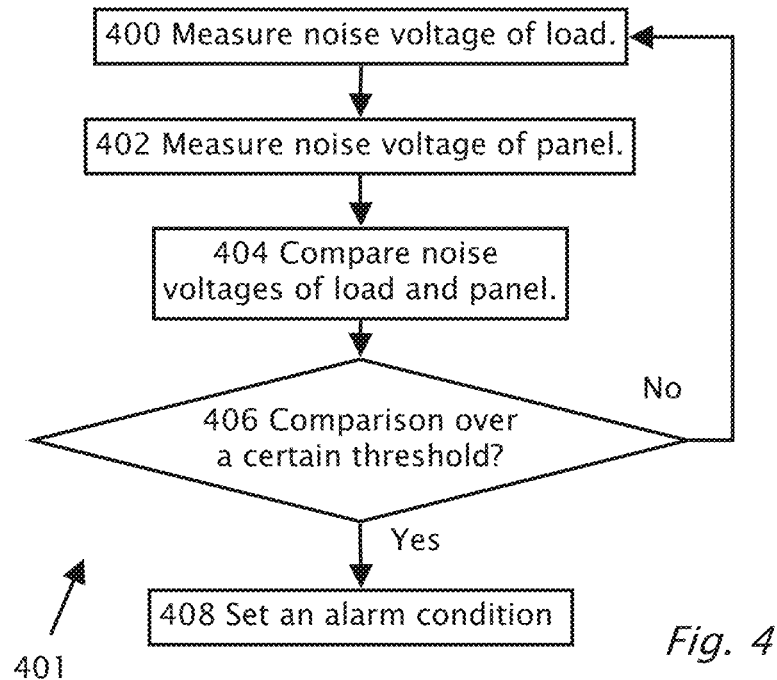
FIG. 4 shows a method for detecting serial and/or parallel arcing.

Reference is now made to FIG. 4, which shows an illustrative method 401 for detecting serial and/or parallel arcing. In a method according to this example, central controller 204 measures (step 400) the root mean square (RMS) noise voltage of load 250. Module 202 may then measure (step 402) the root mean square (RMS) noise voltage of one or more panels 200. Module 202 may be configured to transmit a datum representing the RMS noise voltage measured of panel(s) 200 via wireless or power line communications to controller 204.

One or more controllers may be configured to compare the noise voltage at panel(s) 200 with the noise voltage at the load 250 by, for example, calculating the difference between noise voltage measured at panel 200 and the noise voltage measured at load 250 (step 404). In this example, if the difference calculated in step 404 shows that noise voltage measured at panel(s) 200 may be greater than the noise voltage measured at load 250 (step 406) according to one or more predefined criteria, an alarm condition of potential arcing may be set (step 408).

Further to this example, the comparison (step 404) also may involve comparisons of previously stored RMS noise voltage levels of panel § 200 and/or load 250 in a memory of controller 204 at various times, for example, the time immediately after installation of power generation system 201. The previously stored RMS noise voltage levels of both panel § 200 and load 250 are, in this example, in the form of a look-up-table stored in the memory of controller 204. The look-up-table has RMS noise voltage levels of both panel(s) 200 and load 250 at various times of the day, day of the week or time of year for example, which can be compared to presently measured RMS noise voltage levels of both panel(s) 200 and load 250.

In this exemplary example, if the comparison of the measured load 250 RMS noise voltage datum with the measured panel(s) 200 RMS noise voltage datum may be over a certain threshold (step 406) of RMS noise voltage difference an alarm condition of potential arcing may be set (step 408) otherwise arc detection continues with step 400.

Figure 5A:
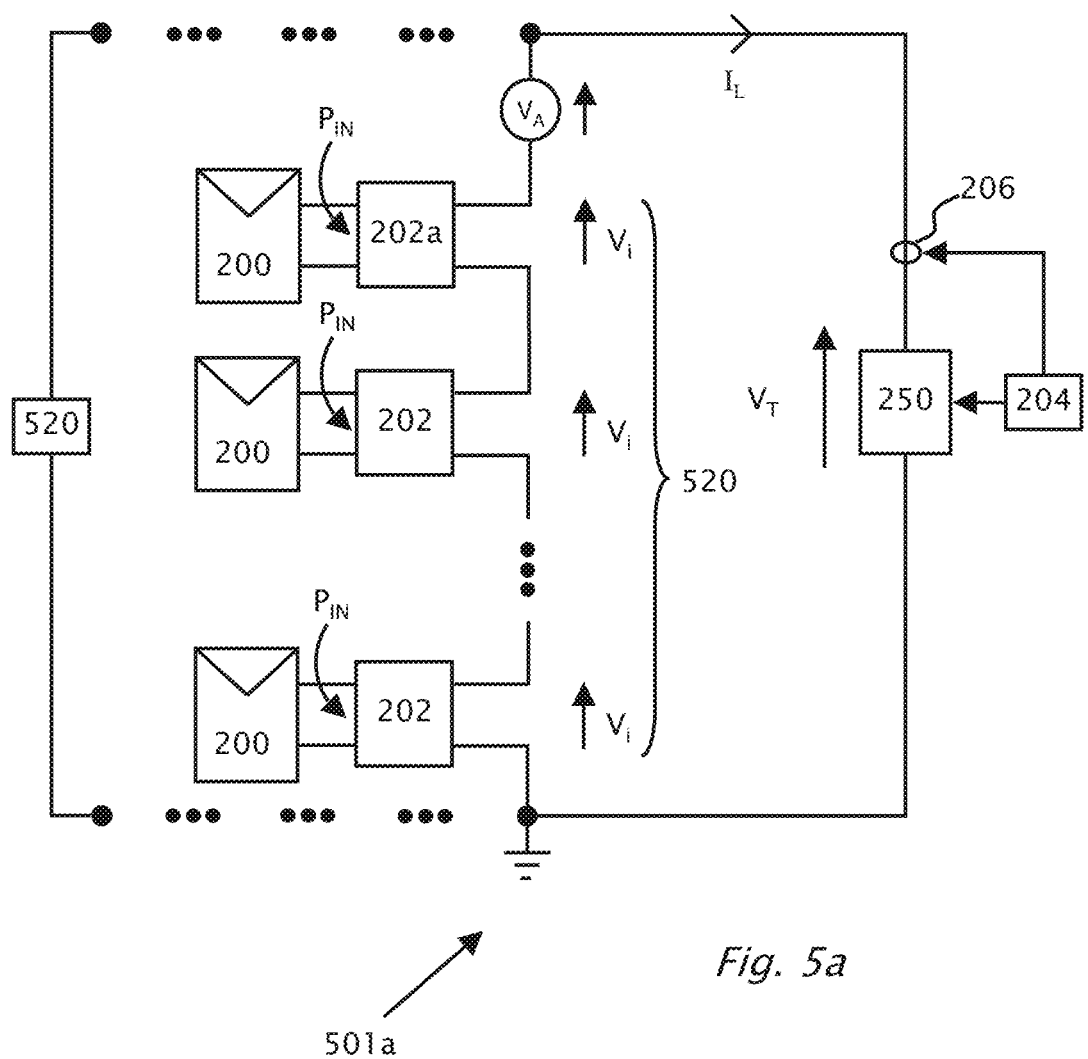
FIG. 5a shows a power generation circuit.

Reference is now made to FIG. 5a which shows a power generation circuit 501a according to an embodiment of the present disclosure. Power generation circuits 501a have outputs of panels 200 connected to the input of modules 202. The outputs of panels 200 may be configured to provide a DC power input ($P_{IN}$) to modules 202. Modules 202 may include direct current (DC-to-DC) switching power converters such as a buck circuit, a boost circuit, a buck-boost circuit, configurable buck-or-boost circuits, a cascaded buck and boost circuit with configurable bypasses to disable the buck or boost stages, or any other DC-DC converter circuit. The output voltage of modules 202 may be labeled as $V_i$.

The outputs of modules 202 and module 202a may be connected in series to form a serial string 520. Two strings 520 may be shown connected in parallel. In one string 520, a situation is shown of an arc voltage ($V_A$) which may be occurring serially in string 520. Load 250 may be a DC to AC inverter. Attached to load 250 may be a central controller 204. Controller 204 optionally measures the voltage ($V_T$) across load 250 as well as the current of load 250 via current sensor 206. Current sensor 206 may be attached to controller 204 and coupled to the power line connection of load 250.

Depending on the solar radiation on panels 200, in a first case, some modules 202 may operate to convert power on the inputs to give fixed output voltages ($V_i$) and the output power of a module 202 that may be dependent on the current flowing in string 520. The current flowing in string 520 may be related to the level of irradiation of panels 200, e.g., the more irradiation, the more current in string 520, and the output power of a module 202 is more.

In a second case, modules 202 may be operating to convert powers on the input to be the same powers on the output; so for example if 200 watts is on the input of a module 202, module 202 may endeavor to have 200 watts on the output. However, because modules 202 may be connected serially in a string 520, the current flowing in string 520 may be the same by virtue of Kirchhoff's law. The current flowing in string 520 being the same means that the output voltage ($V_i$) of a module should vary in order to establish that the power on the output of a module 202 may be the same as the power on the input of a module 202. Therefore, in this example, as string 520 current increases, the output voltage ($V_i$) of modules 202 decreases or as string 520 current decreases, the output voltage ($V_i$) of modules 202 increases to a maximum value. When the output voltage ($V_i$) of modules 202 increases to the maximum value, the second case may be similar to the first case in that the output voltage ($V_i$) may be now effectively fixed.

Modules 202 in string 520 may have a master/slave relationship with one of modules 202a configured as master and other modules 202 configured as slaves.

Since current may be the same throughout string 520 in this example, master module may be configured to measure current of string 520. Modules 202 optionally measure their output voltage $V_i$ so that the total string power may be determined. Output voltages of slave modules 202, in this example, may be measured and communicated by wireless or over power line communications, for instance to master unit 202a so that a single telemetry from module 202a to controller 204 may be sufficient to communicate the output power of the string. Master module 202a in string 520 may be variously configured, such as to communicate with the other slave modules 202 for control of slave modules 202. Master module 202a, in this example, may be configured to receive a 'keep alive' signal from controller 204, which may be conveyed to slave modules 202. The optional 'keep alive' signal sent from controller 204 communicated by wireless or over power line communications, may be present or absent. The presence of the 'keep alive' signal may cause the continued operation of modules 202 and/or via master module 202a. The absence of the 'keep alive' signal may cause the ceasing of operation of modules 202 and/or via master module 202a (i.e., current ceases to flow in string 520). Multiple 'keep alive' signals each having different frequencies corresponding to each string 520 may be used so that a specific string 520 may be stopped from producing power where there may be a case of arcing whilst other strings 520 continue to produce power.

Figure 5B:
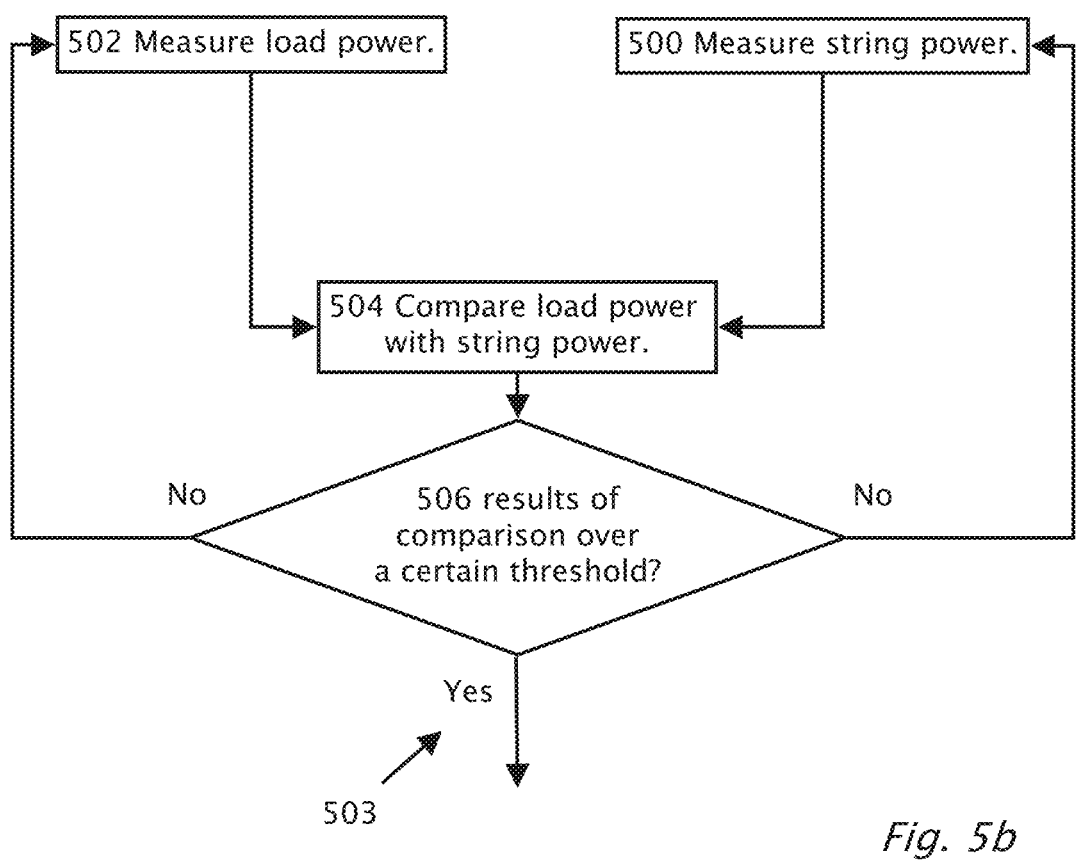
FIG. 5b shows a method for comparing a load power to a string power.

Reference is now also made to FIG. 5b which shows a method 503 for comparing a load power to a string power. In step 500, power for one or more strings 520 may be measured. In step 502, the load 250 power may be measured using central controller 204 and sensor 206. The measured load power and the measured string powers may be compared in step 504. Steps 500, 502 and 504 may be represented mathematically by Equation Eq. 2 (assuming one string 520) with reference, in this example, to FIG. 5a, as follows:

$$V_T I_L = \Sigma P_{IN} - V_A[I_L]I_L + \Sigma V_i I_L \qquad \text{Eq. 2,}$$

where:

$V_A[I_L]$=the arc voltage as a function of current $I_L$;
$V_T I_L$=the power of load 250;
$\Sigma P_{IN}$=the power output of modules 202 when modules 202 may be operating such that the output voltage ($V_i$) of a module varies in order to establish that the power on the output of a module 202 may be the same as the power on the input of a module 202 ($P_{IN}$); and
$\Sigma V_i I_L$=the power output of modules 202 with fixed voltage outputs ($V_i$) and/or power output of modules 202 (with variable output voltage $V_i$) when string 520 current decreases sufficiently such that the output voltage ($V_i$) of modules 202 increases to a maximum output voltage level value. In all cases, the maximum output voltage level value ($V_i$) and fixed voltage outputs ($V_i$) may be pre-configured to be the same in power generation circuit 501a.

The comparison between string power of string 520 and of the power ($V_T \times I_L$) delivered to load 250 may be achieved by subtracting the sum of the string 520 power ($\Sigma P_{IN} + \Sigma V_i I_L$) from the power delivered to load 250 ($V_T \times I_L$) to produce a difference. If the difference may be less than a pre-defined threshold (step 506), the measurement of power available to string 520 (step 500) and load 250 (step 502) continues. In decision block 506, if the difference may be greater than the previously defined threshold, then an alarm condition may be set and a series arc condition may be occurring. A situation of series arcing typically causes the transmission of a 'keep alive' signal to modules 202 from controller 204 to discontinue, which causes modules 202 to shut down. Modules 202 shutting down may be a preferred way to stop series arcing in string 520.

Figure 5C:
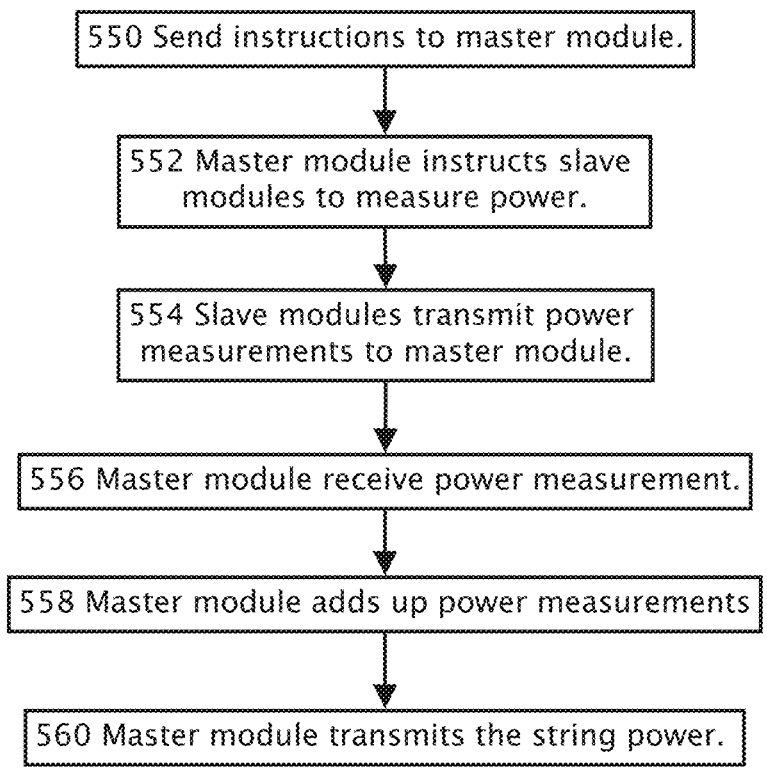
FIG. 5c shows a method for measuring power of a string.

Reference is now made to FIG. 5c which shows method step 500 (shown in FIG. 5b) in greater detail to measure a power of a string 520. Central controller 204 may send instructions (step 550) via power line communications to master module 202a. Master module 202a may measure the string 520 current as well as voltage on the output of master module 202a and/or voltage and current on the input of master module 202a to give output power and input power of module 202a respectively. Master module may instruct (step 552) slave modules 202 in string 520 to measure the output voltage and string 520 current and/or the input voltage and current of modules 202 to give output power and input power of modules 202 respectively. Slave modules 202 may then be configured to transmit (step 554) to master module 202a the input and output powers measured in step 552. Master module 202a receives (step 556) the transmitted power measurements made in step 554. Master module 202a then adds up the received power measurements along with the power measurement made by master module 202a (step 558) according to equation Eq.2. According to equation Eq.2; $\Sigma P_{IN}$=the power output of modules 202 when modules 202 may be operating such that the output voltage ($V_i$) of a module varies in order to establish that the power on the output of a module 202 may be the same as the power on the input of a module 202 ($P_{IN}$); $\Sigma V_i I_L$=the power output of modules 202 with fixed voltage outputs ($V_i$) and/or power output of modules 202 (with variable output voltage $V_i$) when a string 520 current decreases sufficiently such that the output voltage ($V_i$) of modules 202 increases to a maximum output voltage level value. In all cases, the maximum output voltage level value ($V_i$) and fixed voltage outputs ($V_i$) may be pre-configured to be the same in power generation circuit 501a. The added up power measurements in step 558 may be then transmitted by master module 202a to central controller 204 (step 560).

Figure 5D:
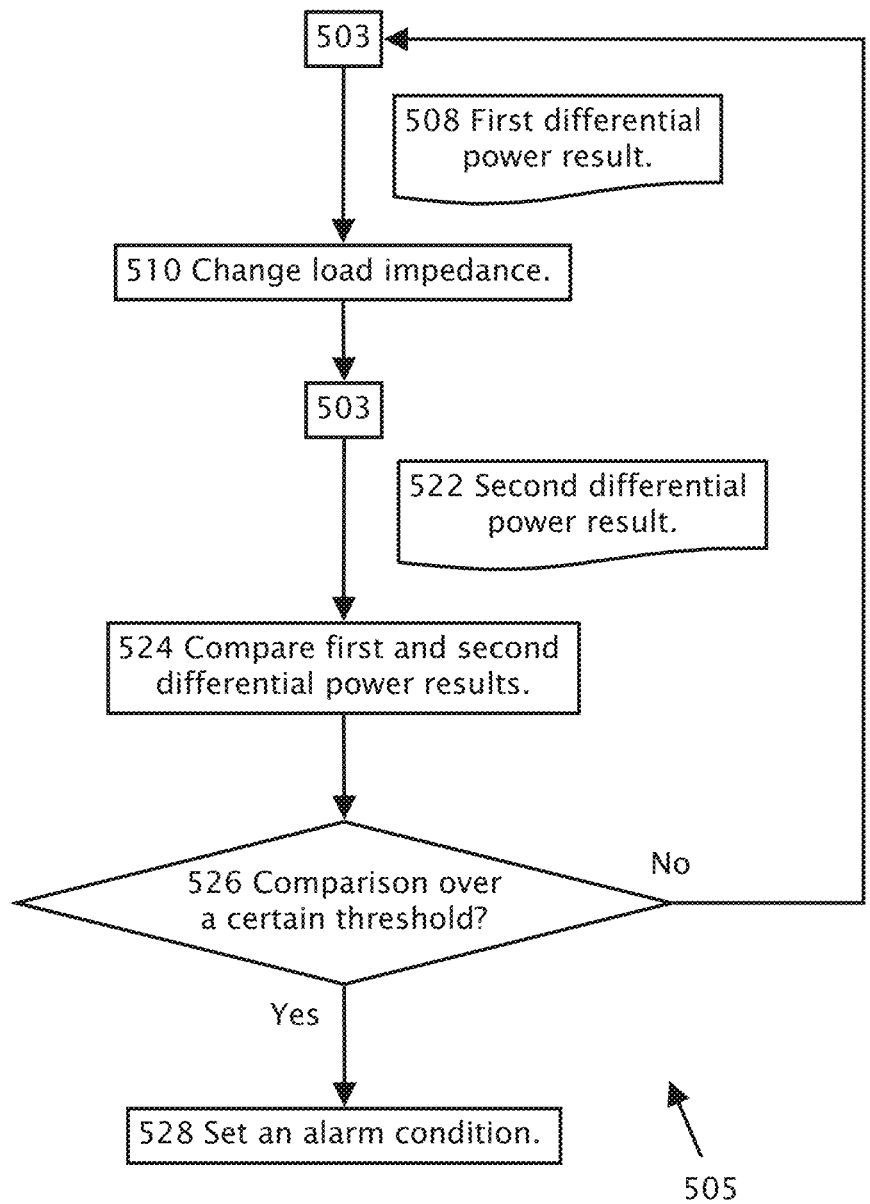
FIG. 5d shows a method for serial arc detection.

Reference is now made to FIG. 5d, which shows a method 505 for serial arc detection. First differential power result 508 occurs in circuit 501a, with load current $I_L$ now labeled as current $I_1$ and with voltage $V_T$ across load 250 (as shown in FIG. 5a). First differential power result 508 may be produced with reference to FIG. 5a and equation Eq.3 (below) as a result of performing method 503 (shown in FIG. 5b). Eq. 3 is as follows:

$$V_T I_1 = \Sigma P_{IN} - V_A[I_1]I_1 + \Sigma V_i I_1 \qquad \text{Eq. 3,}$$

where:

$V_A[I_1]$=the arc voltage as a function of current $I_1$;
$V_T I_1$=the power of load 250;

$\Sigma P_{IN}$=the power output of modules 202 when modules 202 may be operating such that the output voltage ($V_i$) of a module varies in order to establish that the power on the output of a module 202 may be the same as the power on the input of a module 202 ($P_{IN}$); and $\Sigma V_i I_L$=the power output of modules 202 with fixed voltage outputs ($V_i$) and/or power output of modules 202 (with variable output voltage $V_i$) when string 520 current decreases sufficiently such that the output voltage ($V_i$) of modules 202 increases to a maximum output voltage level value. In all cases, the maximum output voltage level value ($V_i$) and fixed voltage outputs ($V_i$) may be pre-configured to be the same in power generation circuit 501a.

The impedance of load 250 may be adjusted (step 510) optionally under control of central controller 204. Typically, if load 250 is an inverter, controller 204 adjusts the input impedance of load 250 by variation of a control parameter of the inverter. A change in the input impedance of load 250 causes the voltage across the input of load 250 to change by virtue of Ohm's law. The voltage ($V_T$) as shown in circuit 501a across load 250 may be therefore made to vary an amount $\Delta V$ as a result of the input impedance of load 250 being adjusted. The voltage across load 250 may be now $V_T + \Delta V$ and the load 250 current ($I_L$) may be now $I_2$.

A second differential power result 522 may be now produced as a result of performing again method 503 (shown in FIG. 5c) on the adjusted input impedance of load 250 performed in step 510. Second differential power result 522 may be represented mathematically by equation Eq. 4, as follows:

$$(V_T + \Delta V)I_2 = \Sigma P_{IN} - V_A[I_2]I_2 + \Sigma V_i I_2 \qquad \text{Eq. 4,}$$

where:

$V_A[I_2]$=the arc voltage as a function of current $I_2$;
($V_T + \Delta V$) $I_2$=the power delivered to load 250;

$\Sigma P_{IN}$=the power output of modules 202 when modules 202 may be operating such that the output voltage ($V_i$) of a module varies in order to establish that the power on the output of a module 202 may be the same as the power on the input of a module 202 ($P_{IN}$); and $\Sigma V_i I_L$=the power output of modules 202 with fixed voltage outputs ($V_i$) and/or power output of modules 202 (with variable output voltage $V_i$) when string 520 current decreases sufficiently such that the output voltage ($V_i$) of modules 202 increases to a maximum output voltage level value. In all cases, the maximum output voltage level value ($V_i$) and fixed voltage outputs ($V_i$) may be pre-configured to be the same in power generation circuit 501a.

The first differential power result 508 may be compared with the second differential power result 522 (step 524), for example, using controller 204 to subtract the first differential power result 508 from the second differential power result 522 to produce a difference. The difference may be expressed by equation Eq. 5, which may be as a result of subtracting equation Eq.3 from equation Eq.4, as follows:

$$V_T I_1 - (V_T + \Delta V)I_2 = V_A[I_2]I_2 - V_A[I_1]I_1 + \Sigma V_i(I_1 - I_2) \qquad \text{Eq. 5}$$

The summed output power ($P_{IN}$) of each module 202 for circuit 501a may be thus eliminated.

Equation Eq. 5 may be re-arranged by controller 204 by performing a modulo operator function on equation Eq.5 to obtain an arc coefficient α as shown in equation Eq. 6.

$$\frac{V_T I_1 - (V_T + \Delta V) I_2}{(I_1 - I_2)} = \alpha + \sum V_i \quad \text{Eq. 6}$$

where the arc coefficient α is shown in Eq.7

$$\alpha = \frac{V_A[I_2]I_2 - V_A[I_1]I_1}{(I_1 - I_2)} \quad \text{Eq. 7}$$

Controller 204, for example, may be configured to calculate coefficient α according to the above formula and measurements. A non-zero value of arc coefficient α shown in equation Eq. 7 causes an alarm condition to be set (step 528) otherwise another first differential power result 508 may be produced (step 503). A situation of series arcing typically causes the 'keep alive' signal to be removed by controller 204, causing modules 202 to shut down. Modules 202 shutting down may be a preferred way to stop series arcing in string 520.

Figure 6A:
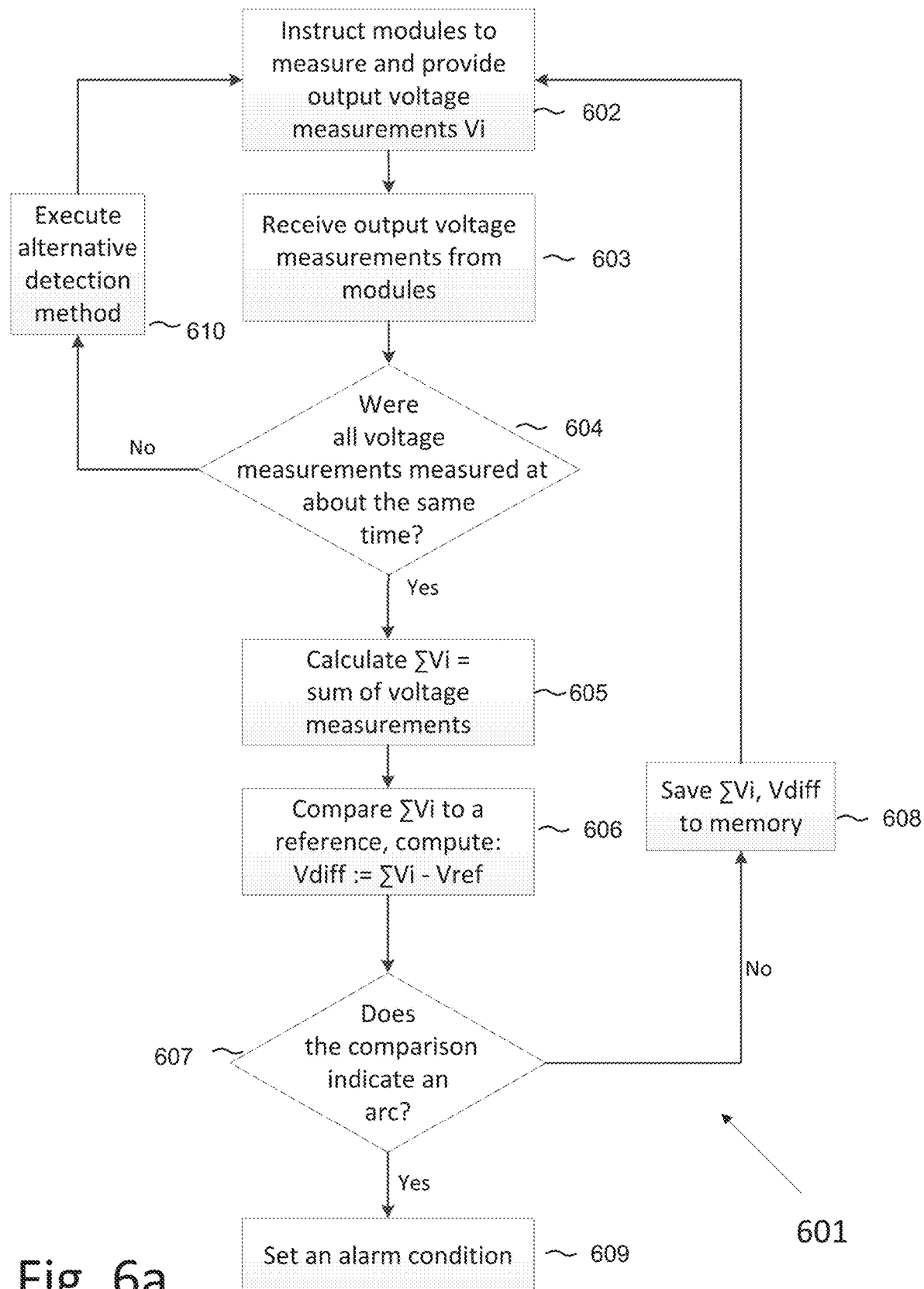
FIG. 6a shows a method of detecting an electrical arc.

Reference is now made to FIG. 6a, which shows a flow process (e.g. a method) 601 of detecting an arc. In one or more embodiments, the process 601 illustrated in FIG. 6a and/or one or more steps thereof may be performed by one or more computing devices, such as a controller computing device, which may be similar to or the same as controller 204 of FIG. 2. For example, the computing device (e.g., the controller, etc.) may be and/or include an analog circuit, microprocessor, Digital Signal Processor (DSP), Application-Specific Integrated Circuit (ASIC) and/or a Field Programmable Gate Array (FPGA). The controller may be in communication with one or more modules similar to or the same as modules 202 and may use one or more communication methods such as Power Line Communications (PLC), wireless communications (e.g. cellular communication, WiFi™, ZigBee™, Bluetooth™ or alternative protocols) and/or acoustic communication. In some embodiments, one or more aspects or steps of process 601 may be carried out by a master-module controller, e.g. a controller which may be part of a master module (e.g., module 202a).

For illustrative, non-limiting purposes, process 601 will be described as carried out by controller 204 which may be in communication with modules 202 (e.g. in communication with modules 202 comprising communication and/or control devices) as shown in and described with respect to FIG. 2. Process 601 may be similarly used with regard to different arrangements of power modules, controllers, and other devices. According to some embodiments, controller 204 may be included in and/or in communication with a device such as a power module (e.g. power modules 202), combiner box, photovoltaic inverter, etc. According to some devices, controller 204 may be connected and/or wirelessly coupled to power modules and/or other PV devices. According to some devices, controller 204 may be a remote server configured for remote control of a PV power system. Any of the disclosed steps of FIG. 6a (and/or associated descriptions herein) may be omitted, be performed in other than the recited other, repeated, and/or combined.

Process 601 may begin at step 602, where a computing device (e.g., the controller 204) may instruct (e.g., via one or more communication methods disclosed herein) a plurality of string-connected modules (e.g. modules 202) to measure one or more electrical parameters. These electrical parameters may be module-based parameters (e.g., a module output voltage $V_i$). In some embodiments, the instruction may indicate a time or a timestamp at which a module may begin measuring the output voltage and/or may indicate a time interval at which a module may begin measuring the output voltage after an event, such as after receiving the instruction from the controller 204.

In some embodiments, the taking of measurements of an electrical parameter may be synchronized, which may be used to facilitate summing of the measured parameters. For example, the controller 204 may send instructions to synchronize voltage measurements, which may be used to determine a total string voltage by summing one or more of the individual time-synched voltage measurements.

In another example, an instruction sent at step 602 may comprise an instruction for a module (e.g., in a serial string of modules) to sample output voltage $V_i$ at the instant or right after the instruction is received by a module. According to some aspects, instructions sent at step 602 may travel at speed comparable to the speed of light, i.e., 3·10⁸ m/sec, or at some other speed. As an illustrative numerical example, if communications between the controller 204 and the modules 202 take place at about only one-third of the speed of light (e.g. about 10⁸ m/sec), and a maximum communication-path distance between any two modules 202 of the plurality of string-connected modules 202 is 100 m, the respective points in time at which each respective pair of modules 202 receives the instruction might differ by no more than about $$\frac{100}{10^8} = 1 \ \mu s.$$

If each of the plurality of string-coupled modules 202 immediately measures a voltage upon receiving the instructions, then the plurality of measurements may be considered to be substantially simultaneous (i.e., corresponding to points in time which are close enough for the sum of the measurements to be accurately representative of the total string voltage at a single point in time).

In some embodiments, an instruction sent at step 602 may include information for synchronizing the transmission of measurements, such as voltage measurements taken by the modules 202. For example, the instruction may instruct one or more of the modules 202 of FIG. 5a to measure an output voltage 10 seconds after receiving the instruction, may instruct a first module (e.g. 202a) to transmit a measured output voltage 1 second (or a corresponding number of clock cycles according to a clock that may be comprised in the module) after measuring the output voltage, may instruct a second module 202 to transmit a measured output voltage two seconds after measuring the output voltage, and so on. In this manner, each of the plurality of modules 202 may measure the module output voltage at substantially the same time, but may transmit the measurement at a different time relative to another module 202, which may decrease the likelihood of simultaneous transmissions and the likelihood of possible loss of data (e.g. dropped data packets).

In some embodiments, an instruction sent at step 602 might not instruct the modules 202 to synchronize measurement transmissions, but may instruct one or more modules 202 to wait a random period of time before transmitting a measurement. If a wide window of time is allowed for the transmissions, the probability of overlapping transmissions may be low. As an illustrative, numerical example, each module 202 may be capable of transmitting a measurement within 100 msec. If forty modules 202 transmit measurements during a 5-minute window, and each module 202 broadcasts a measurement at a random time during the 5-minute window, then with probability of $$\prod_{i=0}^{39}\left(1 - i \cdot \frac{100 \text{ ms}}{5 \cdot 60 \text{ s}}\right) = 0.77,$$

no two measurement transmissions may overlap and each transmission may be received. According to some aspects, the probability of no two transmissions overlapping may be estimated, determined or calculated by Eq. 8, which follows:

$$p_{no\_overlap} = \prod_{i=0}^{N-1}\left(1 - i \cdot \frac{\text{transmission\_time}}{\text{window\_size}}\right), \quad \text{Eq. 8}$$

where N indicates the number of transmitting modules 202, and the transmission time and window size may be selected to obtain a desired probability of non-overlapping transmissions, with N*transmission_time<=window_size. According to some aspects, a preferred configuration may include transmission_time<<window_size.

It is to be understood that the elements of measurement synchronization disclosed with regard to process 601 may be similarly applied to other methods disclosed herein. For example, one or more steps of method 500 depicted in FIG. 5c may use the measurement and/or transmission synchronization as described with regard to FIG. 6a.

In some embodiments, step 602 might not be implemented, and each module 202 in a string of modules 202 may independently measure an output voltage measurement without receiving an instruction from the controller 204. For example, each module 202 may measure an output voltage every several minutes (e.g. every minute, every five minutes, or every fifteen minutes, etc.).

In some embodiments, each module 202 may measure a direct current (DC) output voltage and/or an alternating current (AC) output voltage. For example, each module 202 may comprise a DC-to-DC converter outputting a DC output voltage (or other parameter such as current), and each module 202 may measure the output DC voltage. According to some embodiments, each module 202 may comprise a DC-to-AC converter (e.g. an inverter, or a micro-inverter, etc.) outputting an AC output voltage, and each module 202 may measure the output AC voltage (or other parameter such as current).

At step 603, the controller 204 may receive measurements (e.g., output voltage measurements) from one or more of the plurality of modules 202. In some embodiments, each module 202 may transmit a tag (e.g., a unique code, an ID code, etc.) along with a measurement. According to some aspects, the controller 204 may compare each unique tag to a list of tags (e.g., a list held in a non-transitory computer readable memory that may be coupled to and/or included in the controller) to determine whether a voltage measurement has been received from a particular module. According to some aspects, the list of tags may be obtained prior to step 602 (i.e., in a method step not explicitly denoted in FIG. 6a. For example, the step may include identifying one or more modules of the plurality of modules and storing the unique tag associated with each module.

Optionally, if one or more measurements might not have been properly received by the controller 204, the controller 204 may instruct one or more modules 202 to retransmit a measurement. For example, if a measurement is not received from a first module 202 and from a second module 202, in some embodiments, the controller 204 may instruct all or some of the modules 202 to retransmit measurements, and/or in some embodiments the controller 204 may request retransmission only from the first module 202 and/or the second module 202.

In another embodiment, one or more modules 202 may initially (e.g. in response to step 602) transmit a module output voltage measurement twice, which may provide redundancy and protection against a loss of measurements (e.g., due to overlapping transmission times). For example, in relation to Equation 8 above, if each measurement is transmitted twice, in the event of lost measurements, a probability of both measurements transmitted by a single module 202 to be lost may be very small, increasing the probability of the controller 204 receiving at least one measurement from each module 202.

At step 604, the controller 204 may determine whether one or more of the timestamps associated with the measurements received at step 602 indicate about the same time. For example, the controller 204 may evaluate a timestamp associated with one or more of the received voltage measurements to determine whether the measurements received at step 603 indicate about the same time a respective measurement may have been taken. For example, if two timestamps indicate a small or negligible difference in time (e.g., several milliseconds), the controller 204 may determine that the measurements may have been taken at about the same time. In another example, if two timestamps indicate a large or non-negligible difference in time (e.g., several seconds, tens of seconds or minutes, or larger), the controller 204 may determine the measurements to have been taken at different times (i.e., not at about the same time). If all of the measurements or all the measurements of interest are determined to have been taken at or about the same time, the controller 204 may proceed to step 605, which will be discussed below in more detail. If all of the measurements or all of the measurements of interest are determined to not have been taken at or about the same time, the controller 204 may proceed to step 610 and/or return to step 602.

In some embodiments, before returning to step 602, the controller 204 may execute step 610. At step 610, one or more alternative arc-detection steps and/or methods may be utilized. For example, at step 610, one or more voltage measurements, which may have been received from a plurality of modules 202 and may have been determined to have been measured at different times, may be used by the controller 204 to determine or estimate a corresponding voltage for each module at a particular time (e.g., according to process 650 of FIG. 6e described below in more detail). According to some aspects, the controller 204 may proceed to step 605 and may use the voltage values determined in step 610. According to some aspects, at step 610, the controller 204 may compare the received voltage measurements to previously measured voltage measurements, and may determine that an arcing condition may be present based on one or more module voltages showing a trend indicating an arcing condition (e.g. a rise or fall in a measured voltage over time).

At step 605, the controller 204 carrying out process 601 may calculate a sum of one or more of the output voltage measurements received at step 603, which may be denoted as $\Sigma V_i$ for voltage, but may be denoted as another symbol for other parameters such as current, power, etc. According to some aspects, $\Sigma V_i$ may indicate a voltage (e.g., total voltage)

across a string (e.g. 520) comprising a plurality of serially-connected modules 202 or may indicate a voltage across a portion of the string.

At step 606, the controller 204 (or other device or entity) may compare $\Sigma Vi$ to a reference parameter (e.g., voltage, current, power, etc.). For example, the reference may be a single reference voltage or a plurality of reference voltages. In some embodiments, the reference may be a sum of voltages $\Sigma Vi$ obtained from a previous execution of method 601 (e.g., a value saved at step 608, which will be discussed below in more detail). In some embodiments, the reference may be a series of voltages measured over time (e.g. ten values of $\Sigma Vi$ obtained by previous executions of method 601). In some embodiments, the reference may be a voltage measured at a different location in a power generation circuit (e.g. 501a) and/or in a power generation system (e.g. 201). In one example, the reference may be a voltage measured at the input of load 250 of FIG. 5a.

At step 607, the controller 204 may determine whether the comparison carried out at step 606 indicates an arcing condition. For example, in some embodiments, the controller 204 may compare $\Sigma Vi$ to a reference voltage measured at the input of load 250, which may be denoted as V_250, and may determine that an arcing condition may be present if Vdiff=$\Sigma Vi$-V_250>Vthresh, where Vthresh may be selected to be a minimum difference voltage that may indicate an arcing condition. In some embodiments, Vthresh may be about 1 volt. In some embodiments, Vthresh may be smaller or larger than about 1 volt. Referring back to FIG. 2, in case of a series arc 106, a voltage drop across series arc 106 (which may be referred to as Varc) may begin at a low voltage (e.g., several tens or hundreds of millivolts) and over the time, Varc may increase, such as to several volts (e.g., such as to 10 volts, 100 volts, or even higher). According to some aspects, Varc might not be measured by a module 202, but Varc may be reflected by V_250, i.e., the voltage measured at the input of load 250. For example, Varc corresponding to series arc 106 might not be included in a voltage measurement taken by modules 202, but a voltage measurement taken at the input of load 250 may include a component corresponding to Varc. By selecting a suitable Vthresh, series arc 106 may be detected before a dangerous condition arises.

In some embodiments, Vthresh may be selected according to historical data. For example, Vthresh may be selected according to differential voltages measured in power generation systems under one or more arcing conditions. In some embodiments, $\Sigma Vi$ may be compared to previously measured voltages and/or differential voltages. For example, executing method 601 ten times, once every three minutes, may generate ten different $\Sigma Vi$ results and ten differential voltage results Vdiff. If these ten Vdiff results (e.g. Vdiff1, Vdiff2, . . . , Vdiff10) indicate a trend (e.g., a rising differential voltage over a period of time) and a newly obtained Vdiff11 result continues the trend, the controller 204 may determine that an arcing condition may be present.

If the controller 204 determines at step 607 that no arcing condition might be present, the controller 204 may return to step 602 and, after a period of time, restart method 601. In some embodiments, the controller 204 may proceed from step 607 to step 608 and save the calculated values $\Sigma Vi$ and Vdiff to memory for future use, and then proceed from step 608 back to step 602. In some embodiments, the controller 204 may save, at step 608, additional data such as individual measurements received from modules (e.g. modules 202), for future reference and analysis. According to an embodiment, measurements saved at step 608 may be used at steps 653-654 of method 650, depicted in FIG. 6e.

If the controller 204 determines at step 607 that an arcing condition might be present, the controller 204 may proceed to step 609, and set an alarm condition. Setting an alarm condition may result in various safety protocols taking place.

For example, the controller 204 (or other device) carrying out method 601 may be coupled to a wired and/or to a wireless network(s)/Internet/Intranet, and/or any number of end user device(s) such as a computer, a smart phone, a tablet, and/or other devices such as servers which may be located at a location, such as a network operations center and/or power generation monitoring center. These devices may be utilized to generate a warning to warn of a dangerous condition and/or to take action to degrade or turn off certain portions of power generation circuit 501a. For example, these warnings can be audio and/or visual. According to some aspects, these warnings may be a beep, a tone, a light, a siren, an LED, or a high lumen LED. These warnings may be located or actuated at a premises, such as in a home, in a building, in a vehicle, in an aircraft, in a solar farm, on a roof, in power generation circuit 501a, etc. In one example, a warning may be centralized (such as in a server) and/or distributed to end user devices (e.g., computers, smart phones, and/or tablets). The warnings may be shown on displays coupled, attached, and/or embedded into various components of power generation circuit 501a, such as disconnects, switches, PV cells/arrays, inverters, micro inverters, optimizers, residential current devices, meters, breakers, main, and/or junction boxes, etc. The warnings may be variously coupled to a user's or installer's cell phone and/or other device (e.g., person device, computing device, etc.) to make a user aware of a circuit in a dangerous condition and/or to warn a user when the user may be approaching or in proximity to a circuit in a dangerous condition. The warnings may be coupled to or otherwise associated with GPS coordinates and/or generated in response to a device (e.g., smart phone, tablet, etc.) moving in a location proximate to a hazard condition. The measurements sent by modules 202 and/or the summed measurement $\Sigma Vi$ may be analyzed locally and/or sent to another device for further analysis, storage, and review.

In some embodiments, step 609 may include shutting down power production of a power generation system in response to an arcing condition. According to some aspects, if at step 607, the controller 204 determines that an arcing condition may be present, the controller 204 may repeat one or more steps of process 601, which may reduce the risk of a "false alarm" and/or reduce the frequency of shutting down a power generation system due to one or more inaccurate or unreliable measurements or due to measurement noise. According to some aspects, the control 24 may repeat one or more steps of process 601 more than once. According to some aspects, the execution and/or repetition of the steps of process 601 may occur in rapid succession (e.g., one second apart, several seconds apart, etc.) or may be spaced further apart (e.g., several minutes apart, several hours apart, etc.). In some embodiments, an alarm condition may be set only if two or more executions of method 601 indicate an arcing condition. According to some aspects, the process 601 may end at any time and/or after any step.

In some embodiments, method 601 may be carried out by a controller 204 coupled to multiple PV strings. The controller 204 may carry out method 601 with regard to each PV string (e.g. if ten PV strings are coupled to the controller 204, the controller 204 may execute method 601 ten times every 5 minutes, with each execution of method 601 applied to a different string). In some embodiments where the controller 204 is coupled to multiple PV strings, step 609 may further comprise indicating which string coupled to the controller 204 triggered the alarm condition (i.e. which string may be subject to an arcing condition).

Figure 6B:
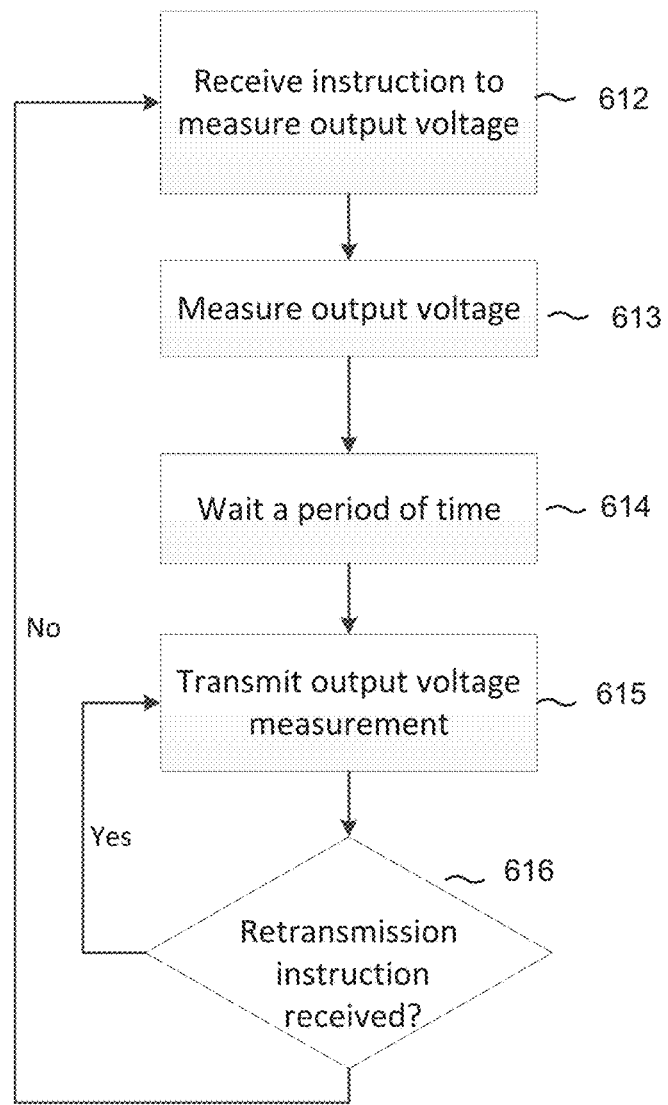
FIG. 6b shows a method for measuring an output voltage.

Reference is now made to FIG. 6b, which shows a process according to an embodiment. Process 611 may be carried out by a controller or other computing device, e.g. a device configured to control a module (e.g. a photovoltaic power device such as a DC-DC converter, a DC-AC microinverter, a disconnect switch, monitoring device and similar devices). For example, the computing device (e.g., the controller, etc.) may be and/or include an analog circuit, microprocessor, Digital Signal Processor (DSP), Application-Specific Integrated Circuit (ASIC) and/or a Field Programmable Gate Array (FPGA). The controller may control one or more modules similar to or the same as modules 202 and may use one or more communication methods such as Power Line Communications (PLC), wireless communications (e.g. cellular communication, WiFi™, ZigBee™ Bluetooth™ or alternative protocols) and/or acoustic communication For illustrative, non-limiting purposes, process 601 will be described as carried out by a controller 804 of FIG. 8a (which may be similar to or the same as controller 204 and will be discussed below in more detail), which may be a feature of power module 802 which may be similar to or the same as modules 202 of FIG. 2. The controller 804 carrying out method 611 may be in communication with a second controller 204 carrying out method 601, e.g. using Power Line Communications (PLC), wireless communications or acoustic communications. For example, method 611 may be carried out by a controller included in a power module, and method 601 may be carried out by a controller included in a PV inverter in electrical communication with the power module. The controller 804 may measure control one or more sensors for measuring electrical parameters associated with the module, such as input and/or output voltage, current, power, solar irradiance and/or temperature, for example, sensor/sensor interface(s) 805 of FIG. 8a which may be similar to or the same as sensor 206 and will be discussed below in more detail). If sensor/sensor interface(s) 805 include a voltage sensor, the voltage sensor may be placed in parallel to detect a voltage at an input or output of, for example module 802 of FIG. 8a.

At step 612, the controller 804 may receive an instruction (e.g., originating from a second controller 204 carrying out step 602 of method 601) to measure a parameter (e.g., input and/or output voltage, current, power, solar irradiance and/or temperature) of an associated module (e.g., a module 202 of FIG. 2).

At step 613, the controller (e.g. controller 804) may instruct an associated sensor to measure an output voltage of a module (e.g., module 202), and the voltage measurement may be saved to memory (e.g. memory device 809 of FIG. 8a, which will be discussed below in more detail). In some embodiments, the controller 804 may receive an instruction (e.g., at step 612 or at another time) that may indicate a certain time for carrying out one or more aspects of step 613. For example, the instruction received at step 612 may instruct the controller 804 to measure the output voltage at a time (e.g., at 1:00:00 pm), or may instruct the controller to measure the output voltage after a predetermined period of time (e.g., 3 seconds after receiving the instruction).

At step 614, the controller 804 may determine a period of time before the controller 804 instructs communication device 806 transmits the voltage measurement at step 615. In some embodiments, the instruction received at step 612 (or at another time) may indicate a time at which step 615 should be carried out, which may reduce the probability of multiple controllers transmitting simultaneously. For example, the instruction received at step 612 may indicate that the output voltage may be transmitted at 1:00:01 pm (i.e., one second after measuring). In some embodiments, the controller 804 may select a period of time (e.g., a random or pseudo random period of time, etc.) to wait before transmission. For example, the controller 804 may select a random period of time between 1 second and fifteen minutes (e.g., according to a uniform distribution) to wait before transmitting the voltage measurement.

At step 615, the voltage measurement is transmitted to an associated controller (e.g., a controller 204 carrying out method 601). In some embodiments, the voltage measurement may be transmitted along with additional information, for example, an identification (ID) tag associated with the controller and/or a timestamp indicating the time/timestamp (or other description) at which the voltage measurement was obtained. In some embodiments, at step 615, the voltage measurement may be transmitted more than once, which may increase the probability that the measurement will be received at least once by a receiving second controller.

At step 616, the controller 804 may receive an instruction to retransmit a voltage measurement. for example, the controller 804 may retransmit a voltage measurement if a communication may have been lost and/or not received by another component, such as due to a transmission error. If such an instruction is received, the controller 804 may loop back to step 615 and retransmit. If no such instruction is received, the controller 804 may return to step 612 and wait to receive additional instructions to measure output voltage. According to some aspects, the process 611 may end at any time and/or after any step.

Figure 6C:
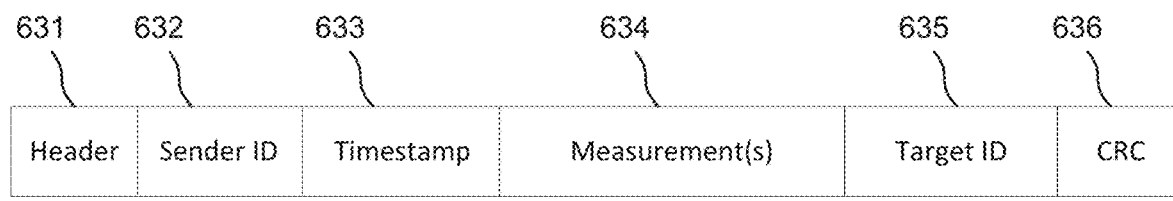
FIG. 6c shows an example data packet.

Reference is now made to FIG. 6c, which illustrates a data packet 630 according to one or more disclosed aspects. Data packet 630 may comprise one or more elements, such as a sender ID tag 632, a timestamp 633 and one or more measurements 634. The sender ID 632 tag may indicate an identification (e.g., a unique ID) of an associated controller or module sending data packet 630. The measurements 634 may comprise one or more measurements obtained by sensors at a module (e.g. 202 or 802), for example, voltage, current, power, temperature and/or irradiance measured at or near a module (e.g., modules 202). The timestamp 633 may indicate the time at which the measurements 634 were obtained and/or measured. If several measurements were taken at different times, several timestamps 633 may be included for respective measurements. In some embodiments (e.g., in a case where the packet may be received by a device which might not be the intended final recipient), the packet may include a target ID tag 635 corresponding to an intended or subsequent recipient. In some embodiments, the packet may include a header 631 comprising metadata regarding the packet contents and may include a cyclic redundancy check (CRC) portion 636, which may provide increased data integrity.

According to some aspects, data packet 630 may be sent at step 615 of method 611 and/or may be received at step 603 of FIG. 6a. The timestamp 633 of data packet 630 may be read and/or processed (e.g. by a controller 204) at step 604 to verify that data packet 630 was received at about the same time as one or more other data packets. According to some aspects, the data packet 630 may comprise measurements 634 that may be used (e.g. by a controller 204) at step 605 to calculate a sum of voltages (or other parameters) measured by a plurality of modules (e.g. 202).

Figure 6D:
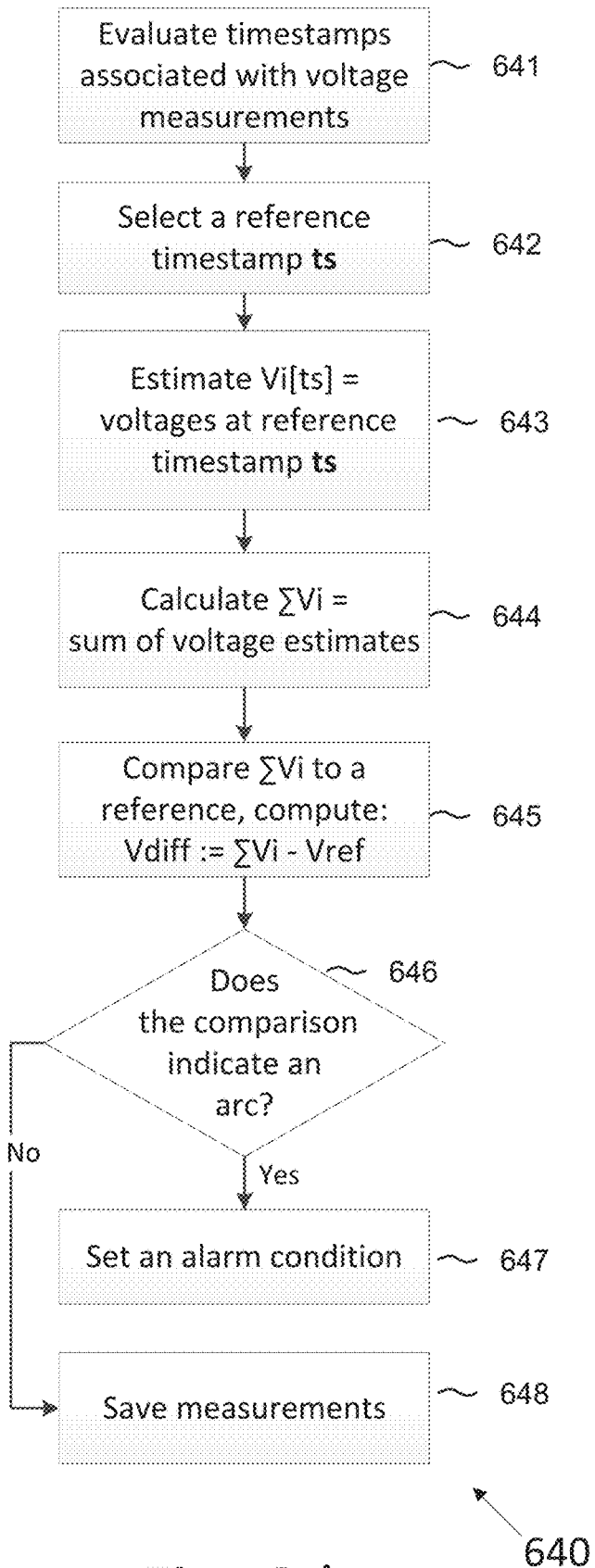
FIG. 6d shows a method for detecting an electrical arc.

Reference is now made to FIG. 6*d*, which illustrates a process for arc detection according one or more disclosed aspects. According to some aspects, step 610 of process 601 may include one or more steps of process 640. Process 640 may be used by a controller (e.g., controller 204) to detect or determine an arcing condition using one or more parameter measurements (e.g., voltage measurements), which might not have been measured and/or obtained at about the same time. For example, one measurement may have been obtained at a first time and a second measurement may have been obtained at a second time.

At step 641, a controller (e.g. 204) carrying out method 640 may evaluate a group of timestamps 633 corresponding to a respective measurement 634 of a group of parameter measurements 634 (e.g., voltage measurements, current measurements, etc.). For example, the controller may read a plurality of timestamps 633 and determine that the timestamps 633 might not be about the same (e.g. the timestamps 633 might indicate a plurality of points in time differing by seconds, tens of seconds, minutes or hours).

At step 642, the controller 204 may select a reference timestamp ts. In some embodiments, the reference timestamp may be one of the group of timestamps 633 (e.g., the earliest timestamp, the latest timestamp, an intermediate timestamp, or the median timestamp, etc.). In some embodiments, the reference timestamp ts might not correspond to one of the group of timestamps 633 (e.g., may be an average of two or more timestamps in the group of time stamps or may be a random time within the range of timestamps).

At step 643, the controller 204 may determine a plurality of voltage estimates, calculations, or approximations corresponding to the measured voltages at the reference timestamp ts. For example, if at step 641 the controller 204 evaluates timestamps t1, t2, t3 and t4 corresponding to the voltages $V_1[t1]$, $V_2[t3]$, $V_3[t3]$ and $V_4[t4]$ (e.g., voltages measured at four different modules 202), at step 643, the controller 204 may determine the voltages $\tilde{V}_1[ts]$, $\tilde{V}_2[ts]$, $\tilde{V}_3[ts]$ and $\tilde{V}_4[ts]$ (i.e., the voltages at the four modules 202 at the timestamp ts). According to some aspects, the controller may determine these voltage estimates by interpolation, regression analysis, etc. Aspects of step 643 are discussed below in more detail with respect to FIG. 6*e*.

At step 644, the controller (e.g. 204) carrying out method 640 may calculate a sum of the output voltage measurements estimated or determined at step 643, which may be denoted ΣVi. ΣVi may indicate a total voltage across a string (e.g., 520) or portion of a string 520 comprising a plurality of serially-connected modules 202.

Steps 645, 646 and 647 may be similar to or the same as steps 606, 607 and 609, respectively, of process 601, but may instead use a value determined in step 644. Step 648 may be similar to or the same as step 608 of method 601, but may instead use a value determined in step 644. According to some aspects, the process 640 may end at any time and/or after any step.

Figure 6E:
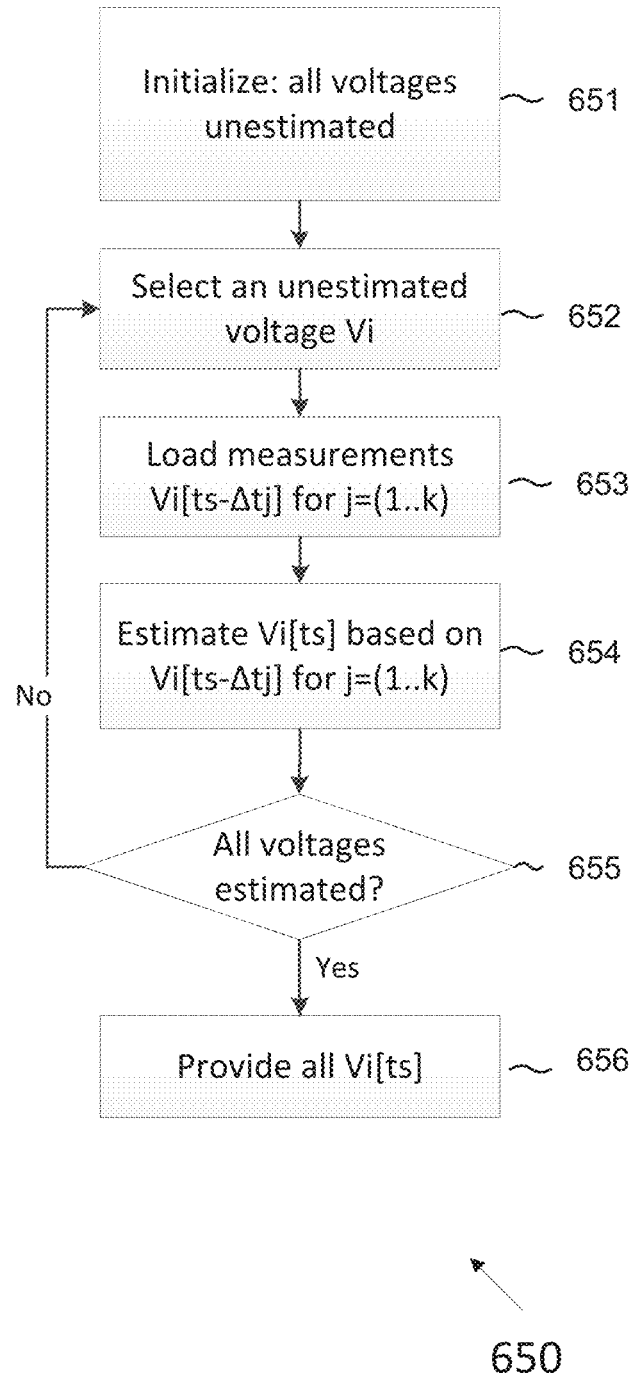
FIG. 6e shows a method for estimating voltages in a photovoltaic system.

Reference is now made to FIG. 6*e*, which illustrates a process for estimating parameters (e.g. voltages) at a particular timestamp, according to an embodiment. Method 650 may be used to estimate or determine voltage drops at a reference timestamp, for example, as step 643 of method 640 depicted in FIG. 6*d*. At step 651, all voltages to be estimated (e.g., $V_1[ts]$, $V_2[ts]$, etc.) may be initialized by the controller 204 to an "unestimated" state or an "unapproximated" state. For example, the controller 204 may recognize one or more voltages that may be used by the controller 204 in the determination of an arc condition.

At step 652, the controller 204 may select an unestimated voltage $V_i$ (e.g., $V_1$) for estimation.

Estimation may comprise, for example, a direct calculation, probabilistic calculation, lookup and/or reception (e.g. via wired or wireless communication) of an estimated or determined value.

At step 653, the controller 204 may load previously measured or obtained (e.g., measured at step 608 of method 601 in a past execution of method 601) measurements of $V_i$. For example, the controller may load k previous measurements of $V_i$, where k is a positive integer. In systems where $V_i$ may change slowly and/or in a substantially predictable manner, the parameter k may be small, for example, k may be 1, 2 or 3. According to some aspects, an elapsed period of time between the timestamp of the j-th previous voltage measurement and the reference timestamp ts may be referred to, for notational convenience, as $\Delta t_j$, with j being a positive integer less than or equal to k.

At step 654, the controller 204 may determine an approximated voltage $V_i[ts]$, with the approximation denoted $\tilde{V}_i[ts]$. According to some aspects, the controller 204 may use the previous voltage measurements loaded at step 653 as input to an appropriate estimation algorithm.

In some embodiments, a voltage $V_i$ may vary slowly over time, and an estimated voltage at the reference timestamp may be $\tilde{V}_i[ts]=V_i[ts-\Delta t_1]$, i.e., k=1 and the voltage at the reference timestamp may be determined to be the same as the last measurement. In another embodiment, an estimated voltage at the reference timestamp may be calculated by fitting previous voltage measurements to a linear curve, for example, using the formula:

$$\tilde{V}_i[ts] = V_i[ts - \Delta t_1] + \frac{V_i[ts - \Delta t_1] - V_i[\Delta t_1 - \Delta t_2]}{\Delta t_1 - \Delta t_2} \cdot (ts - \Delta t_1)$$

i.e., where k=2. In embodiments where $V_i$ may change more rapidly or in a more complicated manner, k may be greater than 2, and higher-order polynomials, sophisticated functions such as exponential and/or logarithmic functions, or statistical models may be used to estimate $\tilde{V}_i[ts]$. A threshold (e.g., a threshold used at step of method 601 607 or step 646 to determine whether a discrepancy between a sum of voltages and a reference voltage indicates an arcing condition) may be selected according to a statistical error in estimating $\tilde{V}_i[ts]$. For example, if $\tilde{V}_i[ts]$ can be estimated with high accuracy, a small threshold may be used (i.e., even a small discrepancy between a sum of voltages and a reference voltage may trigger an alarm condition indicating arcing). According to some aspects, a greater threshold may be used. According to some aspects, the voltage $V_i$ may be marked as "determined," "estimated," or "approximated."

At step 655, the controller 204 may determine whether one or more (or all) voltages $V_i$ have been estimated. If all voltages (or the voltages of interest) have been estimated, the controller 204 may proceed to step 656 and provide the estimated voltages $V_i$ for further analysis (e.g. to be used by a controller and/or a computing device at step 644 of process 640). If it is determined that one or more voltages (i.e., one or more voltages of interest) might not have been estimated, the process 650 may loop back to step 652. The process 650 may end at any time and/or after any step.

Figure 6F:
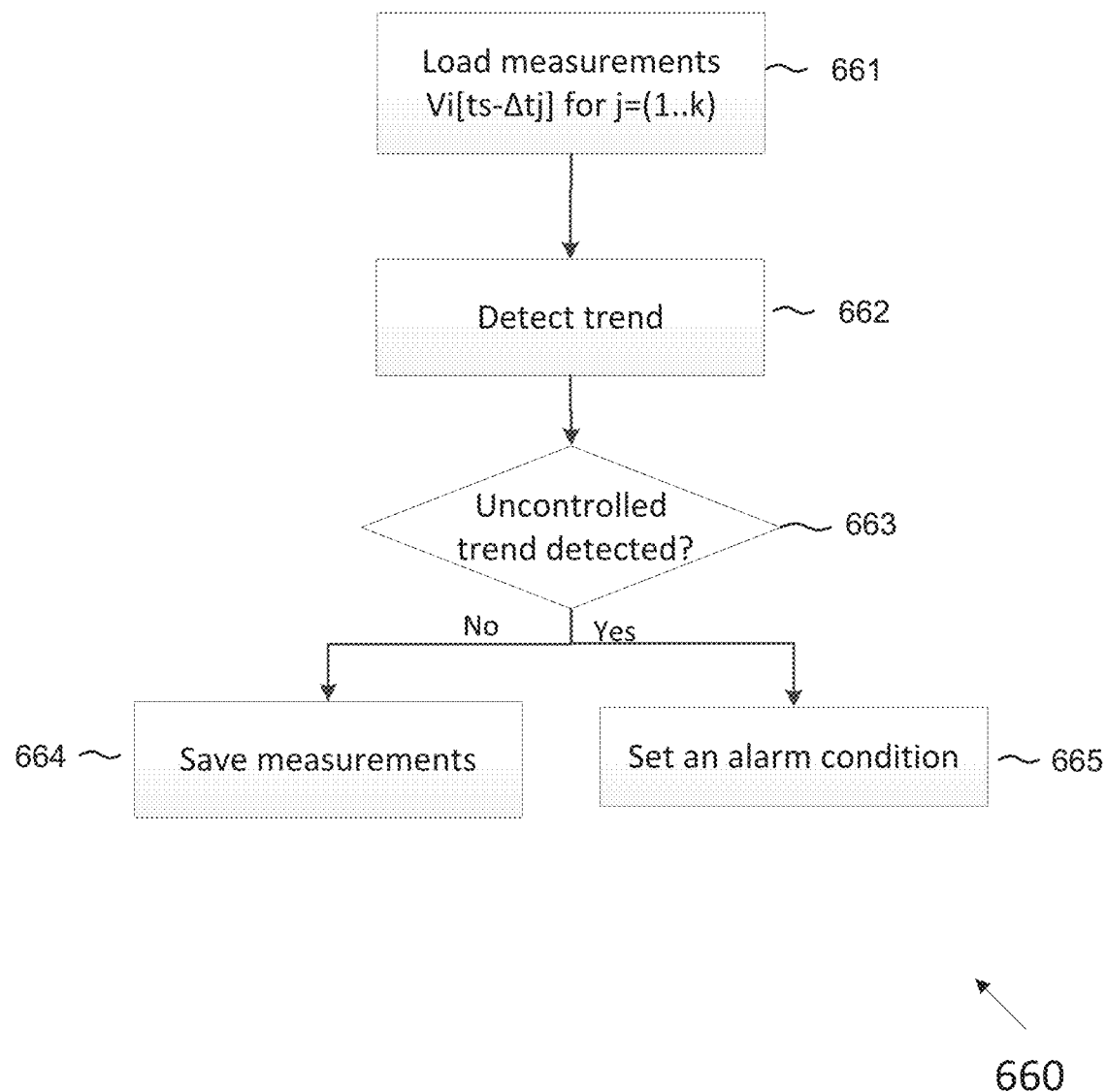
FIG. 6f shows a method for detecting an electrical arc.

Reference is now made to FIG. 6*f*, which illustrates a process 660 for detecting an arcing condition according to one or more disclosed aspects. A device (e.g., a controller 204 or some other device) may or might not execute one or more steps of process 660 as part of a different process (e.g., as step 610 of process 601). According to some aspects, a controller (e.g. 204) executing process 660 may detect a potential arcing condition by detecting an uncontrolled trend in measured (e.g., currently measured, previously measured, etc.) parameter (e.g. voltage, current, power and/or temperature) measurements. For illustrative purposes, voltage measurements are used to illustrate an aspect of process 660.

At step 661, the controller 204 may receive (e.g. load from a memory component and/or receive by communication from another device) k (1, 2, 3, etc.) measured voltage measurements (e.g., measured at an input or at an output of a module 202 or at load 250).

At step 662, the controller 204 may attempt to detect a trend in the voltage measurements. For example, the controller 204 may determine whether the voltage measurements show an increase or decrease over time or stay substantially the same. According to some aspects, other trends may be detected using linear regression, non-linear regression, etc. In one example a voltage drop across an arc (e.g., arc 106) may consistently grow over time (e.g., due to melting of conductors, which may increase an arcing air gap and thereby increase the arcing voltage), which may result in a measured voltage (e.g., at a module 202) increasing over time. Changes in arcing voltage. which may be observed over time. may vary according to one or more parameters, including but not limited to a current flowing through the conductor at which the arc may occur, conductor material, temperature and other operational and environmental parameters. The controller (e.g. 204) executing process 660 may be calibrated according to one or more of these parameters, which may be known or determined (e.g., experimentally estimated) according to the location of the component, device, or system performing the process 660.

According to an embodiment, a voltage drop across an arc may be estimated by Eq. 9, which follows:

$$V_{arc}=(V_c+d\cdot V_d)\cdot(1+\sqrt{I_0/I}) \quad \text{Eq. 9}$$

where $V_{arc}$ may be a full arc voltage, $V_c$ may be a voltage at an arcing contact point, d may be an arc air gap size, $V_d$ may be a parameter relating a voltage drop across the air gap to the size of the air gap d, I may be the current flowing through the arc, and $I_0$ may be a parameter (e.g., a parameter that may depend on the conductor material). According to some aspects, I may be measured by a module 202 and thereby may be known, and d may grow over time (e.g., due to conductor melting), which may provide a change in measured voltages, which may indicate an arcing condition.

As an illustrative, numerical example, a system may have $$V_c = 15[V], V_d = 5\left[\frac{V}{mm}\right],$$

$I_0$=1 A, I=15 A. An arc air gap size may grow by 0.1 mm/sec, arc voltage may grow by about 1V every 3 minutes, which may cause a voltage measured at an output of a module 202 to grow by 50 mV every 3 minutes (e.g., in a case where an output impedance of a module 202 comprises about 5% of the total loop impedance "seen" by an arc), or may cause a voltage measured at an input of a module 202 to grow by about 500 mV every 3 minutes (e.g., in a case where the arc is at an input of a module 202, and an input impedance of a module 202 is about 50% of the total loop impedance "seen" by the arc).

It is to be understood that the illustrative values provided in the numerical example above are simply indicative of possible values corresponding to a feasible scenario in one embodiment. The values may vary in alternative systems and embodiments, and the illustrative values used above are not limiting in any way.

At step 663, the controller 204 may determine whether the voltage measurements loaded at step 661 indicate a trend, and if the measurements indicate a trend—whether the trend is controlled. An example of a controlled trend may be a startup condition, e.g., at the start of a day where one or more modules 202 may actively increase an output voltage, to provide increasing power to load 250. Another example of a controlled trend may be a reduced voltage at an input to a module 202 caused by a module 202 executing Maximum Power Point Tracking (MPPT). Because controlled trends may occur during normal system operation, if a controlled trend is detected (e.g., by correlating the trend with commands issued by control devices or with operational changes in modules 202 and/or load 250), the controller 204 may proceed to step 664, which may be similar to or the same as step 608 of method 601, and may save the measurements. If an uncontrolled trend is detected at step 663, the trend may be indicative of an arcing condition (e.g., an uncontrolled arcing condition), and the controller 204 may proceed to step 665, which may be similar to or the same as step 609 of method 601, and may set an alarm condition. According to some aspects, the process 660 may end at any time and/or after any step.

Figure 7A:
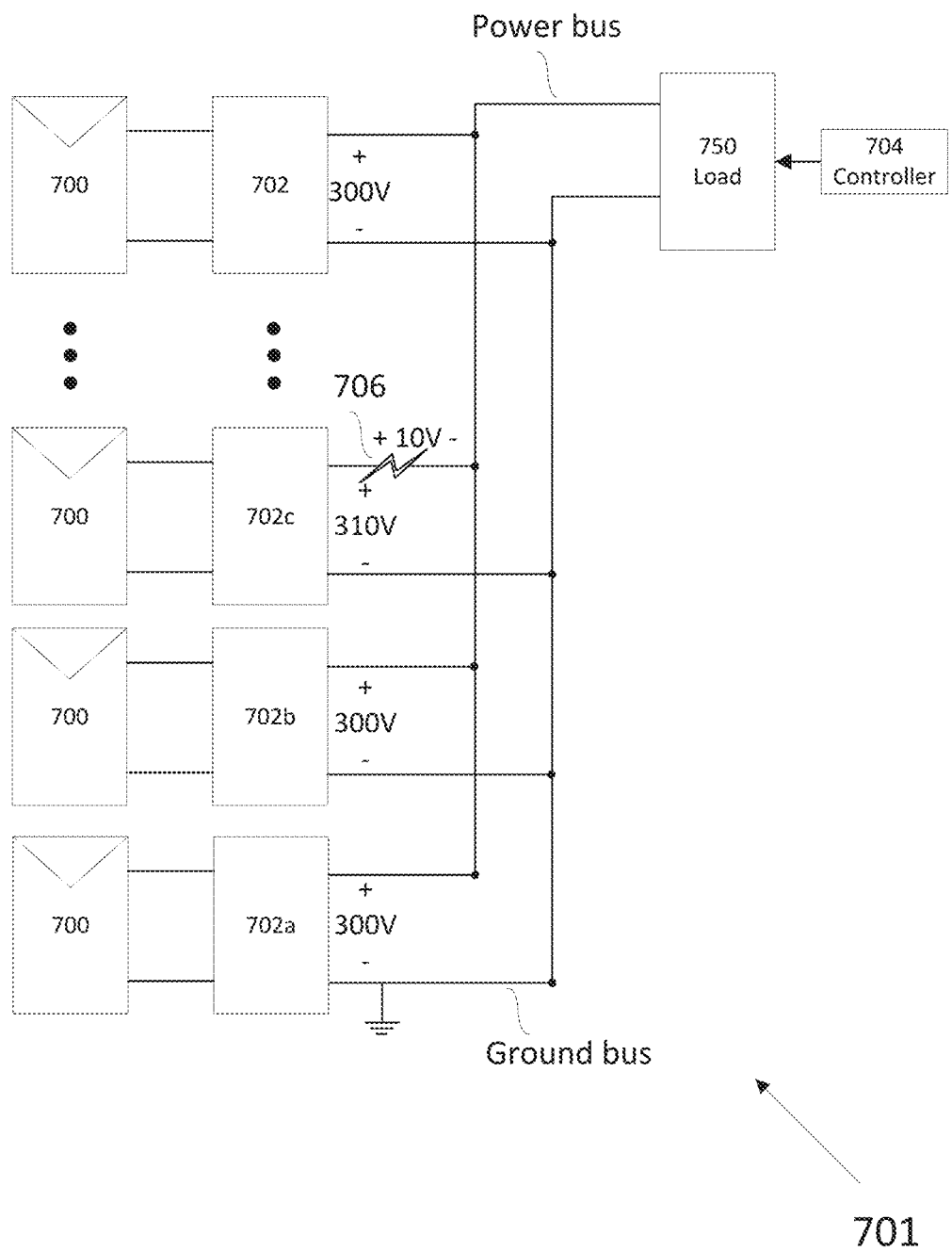
FIG. 7a shows a power generation system including an arc detection feature.

Reference is now made to FIG. 7a, which shows a photovoltaic (PV) generation system 701 according to an illustrative embodiment. PV generation system 701 may comprise a plurality of PV generators. In the illustrative embodiment shown in FIG. 7a, each PV generator may comprise a PV panel 700, which may be similar to or the same as panel 200. In some embodiments, the PV generators may comprise individual PV cells, substrings of PV cells, one or more PV panels and/or PV arrays. In some embodiments, the PV generators may be replaced or complemented by one or more batteries, capacitors, supercapacitors, fuel cells, wind turbines or other power generation or storage sources.

Each PV generator (in the case of FIG. 7a, each panel 700) may be coupled to a power module 702 (e.g., 702a, 702b, 702c and so on, referred to collectively as "modules 702"). According to some aspects, a power module 702 may be similar to or the same as module 202. Each module 702 may comprise input terminals and output terminals, which may be coupled to a panel 700. Each module 702 may be configured to receive input power at the input terminals from a panel 700, and may be configured to provide output power at the output terminals. The power provided by the plurality of modules 702 may be combined between a power bus and a ground bus. In the illustrative embodiment of FIG. 7a, the output terminals of each module 702 are coupled in parallel between the power bus and the ground bus. Each module may apply Maximum Power Point Tracking (MPPT) to an associated panel 700, which may be used to extract increased power (e.g., at or about a maximum power) from the panel.

A load 750 may be coupled between the power bus and the ground bus, and may receive power generated by panels 700. In some embodiments, load 750 may comprise a DC/AC inverter. In some embodiments, load 750 may comprise a DC or an AC combiner box, one or more safety devices (e.g. one or more fuses, residual current devices, relays, disconnect switches). In some embodiments, load 750 may include a monitoring device, for example, one or more sensors configured to measure parameters (e.g. voltage, current, power, temperature and/or irradiance) and a communication device (e.g. wires or wireless) for transmitting and/or receiving messages, commands and/or data. Controller 704 may be coupled to load 750. In some embodiments, controller 704 may be a controller integrated in a DC/AC inverter, and may be implemented using an analog circuit, microprocessor, Digital Signal Processor (DSP), Application-Specific Integrated Circuit (ASIC) and/or a Field Programmable Gate Array (FPGA). The controller 704 may be in communication with modules 702, using communication methods such as Power Line Communications (PLC), wireless communications (e.g., cellular communication, WiFi™, ZigBee™, Bluetooth™ or alternative protocols) and/or acoustic communications. According to some aspects, controller 704 may be the same as or similar to controller 204.

FIG. 7a illustrates a scenario in which arc 706 may occur between an output terminal of module 702c and the power bus. Denoting the voltage between the power bus and the ground bus as Vpg, modules 702 may measure an output voltage of about Vpg, since the output terminals each module 702 may be coupled between the ground bus and the power bus. Module 702c may measure an output voltage different from Vpg, due to the voltage drop across arc 706. In accordance with method disclosed herein, each module 702 may regularly measure the output voltage across each module 702's respective output terminals, and comparison of measured output voltages may indicate an arcing condition. In the illustrative example of FIG. 7a, each module 702 (excluding module 702c) may measure an output voltage of about 300V, and due to the 10V voltage drop across arc 706, module 702c may measure a voltage drop of about 310V.

In some embodiments, one or more modules 702 may measure voltage noise, and the voltage noise measurements obtained by each module 702 may be compared (e.g. by controller 704). In some embodiments, a voltage noise measurement obtained by module 702c may be indicative of arc 706. For example, if a voltage spectrum measured by module 702c comprises significant high-frequency components at a magnitude not found in other voltage measurements, one or more processes or steps disclosed herein may determine that the measurement may be indicative of an arcing condition at or near module 702c.

Figure 7B:
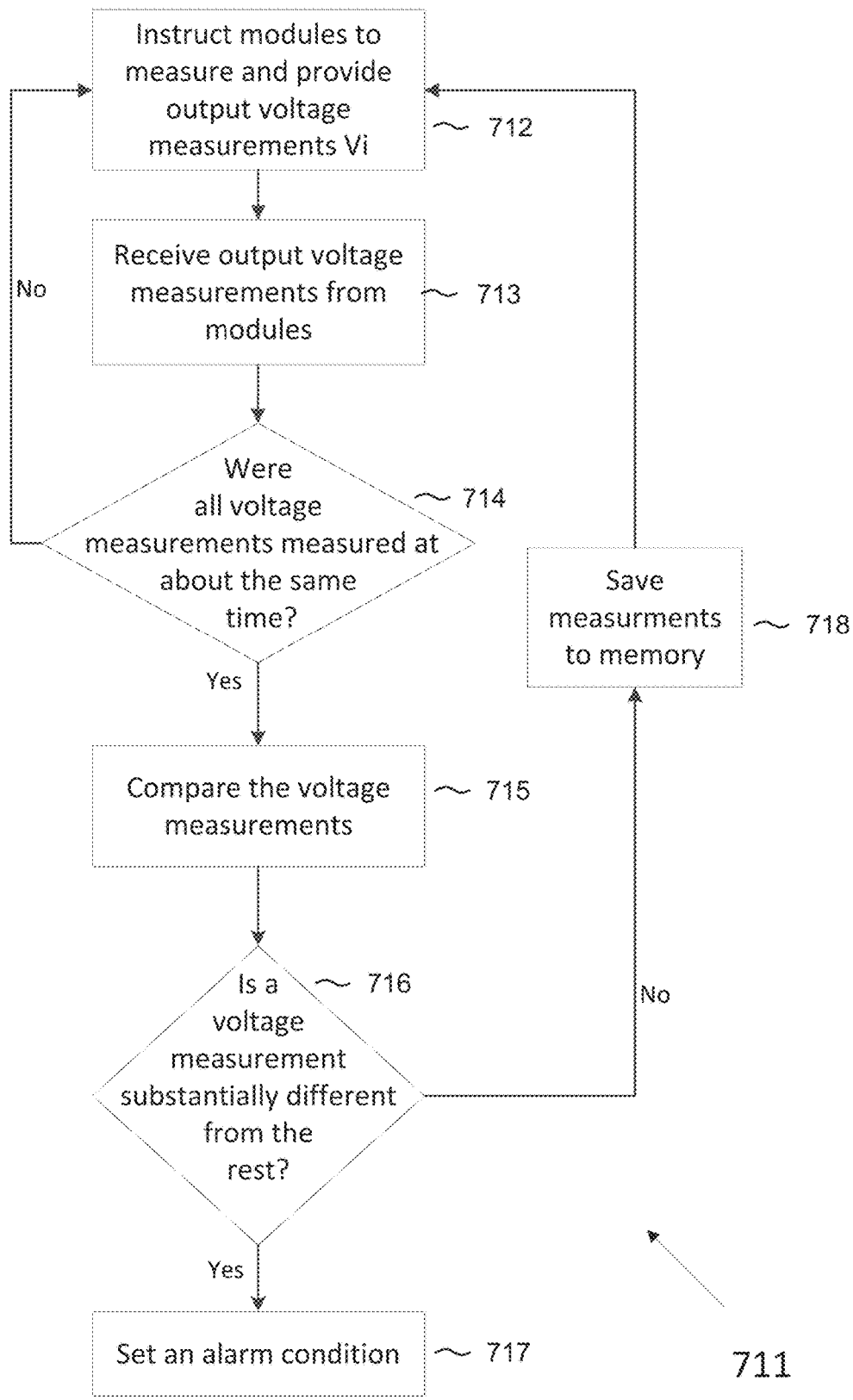
FIG. 7b shows a method for detecting an arc.

Reference is now made to FIG. 7b, which illustrates a method 711 for detecting an arc according to one embodiment. In some embodiments, method 711 may be carried out by a controller similar to or the same as controller 704 of FIG. 7b. In some embodiments, method 711 may be carried out by a master controller featured by a module 702. For illustrative purposes, method 711 will be described as carried out by controller 704. Steps 712-714 may be similar to or the same as steps 602-604, respectively, of method 601. At step 715, the controller (e.g. 704) carrying out method 711 may compare voltage measurements received at step 714 to one another. At step 715, the controller 704 may determine whether a measurement received from a module is different (e.g., a voltage measurement differing by more than 50 mV, 500 mV or more than 1V from the other measurements, or a voltage noise measurement differing by tens of millivolts from other voltage noise measurements). According to some aspects the voltage difference may be compared to some threshold value, which may be set by the controller or some other device. According to some aspects this threshold may be a substantial difference between voltage measurements. According to some aspects, this threshold may be a ratio of voltages. For example, if the voltage difference is twice as large as the lower voltage measurement (corresponding to a threshold ratio of two), or ten times as large as the lower voltage measurement (corresponding to a threshold ratio of ten), or if the voltage difference is equal to the lower voltage measurement (corresponding to a threshold ratio of one), the voltage difference may be considered to be greater than the threshold. If at step 716 a determination is made that an arcing condition is unlikely, the process may proceed to step 718 where the controller 704 may save the measurements received at step 714 to memory. The controller 704 carrying out process 711 may return to step 712, such as after a period of time (e.g., five minutes) has elapsed, for a new execution of method 711. In some embodiments, when past measurements might not have been used for reference, the process may proceed directly from step 716 back to step 712.

If at step 716 it is determined that an arcing condition may be present (e.g., when a voltage measurement is substantially different from other voltage measurements), the process may proceed to step 717, which may be similar to step 609 of method 601, and may set an alarm condition. In some embodiments, the controller may repeat method 711 and only proceed to step 717 if additional repetitions indicate an arcing condition (e.g., to reduce the risk of "false alarms").

In some embodiments, measurements logged at step 718 may be used for reference during future executions of method 711. For example, a first module 702 may consistently provide an output voltage measurement which differs from the other modules' output voltage (e.g., due to a faulty sensor or to a lossy element such as a damaged wire). Steps 715 and 716 may be calibrated to account for a constant or predictable measurement difference, and step 716 may be adapted to trigger step 717 if a measurement difference continuously changes (e.g., increases) over time.

Figure 8A:
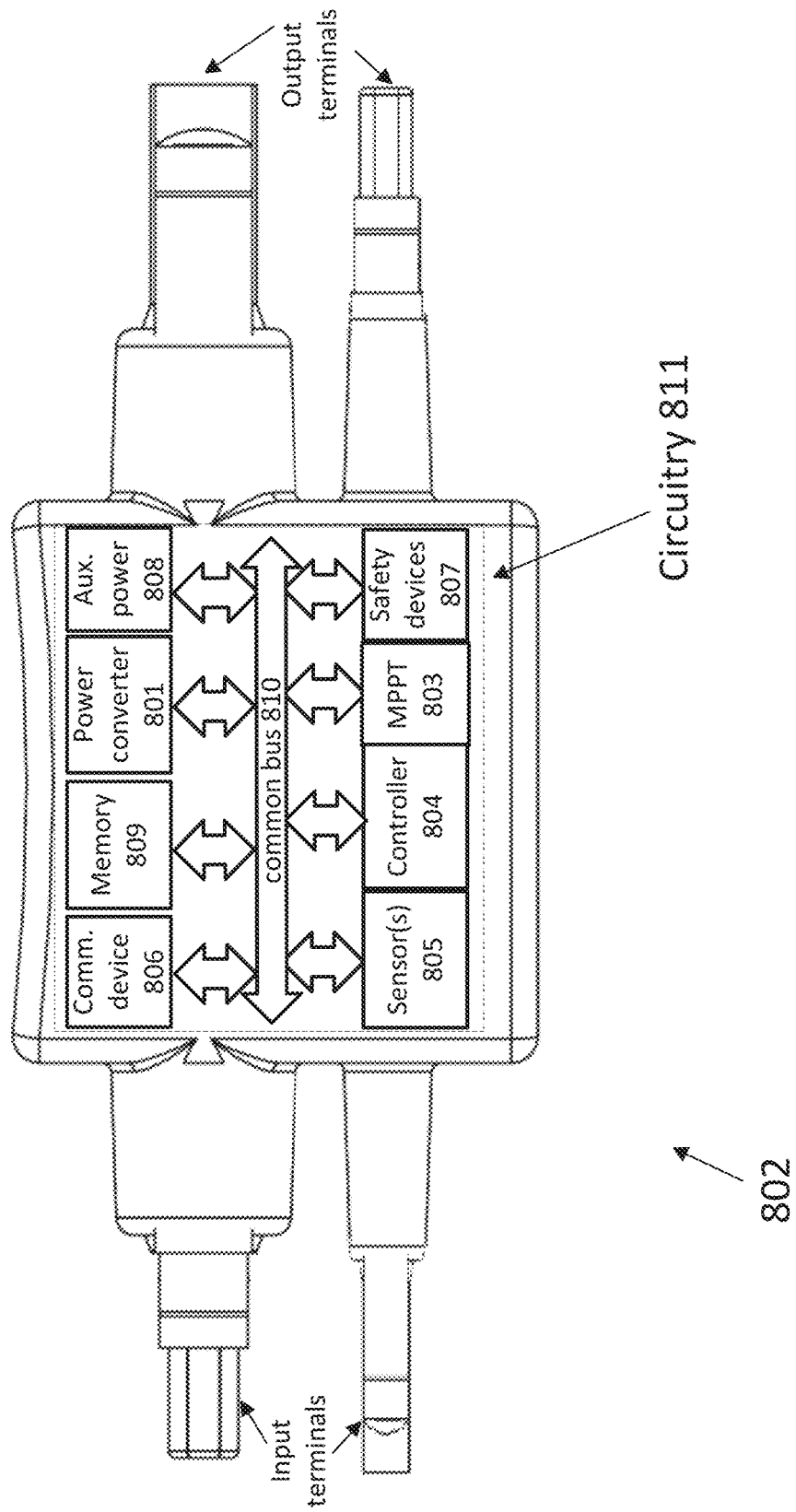
FIG. 8a shows a photovoltaic power device.

Reference is now made to FIG. 8a, which illustrates circuitry 811 such as circuitry which may be found in a photovoltaic power device 802, according to one or more aspects. Photovoltaic power device 802 may be used as, similar to, or may be module 202 of FIG. 2 and FIG. 5a and/or module 702 of FIG. 7a. In some embodiments, circuitry 811 may include power converter 801. Power converter 801 may comprise a direct current-direct current (DC/DC) converter such as a charge pump, buck, boost, buck/boost, buck+boost, Cuk, Flyback, and/or forward converter. In some embodiments, power converter 801 may comprise a direct current—alternating current (DC/AC) converter (also known as an inverter), such as a micro-inverter. In some embodiments, circuitry 811 may include Maximum Power Point Tracking (MPPT) circuit 803, configured to extract increased power (e.g., at or about a maximum power) from a power source (e.g., a solar panel, solar cell, etc.) the power device is coupled to. In some embodiments, power converter 801 may include MPPT functionality. Circuitry 811 may further comprise controller 804, which may be an analog circuit, microprocessor, Digital Signal Processor (DSP), Application-Specific Integrated Circuit (ASIC) and/or a Field Programmable Gate Array (FPGA). Controller 804 may be similar to or the same as controller 204 of FIG. 2, and may be similar to or the same as a control device used to control modules 202 of FIG. 2.

Still referring to FIG. 8a, controller 804 may control and/or communicate with other elements of circuitry 811 over common bus 810. In some embodiments, circuitry 811 may include circuitry and/or sensors/sensor interfaces 805 configured to measure parameters directly or receive measured parameters from connected sensors and/or sensor interfaces 805 configured to measure parameters on, at, or near the power source. These parameters may include the voltage and/or current output by the power source and/or the power output by the power source, and the like. In some embodiments, the power source may be a PV module, and a sensor or sensor interface 805 may measure or may receive measurements of the irradiance received by the module and/or the temperature on, at, or near the module. In some embodiments, circuitry and/or sensors/sensor interfaces 805 may be configured to measure parameters directly or receive measured parameters from connected sensors and/or sensor interfaces 805 configured to measure parameters on or near the output of PV power device 802. These parameters may include the voltage and/or current output by PV power device 802 and/or the power output by PV power device 802.

Still referring to FIG. 8a, in some embodiments, circuitry 811 may include communication device 806, configured to transmit and/or receive data and/or commands from other devices. Communication device 806 may communicate using Power Line Communication (PLC) technology, acoustic communication technology or wireless technologies such as ZigBee™, Wi-Fi™, Bluetooth™, cellular communication or other wireless methods. In some embodiments, circuitry 811 may include memory device 809, for logging measurements taken by sensor(s)/sensor interfaces 805 to store code, operational protocols or other operating information. Memory device 809 may be flash, Electrically Erasable Programmable Read-Only Memory (EEPROM), Random Access Memory (RAM), Solid State Devices (SSD) or other types of appropriate memory devices.

Still referring to FIG. 8a, in some embodiments, circuitry 811 may include safety devices 807 (e.g., fuses, circuit breakers and Residual Current Detectors). Safety devices 807 may be passive or active. For example, safety devices 807 may comprise one or more passive fuses disposed within circuitry 811 and designed to melt when a certain current flows through it, disconnecting part of circuitry 811 to avoid damage. In some embodiments, safety devices 807 may comprise active disconnect switches, configured to receive commands from a controller (e.g., controller 804, or an external controller) to disconnect portions of circuitry 811, or configured to disconnect portions of circuitry 811 in response to a measurement measured by a sensor (e.g., a measurement measured by sensors/sensor interfaces 805). In some embodiments, circuitry 811 may comprise auxiliary power unit 808, configured to receive power from a power source coupled to circuitry 811, and output power suitable for operating other circuitry components (e.g., controller 804, communication device 806, etc.). Communication, electrical coupling and/or data-sharing between the various components of circuitry 811 may be carried out over common bus 810.

According to some embodiments, controller 804 may be configured to carry out process 611 of FIG. 6b. According to some embodiments, sensor/sensor interfaces 805 may be configured to measure the output voltage of PV power device 802 at step 613 of process 611. According to some embodiments, communication device 806 may be configured to carry out steps 612, 615 and/or 616 of process 611 by transmitting or receiving messages from a coupled communication device, and relaying received instructions to controller 804. In some embodiments, communication device 806 may be configured to carry out step 554 of process 500 of FIG. 5c. In some embodiments, controller 804 may be configured to function as a "master controller" and to carry out process 601 of FIG. 6a, processor 711 of FIG. 7b, and steps 552, 556, 558 and (along with communication device 806) 560 of method 500 of FIG. 5c.

Circuitry 811 might comprise a portion of the components depicted in FIG. 8a. For example, in some embodiments, PV power device 802 may be a monitoring and/or safety device, which might not include power conversion and/or MPPT functionality (i.e., circuitry 811 might not comprise power converter 801 and/or MPPT circuit 803). In some embodiments, PV power device 802 may comprise power conversion and/or MPPT functionality, but might not comprise one or more communication features (i.e., circuitry 811 might not comprise communication device 806. For example, controller 804 may be configured to disconnect circuitry 811 from a PV string in response to detecting an arcing condition, e.g., without receiving a communication from other power devices).

In some embodiments, PV power device 802 and/or one or more components of circuitry 811 may be integrated into a photovoltaic generator. For example, circuitry 811 may be integrated into a photovoltaic generator junction box. As another example, elements of circuitry 811 (e.g., power converter 801, controller 804 and/or safety devices 807) may be embedded into PV panels or other power devices.

Figure 8B:
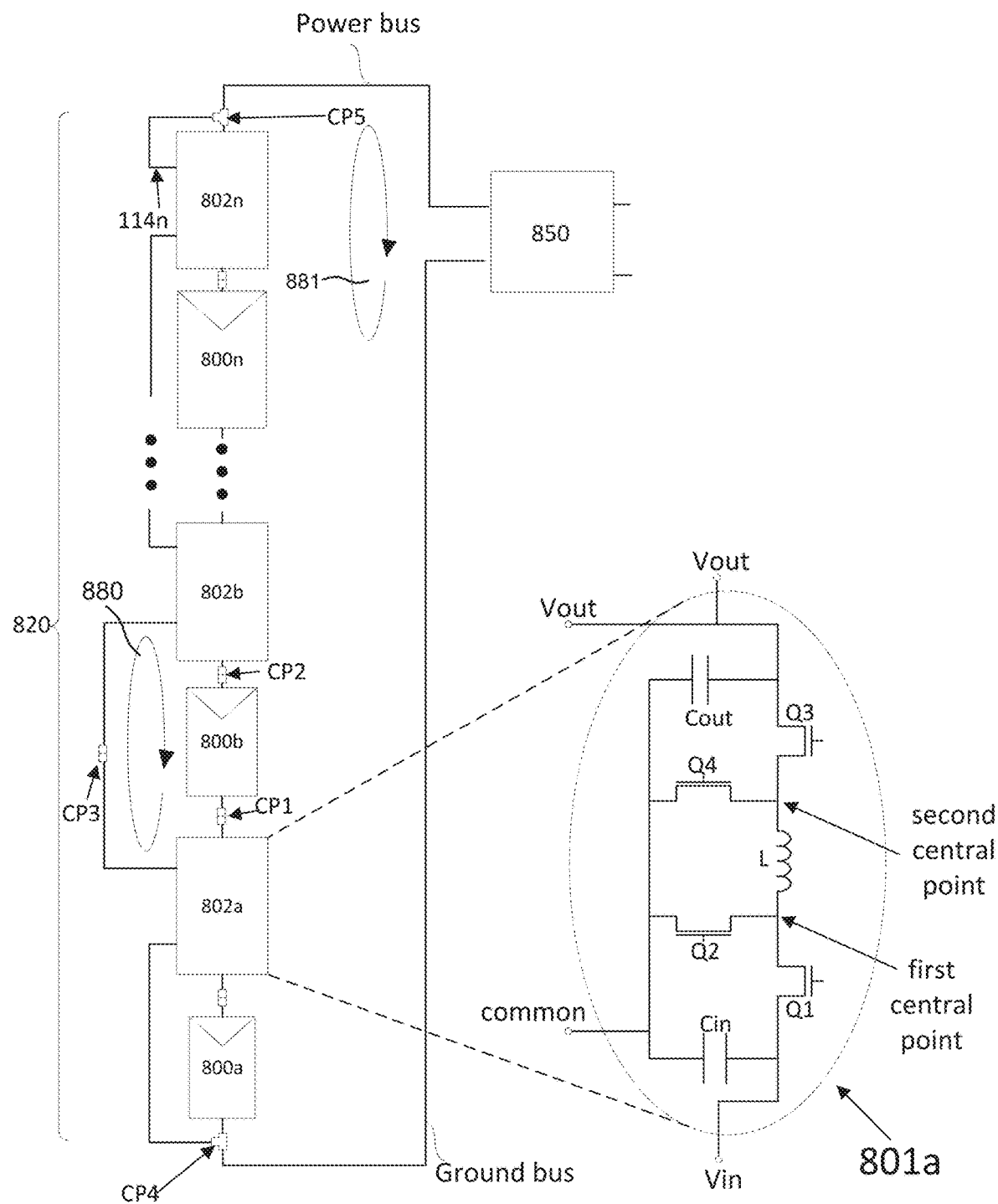
FIG. 8b shows a power generation system including an arc detection feature.

Reference is now made to FIG. 8b, which illustrates a portion of a photovoltaic power generation system according to an embodiment. In the illustrative embodiment depicted in FIG. 8b, a plurality of PV power devices 802 (e.g., 802a, 802b, . . . 802n) may be coupled to a plurality of PV generators 800 (e.g., 800a, 800b, . . . 800n) to form a photovoltaic string 820. According to some aspects, one terminal of the resultant photovoltaic string 820 may be coupled to a power (e.g., direct current) bus, and the other terminal of the string 820 may be coupled to a ground bus. In some embodiments, the power and ground buses may be input to system power device 850. In some embodiments, system power device 850 may include a DC/AC inverter and may output alternating current (AC) power to a power grid, home or other destinations. In some embodiments, system power device 850 may comprise a combiner box, DC-link, transformer and/or safety disconnect circuit. For example, system power device 850 may comprise a DC combiner box for receiving DC power from a plurality of PV strings similar to or the same as 820 and outputting the combined DC power. In some embodiments, system power device 850 may be coupled to a plurality of parallel-connected PV strings, and may include a fuse coupled to each PV string for overcurrent protection, and/or one or more disconnect switches for disconnecting one or more PV strings. In some embodiments, system power device 850 may comprise a Rapid Shutdown circuit, configured to rapidly reduce an input voltage to system power device 850 in response to a potentially unsafe condition (e.g., detecting an arc, or an islanding condition). In some embodiments, system power device 850 may be similar to or the same as load 250 of FIG. 2 and/or load 750 of FIG. 7a.

In some embodiments, photovoltaic (PV) power device 802a may comprise a power converter 801a using a variation of a Buck+Boost DC/DC converter. Power converter 801a may include a circuit having two input terminals, denoted Vin and common, and two output terminals which output the same voltage Vout. The output voltage is in relation to the common terminal. The circuit may include an input capacitor Cin coupled between the common terminal and the Vin terminal, an output capacitor coupled between the common terminal and the Vout terminals. The circuit may include a first central point and a second central point used for reference. The circuit may include a plurality of switches (e.g., MOSFET transistors) Q1, Q2, Q3 and Q4 with Q1 connected between Vin and the first central point, and Q2 connected between the common terminal and the first central point. Q3 may be connected between the Vout terminal and the second central point, and Q4 may be connected between the common terminal and the second central point. The circuit may further include inductor L coupled between the two central points.

The operation of the Buck+Boost DC/DC converter in PV power device 802a may be variously configured. For example, if an output voltage lower than the input voltage is desired, Q3 may be statically ON, Q4 may be statically OFF, and with Q1 and Q2 being PWM-switched in a complementary manner to one another, the circuit is temporarily equivalent to a Buck converter and the input voltage is bucked. If an output voltage higher than the input voltage is desired, Q1 may be statically ON, Q2 may be statically OFF, and with Q3 and Q4 being PWM-switched in a complementary manner to one another, the input voltage is boosted. Staggering the switching of switches Q1 and Q2, the circuit may convert the input voltage Vin to output voltage Vout. If current is input to the circuit by the Vin and common terminals, and the voltage drop across capacitors Cin and Cout are about constant voltages Vin and Vout respectively, the currents input to the circuit are combined at inductor L to form an inductor current which is equal to the sum of the current input at the Vin and common terminals. The inductor current may be output by the pair of output terminals Vout. In some embodiments, more than two Vout terminals may be utilized to split the output current into more than two portions. In some embodiments, a single output terminal may be included, and system designers may split the output terminal externally (i.e., outside of the PV power device circuit), if desired.

In alternative embodiments, power converter 801a may be modified or configured (e.g., by removing switches Q3 and Q4 and connecting the Vout terminals directly to the second central point) to be a regular Buck converter, or may be modified or configured (e.g., by removing switches Q1 and Q2 and connecting the Vin terminal directly to the first central point) to be a regular Boost converter.

Arranging a PV string in a manner similar to PV string 820 may provide several benefits. For example, by routing string current through two current paths, each current path carrying a portion of the total string current, cabling costs associated with arranging string 820 may be reduced (e.g., because conductors provided along with PV generators 800 may be utilized to carry part of the total string current). As a second example, by directly coupling an output of a first PV power device (e.g., 802a) to a common terminal of a second PV power device (e.g., 802b) such that a PV generator (e.g., 800b) is coupled between the first and second PV power devices, the first and second PV power devices may be configured to carry out point-to-point power line communications (PTPPLC) and/or may determine (e.g., by detecting magnitudes and waveforms of a current flowing along the conduction path between the first and second PV power devices) that the first and second power devices may be adjacent to each other, potentially assisting with localization and mapping of PV power generation systems. Additional advantages disclosed herein include improved arc detection and localization capabilities using reduced-impedance voltage loops provided by the arrangement of PV string 820.

A first Vout terminal of PV power device 802a may be coupled to a negative output of PV generator 800b at connection point 1 (denoted CP1). A second Vout terminal of PV power device 802a may be coupled to the common terminal of PV power device 802b at connection point 3 (denoted CP3). A positive output of PV generator 800b may be coupled to the Vin terminal of PV power device 802b at connection point 2 (denoted CP2).

At the ground bus end of PV string 820, PV generator 800a may be coupled to the ground bus at connection point 4 (denoted CP4). At the power bus end of PV string 820, PV power device 800n may be coupled to the ground bus at connection point 5 (denoted CP5). For notational convenience, connection points which are not connected to the ground or power buses (e.g., connection points CP1, CP2 and CP3) will be referred to as "middle connection points", or MCPs, and connection points which are connected to the group or power buses (e.g., connection points CP4 and CP5) will be referred to as "end connection points", or ECPs.

While arcing can occur at nearly any location in a photovoltaic system, connection points may be particularly susceptible to arcing due to the risk of a faulty connection and/or ingress of dirt or humidity. By arranging a PV string similarly to PV string 820, sensors disposed in PV power devices 802 (e.g., sensor(s)/sensor interfaces 805 of FIG. 8a) may detect the arcing condition by monitoring a voltage across two terminals of PV power device 802, the voltage being part of a reduced voltage loop.

Figure 8C:
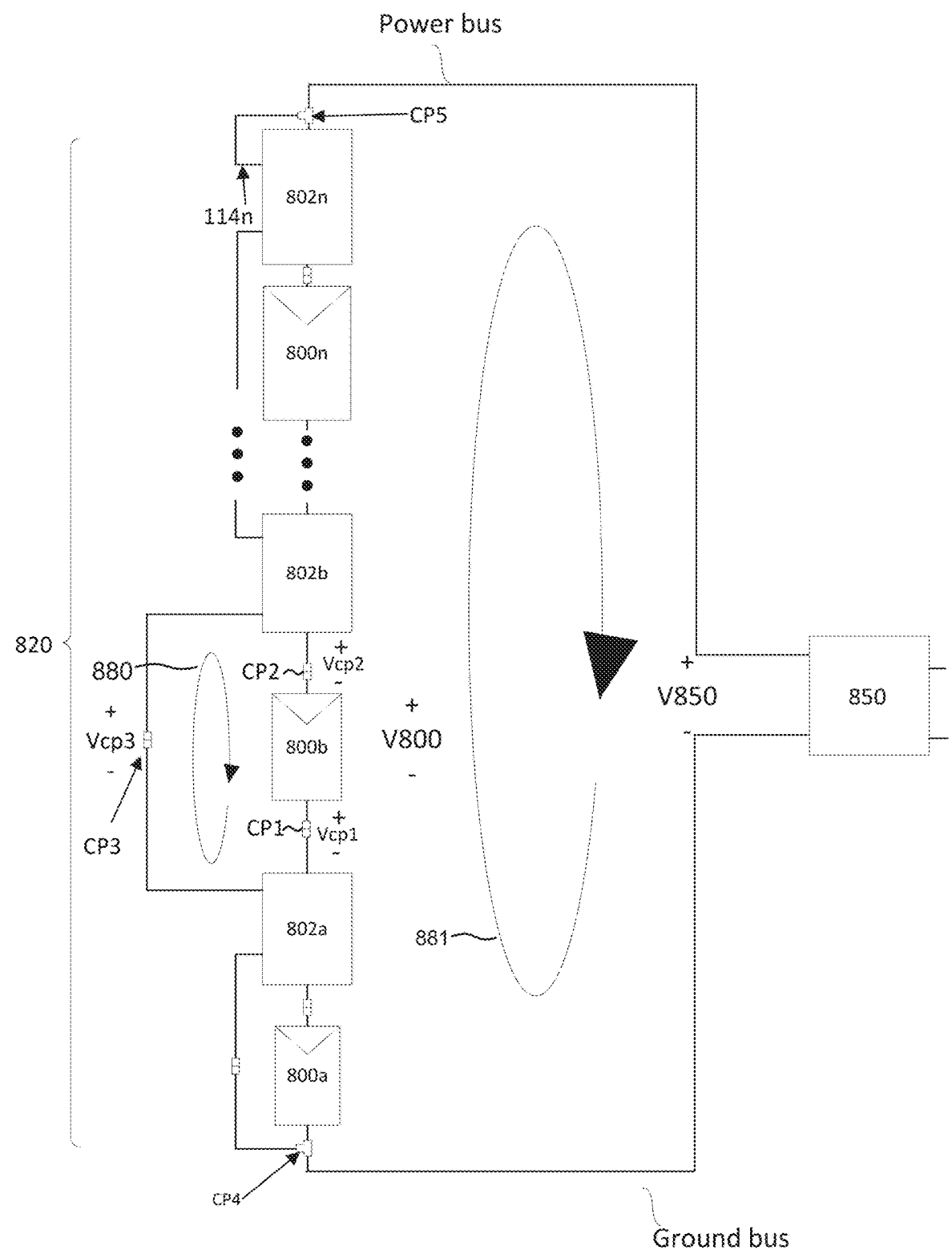
FIG. 8c shows a power generation system including an arc detection feature.

Reference is now made to FIG. 8c, which illustrates a portion of a photovoltaic power generation system according to an illustrative embodiment. PV string 820, PV generators 800, PV power devices 802 and system power device 850 may be the same as the corresponding elements of FIG. 8b. First voltage loop 881 may comprise a voltage at the input of system power device 850 (denoted V850), a plurality of voltages across connection points at terminals of PV generators 800 (e.g., CP4, CP1, CP2), a plurality of voltages across PV generators 800, denoted V800, and a plurality of voltages across PV power devices 802 (i.e., a voltage between a Vout terminal and the Vin terminal of a PV power device 802). According to Kirchhoff's Voltage Law (KVL), first voltage loop 881 may be described according to Eq. 10, which follows:

$$V_{dc} + \underbrace{\sum_{i=1}^{N} V_{800,i}}_{\alpha} + \underbrace{\sum_{i=1}^{N}(V_{out,802i} - V_{in,802i})}_{\beta} + \underbrace{\sum_{CP \in MCP} V_{CP} + V_{CP4} + V_{CP5}}_{\gamma} = 0 \qquad \text{Eq. 10}$$

where α denotes the summed voltages of PV generators 800, β denotes the summed Vin-to-Vout voltages of PV power devices 802, and γ denotes the summed voltages across the MCPs, i.e., across connection points between a PV generator 800 and a PV power device 802 (e.g., CP1, CP2). Voltage V850 may be monitored (e.g., measured), and the input and output voltage of PV power devices (i.e., $V_{out,802}$ and $V_{in,802i}$) may be similarly monitored. Under normal (i.e., non-arcing) operating conditions, connection-point voltages may be about zero and voltages V850, $V_{out,802}$ and $V_{in,802i}$ may change at low-frequency or not at all (i.e., DC voltages). Under arcing conditions, an arc may inject high-frequency voltage components into a component of first voltage loop 881 (for example, if an arc is present at CP2, the voltage Vcp2 may include high-frequency components).

To maintain a total voltage of zero across first voltage loop 881 (i.e., as to not violate Eq. 10), the remaining voltages featured in Eq. 10 may (e.g., the voltages across one or more of PV power devices 802 and/or system power device 850) may comprise negative high-frequency components, i.e., high-frequency voltage components having the opposite polarity compared to the high-frequency voltage components across the arc). The negative high-frequency voltage components may be detectable by sensors coupled to PV power devices 802, PV generators 800 and/or system power device 850. For example, a voltage sensor coupled to the inputs of system power device 850 may measure V850, and may be configured to raise an alarm or take corrective action in response to a V850 voltage measurement including high-frequency components (e.g., above 1 kHz) at an amplitude of over 10 mV, which may indicate an arcing condition.

In some embodiments, voltage sensors coupled to PV power devices 802 and/or system power device 850 may be dual-purpose. For example, communication device 806 of FIG. 8a may be a Power Line Communications (PLC) device configured to carry out Frequency Shift Keying (FSK) and may comprise a voltage sensor configured to measure high-frequency voltage components. Voltage components measured at certain information bands of high frequencies may be decoded for information, and voltage components measured at noise bands of high frequencies may be determined to be indicative of an arcing condition. For example, a first frequency band between 55 kHz-65 kHz, a second frequency band between 75 kHz-80 kHz and a third frequency band between 85 kHz-91 kHz may all be monitored for information signals. A fourth frequency band between 100 kHz-120 kHz may be monitored for voltage noise indicating an arcing condition.

In some embodiments, certain frequency bands may be associated with or may correspond to voltage noise that might not be indicative of an arcing condition. For example, an arc detection circuit (such as disclosed herein) may be coupled to a DC/DC converter or a DC/AC converter which may comprise one or more switches that may switch (i.e., operate, etc.) at a high frequency. The switching of the switches at a high frequency may cause voltage noise at the switching frequency and multiples thereof. For example, a converter switching one or more switches at 19 kHz may generate voltage noise at 19 kHz, 38 kHz, 57 kHz, etc. To reduce the risk of determining a false-positive arcing condition, in some embodiments, a frequency band for monitoring for an arcing condition or that may indicate an arcing condition may be selected or identified. Doing this may avoid one or more frequencies that may contain voltage noise which might not be indicative of an arcing condition (e.g., a switching frequency, etc.).

In some embodiments, a select frequency or group of select frequencies may be used for monitoring voltage noise indicating an arcing condition. The select frequency or selected frequencies may correspond to a frequency at which an impedance of a voltage loop may be reduced. For example, the total impedance of voltage loop 881 may be lowest (due to resonating capacitive and inductive elements comprising voltage loop 881) at 10 kHz. In this case, a voltage component corresponding to 10 kHz may be measured for an arc indication, or a voltage component corresponding to between 5 kHz and 20 kHz (i.e., twice and half of the low-impedance frequency) may be measured for an arc indication. In some embodiments, a loop impedance may be adjusted (e.g., by connecting adjustable capacitive and/or inductive elements) to resonate at a selected frequency, thereby improving detection of a voltage component corresponding to the selected frequency.

In some embodiments, additional voltage (or other parameter) sensing circuits may be added and configured for measuring high-frequency voltage components. For example, voltage-sensing circuits (e.g., voltage-sensing inductor circuits) may be serially coupled to input or output terminals of PV power devices, system power devices and/or photovoltaic generators, and may be configured to measure high-frequency voltage components at the input or output terminals.

Still referring to FIG. 8c, a second voltage loop 880 may comprise a voltage across a PV generator (e.g., 800b), voltages across two MCPs (e.g., CP1 and CP2), a voltage across a connection point between two PV power devices (e.g., 802a and 802b), and a voltage between two terminals of a PV power device (e.g., the Vin-to-common voltage of PV power device 802b). A plurality of voltage loops similar to voltage loop 880 may exist in a PV string 820; a similar voltage loop may be defined with regard to each PV generator in PV string 820. A Kirchhoff's voltage law (KVL) equation may represent voltage loop 880 according to Eq. 11, which follows:

$$V_{800}+(V_{common,802}-V_{in,802})+V_{CP1}+V_{CP2}-V_{CP3}=0$$

Under normal operating conditions (i.e., no arc), voltages Vcp1, Vcp2 and Vcp3 may be about zero, and Eq. 11 may reduce to Eq. 12, which follows:

$$V_{800}+(V_{common,802}-V_{in,802})=0 \Rightarrow$$

$$V_{800}=V_{in,802}-V_{common,802}$$

The voltage $V_{in,802}-V_{common,802}$ may be continuously monitored by a voltage sensor, which may be disposed at, near, or within a PV power device 802a. In case of an arc at one of the connection points within voltage loop 880, high frequency voltage components may be measured at the input of a PV power device 802 (e.g., 802b), and in response, an alarm may be raised. In some embodiments, a voltage may be monitored across a communication device disposed at an input or output terminal of a PV power device 802. Under normal operating conditions, a sensor may detect and/or decode voltage components at one or more frequencies that may correspond to information signal frequencies. According to some aspects, a sensor may detect and/or decode voltage components at one or more frequencies that might not corresponding to information signal frequencies, which may be indicative of an arcing condition.

An advantage which may be realized in accordance with embodiments disclosed herein may be a reduced loop impedance of second voltage loop 880. According to some aspects, voltage sensors may be disposed at, near, or between one or more terminals of PV power devices 802 and may be configured to detect high-frequency voltage components which may be substantially larger (i.e., have a higher magnitude) than high-frequency voltage components measured within a larger loop comprising a higher loop impedance. The increased magnitude of high-frequency voltage components may facilitate early detection of arcing condition, and may enable a faster response and increased safety.

An additional advantage may include fast localization of the arc. For example, if an arc occurs at CP1, high-frequency voltage components may be detected at a first, high magnitude at PV power device 802b (which may be part of voltage loop 880), and at a second, reduced magnitude by additional PV power devices (e.g., PV power devices 802a, 802n, which may be part of voltage loop 881). Comparing magnitudes of measured high-frequency voltage components may indicate that PV power device may have measured larger high-frequency voltage components, which may indicate that an arc may have occurred at or in close proximity to PV power device 802*b*.

Yet another advantage of the arrangement of string 820 may be provision of a reduced-impedance loop for one or more or all connection points. In some conventional power systems, a substantial number of connection points associated with PV power devices might not be part of reduced-impedance voltage loops, potentially increasing detection time of arcing conditions. In an arrangement according to string 820, a portion of or all connection points (e.g., with the exception of connection point CP5) may be part of at least one reduced-impedance voltage loop, which may reduce the time to detect an arc at any given connection point, and may provide a method for determining a location of an arcing condition.

According to some aspects, if an arc occurs at a location other than a connection point (e.g., at the power bus, the ground bus or at conductors disposed in PV string 820, etc.), the arc may inject high-frequency voltage components which may affect voltage measurements taken at locations within first voltage loop 881 and/or within second voltage loop 880. Depending on the location of the arc, an increased magnitude of high-frequency voltage components may be measured. For example, if an arc occurs at a conductor disposed between CP1 and PV generator 800*b*, an increased high-frequency voltage magnitude may be measured by PV power device 802*b*. As another example, if an arc occurs at CP4, an increased high-frequency voltage magnitude may be measured by PV power device 802*a*. High frequency voltage magnitudes may include voltage magnitudes at a frequency substantially above a grid frequency, for example, 200 Hz, 1 kHz, 5 kHz, 20 kHz, 100 kHz or higher. As yet another example, if an arc occurs at the ground bus, at the power bus, or at CP4, an increased high-frequency voltage magnitude might not be measured by any PV power device.

Figure 8D:
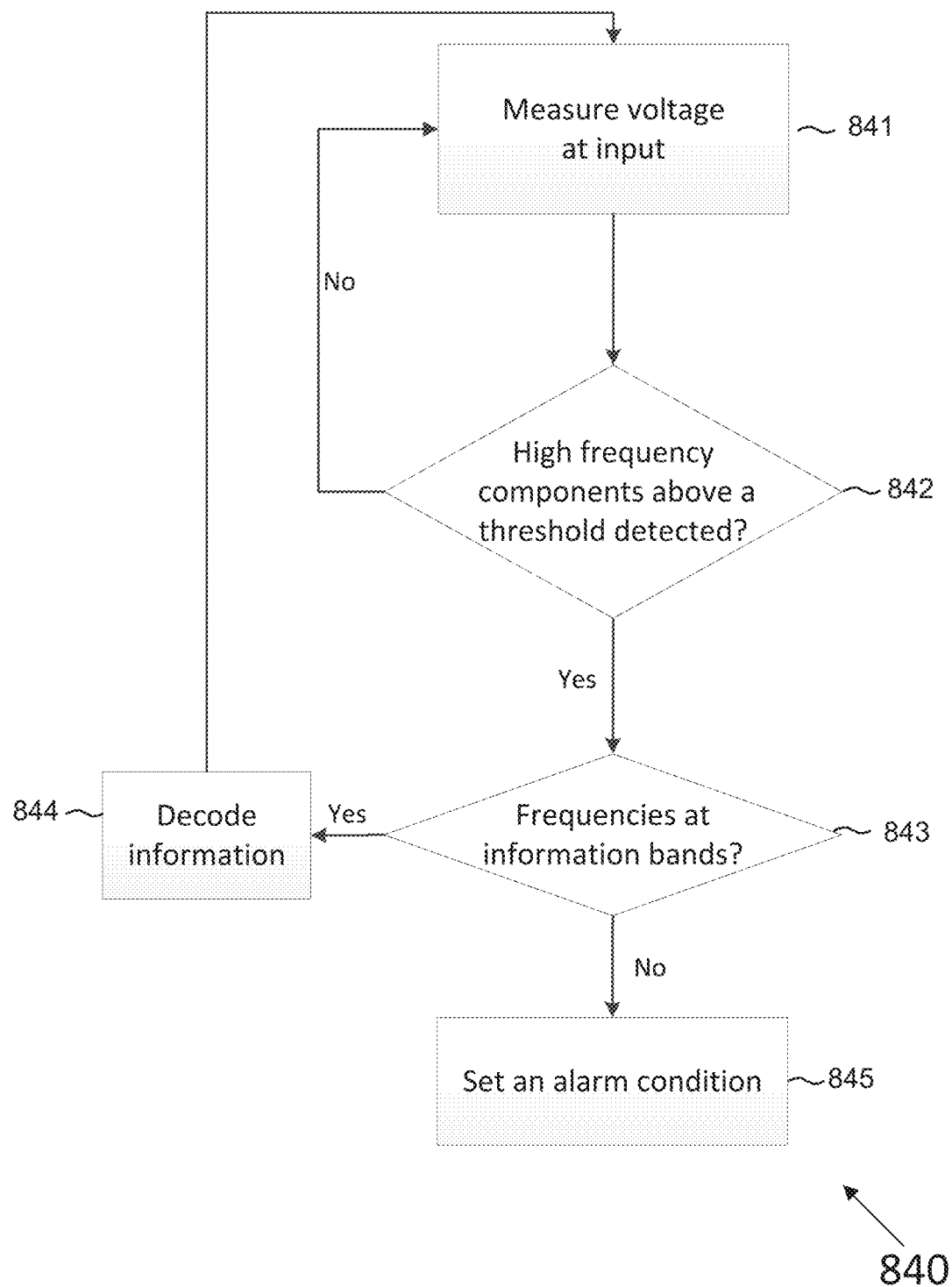
FIG. 8d shows a method for detecting an arc.

Reference is now made to FIG. 8*d*, which illustrates a process 840 for detecting an arc according to some aspects. Process 840 may be carried out by one or more devices (e.g., controller 704, etc.) coupled to a PV power device (e.g., controller 804 of FIG. 8*a*, coupled to PV power device 802) and/or a controller coupled to a system power device (e.g., system power device 850 of FIG. 8*c*).

At step 841, a voltage may be measured at an input to the power device comprising the controller. For example, a voltage may be measured between input terminals or in series with an input or an output terminal of a PV power device.

At step 842, the controller may determine whether the voltage measurement obtained at step 841 comprises high-frequency components which may above a threshold. The threshold may correspond to a voltage level which is above a voltage level which likely corresponds to "normal" or typical (e.g. non-arcing) system operation. The threshold may be, as illustrative numerical examples, 10 mV or 100 mV, or some other value. As another example, the threshold may be a voltage measured at another frequency band, or at another point in coupled circuitry. For example, a group of voltage measurements may be measured at a plurality of high frequencies, with the threshold being set as the difference in voltage between the greatest two of the voltage measurements. As another example, the threshold may be a ratio of voltage differences. For example, if a voltage level at a first high frequency is twice the magnitude of a voltage level at a second high frequency (corresponding to a threshold ratio of two), or one hundred thousand times the magnitude of a voltage level at a second high frequency (corresponding to a threshold ratio of one hundred thousand), the voltage difference may be considered to be greater than the threshold. As yet another example, a threshold may be set with respect to a low frequency voltage. For example, a DC voltage may be measured, and a threshold for high-frequency voltage components may be set at, for example, 2% of the value of the DC voltage.

If no such voltage components above a threshold are detected, the controller may return to step 841, and after a period of time has elapsed (e.g., seconds or minutes), restart process 840 or may return to a previous step.

If, at step 842, high-frequency voltage components above the threshold are detected, the process 840 may proceed to step 843 and determine whether the voltage components are located at frequency bands which may be used for communication. In embodiments where information might not be modulated as high-frequency voltage signals, the process 840 may proceed from step 842 directly to step 845.

If, at step 843, the controller determines that the high-frequency voltage components correspond to modulated information (e.g. a power-line-communication message comprising parameter measurements, instructions, or other information), the controller may proceed to step 844. At step 844, the controller may decode the voltage measurement to determine any information contained in the voltage measurement. The process 840 may then return to step 841.

If, at step 843, the controller determines that the high-frequency voltage components might not correspond to modulated information (e.g. the controller determines that the high-frequency voltage components may correspond to noise)), the process 840 may proceed to step 845, and the controller may set an alarm condition. Step 845 may be similar to or the same as step 408 of FIG. 4, step 528 of FIG. 5*d*, step 609 of FIG. 6*a*, and/or step 717 of FIG. 7*b*.

In an illustrative embodiment, step 845 may include determining a location of an arc and transmitting localization information to wired and/or wireless network(s)/Internet/Intranet, and/or any number of end user device(s) such as a computer, smart phone, tablet and/or other devices such as servers which may be located at a network operations center and/or power generation monitoring center. Determining a location of an arc may comprise comparing voltage measurements measured by a plurality of PV power devices in a string and determining that an arc is likely present in the proximity of a PV power device which measured a high-frequency voltage component which is larger than the components measured by other PV power devices.

In some embodiments, process 840 may be carried out by a controller device coupled to a local PV power device (e.g. modules 702 of FIG. 7*a*) and may include determining a location of an arc may comprise comparing measured high-frequency voltage components to a threshold. The controller may be configured to determine that the arc is adjacent to the local PV power device if the measured high-frequency voltage components are above the threshold. In some embodiments, several PV power device controllers may carry out process 840 simultaneously or sequentially, where the aggregated results of each process 840 execution may be considered by a master controller configured to set an alarm condition if more than one of the PV power device controllers determines than an arcing condition may be present.

Figure 9:
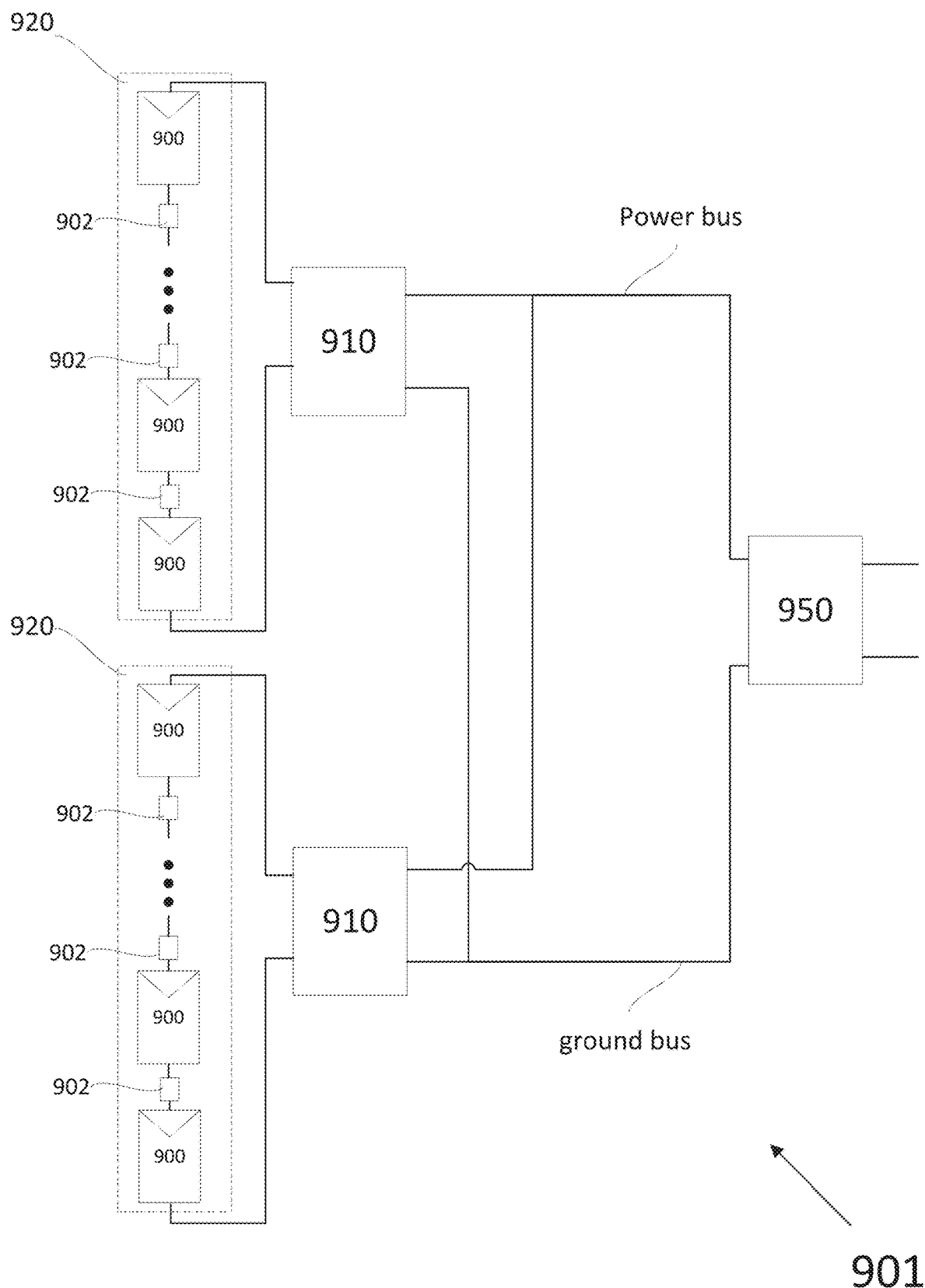
FIG. 9 illustrates a photovoltaic system configuration.

Reference is now made to FIG. 9, which shows a photovoltaic (PV) system according to illustrative embodiments. PV system 901 may comprise a plurality of PV strings 920, each PV string 920 coupled to a string device 910, with a plurality of string devices 910 coupled in series or in parallel between a ground bus and a power bus. Each of PV strings 920 may comprise a plurality of serially-connected PV generators 900. PV generators 900 may be similar to or the same as PV panels 200 of FIG. 2, PV panels 700 of FIG. 7A and/or PV generators 800 of FIG. 8B. PV generators 900 may comprise one or more photovoltaic cells(s), module(s), substring(s), panel(s) or shingle(s). In some embodiments, PV generators 900 may be replaced by direct current (DC) batteries or alternative direct current or alternating current (AC) power sources.

A safety device 902 may be coupled at various locations in PV strings 920. For example, in some embodiments (e.g. the embodiment shown in FIG. 9), a safety device 902 may be disposed between each pair of PV generators 900. In some embodiments a safety device 902 may be disposed between groups of more than one serially-connected PV generators 900.

In some embodiments, safety devices 902 may comprise sensors/sensor interfaces for measuring electrical or thermal parameters (e.g. current, voltage, power, temperature, irradiance etc.). In some embodiments, safety devices 902 may comprise switches for disconnecting PV generators 900 in case of a potential safety condition and control/driver circuits for controlling the switches. In some embodiments, safety devices 902 may comprise arc-detection circuits configured to monitor electrical parameters (e.g. current, voltage, power) and analyze the electrical parameters to determine if an arcing condition is present. In some embodiments, safety devices 902 may comprise a wired or wireless communication device for transmitting and/or receiving measurements and/or messages.

String devices 910 may be similar to module 202 of FIG. 2, power module 702 of FIG. 7A and/or power module 802 of FIG. 8a, String devices 910 may comprise one or more of communication device 806, memory device 809, power converter 801, auxiliary power unit 808, sensor/sensor interface(s) 805, controller 804, MPPT circuit 803 and safety devices 807.

In some embodiments, a plurality of string devices 910 may be coupled in parallel between the ground bus and the power bus, as shown in FIG. 9. In some embodiments, a plurality of string devices 910 may be coupled in series between the ground bus and the power bus. In some embodiments, a plurality of string devices 910 may be coupled in a series-parallel arrangement between the ground bus and the power bus. In some embodiments, a plurality of string devices 910 may be housed by a single enclosure having multiple inputs for multiple PV strings.

Safety regulations may define a maximum allowable voltage between the ground bus and any other voltage point in PV system 901, during both regular operating conditions and during potentially unsafe conditions (e.g. a fire, grid outage, an islanding condition, arcing and the like). Similarly, safety regulations may define a maximum allowable voltage between any two voltage points in PV system 901. In some scenarios, an unsafe condition in PV system 901 may require disconnecting or short-circuiting one or more of the PV generators 900 in a PV string 920 or one or more of string devices 910.

In some embodiments, a string device 910 may respond to a potentially unsafe system condition by limiting the voltage across a PV string 920 or between the power bus and the ground bus. For example, string device 910 may comprise a converter configured to regulate a voltage of about 60V across each PV string 920 in case of a potentially unsafe condition.

In some embodiments, the power and ground buses may connect to and/or be input to system power device 950. In some embodiments, system power device 950 may include a DC/AC inverter and may output alternating current (AC) power to a load, power grid, home, or other devices or destinations. In some embodiments, system power device 950 may comprise a combiner box, a transformer, and/or a safety disconnect circuit. For example, system power device 950 may comprise a DC combiner box for receiving DC power from a plurality of PV strings 920 and outputting the combined DC power. In some embodiments, system power device 950 may include a fuse coupled to string device 910 for overcurrent protection, and/or may include one or more disconnect switches for disconnecting one or more string devices 910.

In some embodiments, system power device 950 may include or be coupled to a control device and/or a communication device for controlling or communicating with one or more safety devices 902 and/or one or more string devices 910. For example, system power device 950 may comprise a control device such as a microprocessor, Digital Signal Processor (DSP) and/or a Field Programmable Gate Array (FPGA) configured to control the operation of a string device 910. In some embodiments, system power device 950 may comprise multiple interacting control devices. System power device 950 may comprise a communication device (e.g. a Power Line Communication circuit, a wireless transceiver, etc.) configured to communicate with linked communication devices included in or coupled to safety devices 902 and/or string devices 910. In some embodiments, system power device 950 may comprise both a control device and a communication device, where the control device may be configured to determine desirable modes of operation for safety devices 902 and/or string devices 910, and the communication device may be configured to transmit operational commands and/or receive reports from communication devices included in or coupled to the safety devices 902 and/or string devices 910.

System power device 950 may be may be coupled to and/or connected to any number of other devices and/or systems, such as PV systems 100 and/or 701. For example, system power device 950 may be coupled to one or more discrete and/or interconnected devices such as disconnect(s), PV cell(s)/array(s)/panels, inverter(s), micro inverter(s), PV power device(s), safety device(s), meter(s), breaker(s), AC main(s), junction box(es), camera(s), etc. In some embodiments, system power device 950 may be coupled to and/or connected to network(s)/Intranet/Internet, computing devices, smart phone devices, tablet devices, camera, one or more servers which may include data bases and/or work stations. System power device 950 may be configured for controlling the operation of components within PV system 901 and/or for controlling the interactions with other elements coupled to PV system 901.

In some embodiments, system power device 950 may respond to a potentially unsafe system condition by limiting (e.g., decreasing to a lower voltage, decreasing to zero voltage, etc.) the voltage between the power bus and the ground bus.

In some embodiments, the power and ground buses may be further coupled to energy storage devices such as batteries, flywheels, capacitors, inductors, or other devices.

In some embodiments, safety devices 902 and/or string devices 910 may be configured to detect a proximate arcing condition and to take corrective action and/or generate a signal indicative of an arcing condition to a different device. For example, a safety device 902 may detect a possible arcing condition (e.g. using a process similar to process 840 of FIG. 8*d*) at a terminal of a PV generator 900, and may disconnect the PV generator 900 to prevent or reduce danger. In some embodiments, the safety device 902 may indicate and/or report the possible arcing condition to a string device 910 and/or a system power device 950 via a wired or wireless communication signal. The string device 910 and/or a system power device 950 may be configured to reduce voltage at one or more PV generators 900 or PV strings 920 or may be configured to disconnect one or more PV strings 920 to prevent or reduce danger. In some embodiments, the safety device 902 may generate (e.g., by rapid switching of a switch, etc.) a voltage and/or current noise signal indicative of an arcing condition and detectable by a string device 910.

In another example, a string device 910 may detect (e.g., using a process similar to process 840 of FIG. 8*d*) an arcing condition at an input terminal of the string device 910 or at an intermediate point in a PV string 920 (e.g., between two PV generators 900). The string device 910 may take corrective action by disconnecting and/or reducing voltage across the PV string 920, and/or may transmit a signal to system power device 950 indicating the arcing condition. For example, the string device 910 may send to system power device 950 a wired or a wireless communication signal indicating the arcing condition. As another example, the string device 910 may generate a noisy voltage and/or current signal between the power bus and the ground bus. The noisy voltage or current signal may be detectable by system power device 950 and may be indicative of an arcing condition. System power device 950 may be configured to respond to a signal indicative of an arcing condition, for example, by disconnecting one or more string devices 910 or PV strings 920, or by sending a command to reduce voltage across or current through a string device 910 or a PV string 920.

Figure 10A:
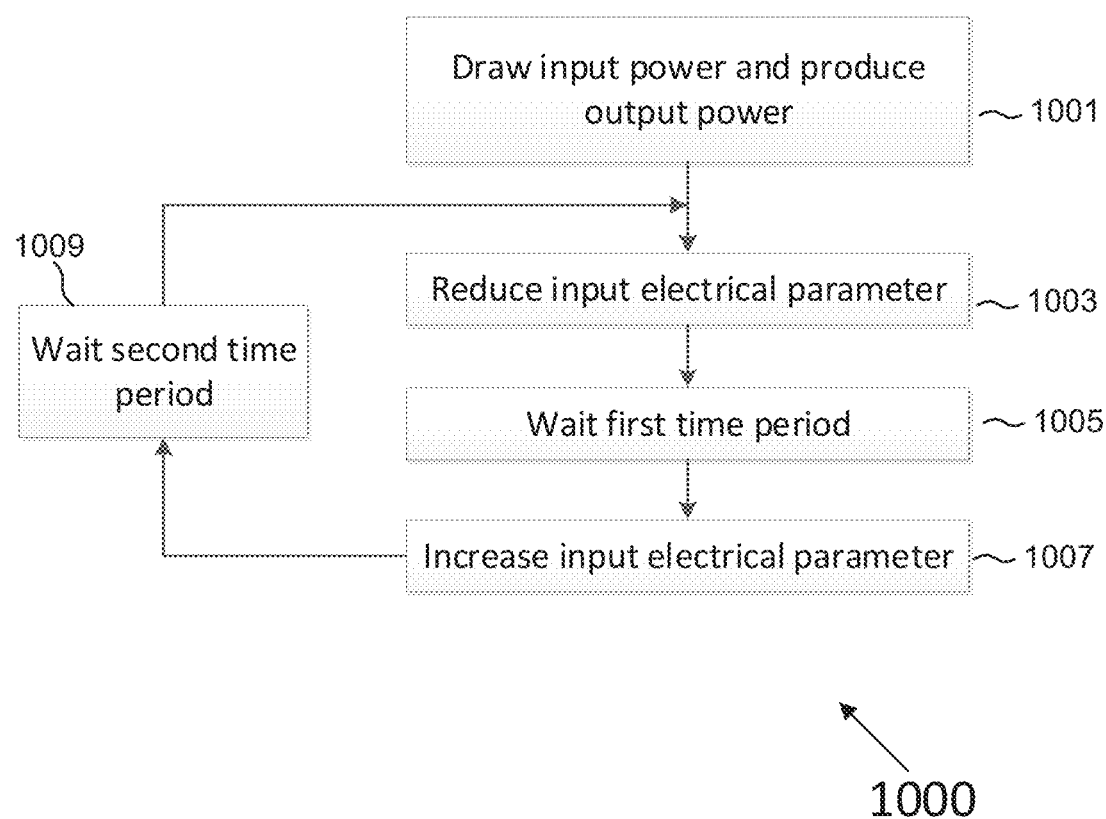
FIG. 10a shows a method for extinguishing an electrical arc.

Reference is now made to FIG. 10*a*, which illustrates a flow process for extinguishing an arc. Process 1000 may be carried out by one or more control devices (e.g., controller 704, etc.) coupled to a PV power device (e.g., controller 804 of FIG. 8*a*, coupled to PV power device 802). Additionally or alternatively, a control device may be coupled to a system power device (e.g., system power device 850 of FIG. 8*c*). At step 1001, the control device may cause the power device (e.g., the PV power device and/or the system power device) to draw input power from one or more PV generators and output power generated by the one or more PV generators. At step 1003, the control device may reduce the magnitude of an electrical parameter of power drawn from the PV generator(s) from a first level (e.g., a first voltage level or a first current level) to a second (reduced) level. For example, the control device may cause the power device to draw a reduced current, or may set the voltage across the inputs of the power device to a reduced voltage magnitude. If an arc is present in the system when step 1003 is executed, the reduction in voltage, current and/or power input to the power device may extinguish the arc. At step 1005, the device may wait a first predetermined period of time (e.g. several microseconds, milliseconds, tens of milliseconds or hundreds of milliseconds) and proceed to step 1007, where the input electrical parameter reduced at step 1003 is increased (for example, reset to values for drawing substantial (e.g., maximum, or near-maximum) input power).

Process 1000 may be then proceed to step 1009 to wait for a second predetermined period of time before repeating steps 1003-1007, which may repeat at regular intervals. For example, based on the values of the first predetermined time period and second predetermined time period, the device carrying out process 1000 may repeatedly reduce and increase an electrical parameter every several hundred milliseconds, every second, or every several seconds. Thus, the second predetermined time period may be significantly longer (e.g., 100-10,000 times or more) than the first predetermined time period. In this manner, in case an arc is caused by transitory and/or temporary conditions, it may be extinguished within a safe timespan without need for manual intervention to shut down the system and/or restart the system after an arc is extinguished.

In a case where an arc is extinguished at step 1003, resumption of regular system operation at step 1007 may proceed without a repetition of the arcing condition. Some arcs may be caused by temporary and/or transitory conditions such as moisture, temperature or other conditions that might be resolved by a single arc extinguishment, without requiring a full system shutdown and manual intervention.

Figure 10B:
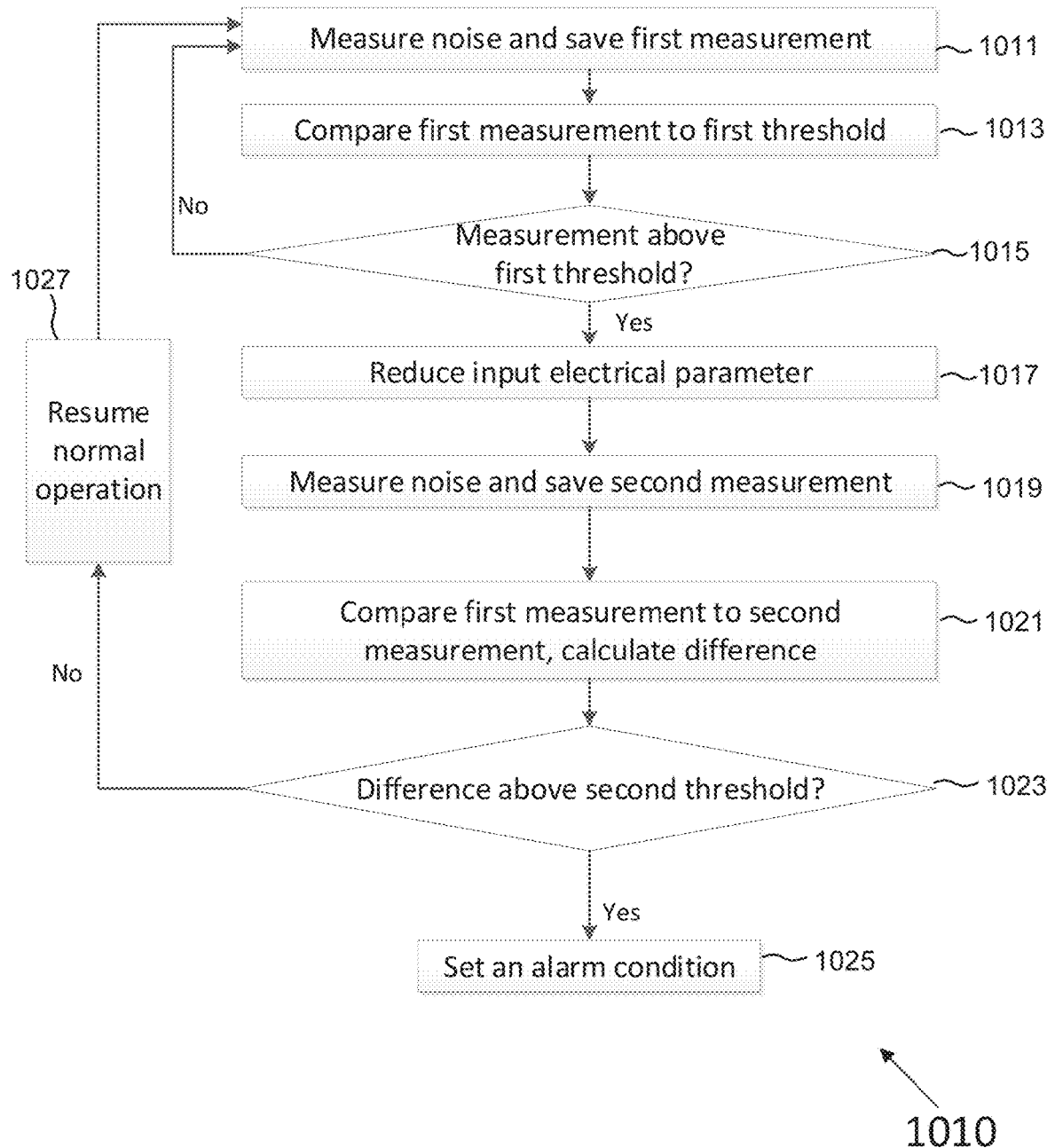
FIG. 10b shows a method for detecting and extinguishing an electrical arc.

Reference is now made to FIG. 10*b*, which shows a flow process in accordance with disclosed aspects. Process 1010 may be carried out by one or more control devices (e.g., controller 704, etc.) coupled to a PV power device (e.g., controller 804 of FIG. 8*a*, coupled to PV power device 802). Additionally or alternatively, a control device may be coupled to a system power device (e.g., system power device 850 of FIG. 8*c*). At step 1011, the control device may measure noise of an electrical parameter of power (e.g., a high-frequency component of voltage measured at the power device input or a high-frequency component of current measured flowing to the power device input). The measured electrical noise may be saved (e.g., saved to a memory device) as a first measurement. At step 1013, the control device may compare the first measurement to a first threshold. If, at step 1015, the control device determines that the first measurement is not above the first threshold, the control device may interpret the result of the comparison as an indication of no-arcing, and after a suitable time period (e.g. tens or hundreds of milliseconds), the control device may return to step 1011.

If, at step 1015, the control device determines that the first measurement is above the first threshold, the control device may interpret the result as an indication of possible arcing, and proceed to step 1017 to operate the power device to reduce power input to the power device. For example, the control device may operate the power device to reduce the voltage across and/or the current flowing to the power device input. At step 1017, the control device may wait a predetermined time period (e.g., to allow the electrical parameter to settle at the reduced level and/or for an arc to extinguish). At step 1019, the control device may again measure noise of the electrical parameter of power (e.g., a high-frequency component of voltage measured at the power device input or a high-frequency component of current measured flowing to the power device input) and save the measurement as a second measurement. At step 1021, the control device may compare the second measurement to the first measurement and calculate a difference, for example, by subtracting the second measurement from the first measurement. At step 1023, the control device may compare the difference to a second threshold. If the difference is above the second threshold, the control device may determine that an arc may have been present in the electrical system prior to the reduction of the electrical parameter and may therefore set an alarm condition at step 1025 (e.g., similar to or the same as the alarm condition of step 845 of FIG. 8*d*).

If the difference is not above the second threshold, the control device may determine that there was no arcing (e.g., the noise may have been due to interference from another source, rather than an electrical arc). Therefore, after a suitable time period (e.g. several milliseconds, or tens or hundreds of milliseconds), the control device may resume normal operation of the power device at step 1027 (by increasing the value of the electrical parameter reduced at step 1017) and return to step 1011.

According to aspects of the disclosure, at step 1023, instead of comparing the difference to a second threshold, the control device may directly compare the second measurement to a second threshold. Similarly, the control device carrying out process 1010 may be configured such that the control device may proceed from step 1015 to step 1017 if the first measurement is below the first threshold, and/or the control device carrying out process 1010 may be configured such that the control device may proceed from step 1023 to step 1025 if the second measurement or the difference is below the second threshold (e.g., if the difference calculated at step 1021 is calculated by subtracting the first measurement from the second measurement).

If, prior to and/or during the execution of process 1010, an arc is present in the system including the power device, the reduction of the electrical parameter (e.g. voltage, current, power) at step 1017 may extinguish the arc. If an arc is extinguished because of the reduction at step 1017, the control device may determine at step 1023 that the difference is above the second threshold. After extinguishing the arc, some safety regulations may require manual inspection of the electrical system before returning to normal operation. Accordingly, even though the arc was extinguished, the control device may set the alarm condition at step 1025. Some safety regulations may allow a system to resume normal operation automatically after an arc is extinguished. Therefore, the control device can also be configured to cause the power device to resume normal operation at step 1027 without setting an alarm condition after an arc is extinguished. Additionally, some parameters used in implementation of process 1010 (e.g., the first threshold, or parameters used to measure the noise for the first measurement) might be calibrated in a manner that may generate potential false alarms at step 1015, with steps 1019-1023 providing an added verification layer to a determination that an arc is present.

The two-stage method illustrated by process 1010 may provide an accurate and robust manner of detecting arcs while reducing a risk of false alarms. For example, a high-magnitude noise measurement may be obtained by temporary interference or a faulty sample, and the risk of erroneously interpreting the high-magnitude noise measurement as indicative of an arc may be reduced by implementing steps 1017-1023. Additionally, process 1010 may extinguish an arc (e.g., at step 1017) before setting an alarm condition (at step 1025), which, according to some potential safety regulations, may reduce system down-time by allowing the system to return to normal operation without manual intervention.

Reference is now made to FIG. 11*a*, which illustrates a first example result of carrying out process 1010, according to one or more illustrative aspects of the disclosure herein. FIG. 11*a* shows plot 1100 showing illustrative current 1101 and noise 1102 as measured over time in a photovoltaic installation where process 1010 is implemented. Current 1101 may be the magnitude of an AC current output by a system power device (e.g. system power device 950 of FIG. 9), a DC current input to a system power device, a DC current output by a PV power device (e.g. PV power device 702 of FIG. 7*a*) or a DC current input to a PV power device. Noise 1102 may be a noise signal obtaining by sampling and calculating a high-frequency current or voltage component. Noise 1102 may be referred to using decibel (dB) units. The x-axis of plot 1100 is a time axis, in milliseconds.

In this example, until time t1, the system represented in plot 1100 may be operating under normal operating conditions, with current 1101 having a value of about 12 [A], and noise 1102 samples being around 3-7 [dB]. If, for example, the control device for carrying out process 1010 is implemented such that the first threshold is 20 [dB], the control device operating the power device or system power device (and carrying out process 1010) may loop between steps 1011-1015. At time t1, an arc may suddenly develop in the system, resulting in noise 1102 increasing to around 40 [dB]. The next time the device reaches step 1015 of process 1010, at time t2, the device proceeds to step 1017 and, according to this illustrative example, reduces current 1101 from about 12 [A] at time t2 to about 1 [A] at time t3. The reduction in current 1101 is shown to reduce noise 1102 from about 40 [dB] to about 0 dB. At step 1019, the second measurement will be about 0 dB, and the difference calculated at step 1021 will be about 40 [dB]. At step 1023 (sometime after time t3), the difference may be determined to be above a second threshold (which may be, for exemplary purposes, 20 [dB]), and the device may determine that an arc was extinguished. Plot 1100 illustrates an example in which an arcing condition is extinguished at step 1017 of process 1010. Some safety regulations may require that in case an arcing condition is extinguished (e.g., at step 1017), an alarm condition must be raised (e.g., the control device may proceed to step 1025) and/or manual intervention (e.g., a maintenance worker physically inspecting the system to check for faulty components, and resetting a manual switch) may be required to restore the system to normal operation. Accordingly, as illustrated at FIG. 11*a*, the system may continue operating in a reduced power mode until a later time period (not illustrated) in which the system is inspected and restored to normal mode (e.g., using a manual switch).

Reference is now made to FIG. 11*b*, which illustrates a second example result of carrying out process 1010, according to one or more illustrative aspects of the disclosure herein. FIG. 11*b* shows plot 1103 showing illustrative current 1104 and noise 1105 as measured over time in a photovoltaic installation where process 1010 is implemented. In the example of FIG. 11*b*, reducing current 1104 at time t2 reduces noise 1105 from about 40 [dB] to about 30 [dB]. The 10 [dB] reduction might indicate that noise 1105 is not due to an arc (e.g., noise 1105 may be caused by an external factor such as electromagnetic interference from nearby electronic devices). The difference calculated at step 1021 of process 1010 of FIG. 10*b* may be about 10 [dB], which might be below the second threshold (which may be, for exemplary purposes, 20 [dB]). At time t3 (or at some point afterwards), the control device carrying out process 1010 may determine (at step 1023) that an arcing condition is not present, and may resume normal operation of the power device at step 1027 (by increasing the value of the electrical parameter reduced at step 1017, as shown at time t4 in plot 1103) and return to step 1011.

The definite articles "a", "an" is used herein, such as "an arc voltage and/or arc current", "a load" have the meaning of "one or more" that is "one or more arc voltages and/or arc currents" or "one or more loads".

While the disclosure contains a limited number of examples, it will be appreciated that many variations, modifications and other applications based on the disclosure may be made. For example, elements of measurement synchronization disclosed with regard to process 601 may be similarly applied to other processes and aspects disclosed herein. For example, steps 552-554 of process 500 depicted in FIG. 5c may make similar use of measurement and/or transmission synchronization as described with regard to FIG. 6a. As another example, process 840 may be carried out by a single controller (e.g., controller 804 of FIG. 8a) or by several controllers acting in conjunction. As yet another example, aspects disclosed herein may be combined with other disclosed aspects. For example, step 610 described with regard to method 601 may be added to method 711, such that if step 714 of method 711 determines that all voltage measurements were not measured at about the same time, the controller executing method 711 proceeds to a step similar to step 610.

PV generators and PV panels have been used to exemplify illustrative power sources in power generation systems disclosed herein. Apparatuses and methods disclosed herein may be implemented in power generation systems comprising batteries, capacitors, supercapacitors, fuel cells, wind turbines, hydro-generators, or other power sources in addition to or instead of PV generators and/or PV panels.

What is claimed is:

1. A method comprising:
    obtaining first, second, third and fourth sets of voltage measurements from a plurality of power devices connected in a serial string;
    determining first, second, third, and fourth voltage values associated with first, second, third, and fourth timestamps respectively, wherein:
        the first voltage value is a sum of the first set of voltage measurements,
        the second voltage value is a sum of the second set of voltage measurements,
        the third voltage value is a sum of the third set of voltage measurements,
        the fourth voltage value is a sum of the fourth set of voltage measurements;
    determining a first differential voltage using the first voltage value and the second voltage value;
    determining a second differential voltage using the third voltage value and the fourth voltage value;
    detecting a trend using the first differential voltage and the second differential voltage;
    determining that the trend is an uncontrolled trend; and
    controlling power based on the uncontrolled trend.

2. The method of claim 1, wherein at least one of the plurality of power devices is connected to a photovoltaic generator.

3. The method of claim 1, wherein the controlling of the power comprises degrading the power based on the uncontrolled trend.

4. The method of claim 1, wherein the controlling of the power comprises turning off the power based on the uncontrolled trend.

5. The method of claim 1, further comprising setting an alarm condition based on the uncontrolled trend, wherein the uncontrolled trend is related to an arcing condition, and the alarm condition is set based on the arcing condition.

6. The method of claim 1, further comprising:
    determining that a previously detected trend is a controlled trend; and
    saving a plurality of voltage values associated with the controlled trend;
    wherein the determining that the trend is the uncontrolled trend is based on the saved plurality of voltages.

7. The method of claim 6, further comprising determining that the previously detected trend is the controlled trend by determining that the previously detected trend is related to a startup condition or related to power tracking.

8. The method of claim 1, further comprising detecting the trend by determining that the first voltage value and the second voltage value indicate an increase or decrease over time.

9. The method of claim 1, further comprising:
    determining a plurality of voltage values in addition to the first voltage value, the second voltage value, the third voltage value, and the fourth voltage value;
    applying linear regression or non-linear regression to the plurality of voltage values, the first voltage value, the second voltage value, the third voltage value, and the fourth voltage value; and
    detecting the trend using the linear regression or the non-linear regression.

10. The method of claim 1, further comprising detecting the trend based on a rising differential voltage over a period of time.

11. The method of claim 1, further comprising detecting the trend using at least one of: current related to the a power device of the plurality of power devices, power related to the power device of the plurality of power devices, or temperature related to the power device of the plurality of power devices.

12. The method of claim 1, further comprising:
    detecting the trend using voltage values related to a second power device.

13. The method of claim 1, wherein the trend is related to a change in voltage of the power device in a range of 50 mv-500 mV.

14. The method of claim 1, further comprising:
    setting a threshold to a first value;
    comparing the first differential voltage to the first value of the threshold;
    changing the threshold from the first value to a second value based on the first differential voltage;
    comparing the second differential voltage to the second value of the threshold; and
    controlling power based on the threshold at the first value or the second value.

15. An apparatus comprising:
    computer memory or communications circuitry; and
    a controller comprising computer processing circuitry, wherein the controller is configured to:
    obtain, using the computer memory or the communications circuitry, first, second, third and fourth sets of voltage measurements from a plurality of power devices connected in a serial string;
    determine first, second, third, and fourth voltage values associated with first, second, third, and fourth timestamps respectively, wherein:
        the first voltage value is a sum of the first set of voltage measurements,
        the second voltage value is a sum of the second set of voltage measurements,
        the third voltage value is a sum of the third set of voltage measurements,
        the fourth voltage value is a sum of the fourth set of voltage measurements;

determine, using the computer processing circuitry, a first differential voltage using the first voltage value and the second voltage value;

determine, using the computer processing circuitry, a second differential voltage using the third voltage value and the fourth voltage value;

detect, using the computer processing circuitry, a trend using the first differential voltage and the second differential voltage;

determine, using the computer processing circuitry, that the trend is an uncontrolled trend; and control power based on the uncontrolled trend.

16. The apparatus of claim 15, wherein at least one of the plurality of power devices is connected to a photovoltaic generator.

17. The apparatus of claim 15, wherein the controller is further configured to:

degrade the power or turn off the power based on the uncontrolled trend.

18. The apparatus of claim 15, wherein the controller is further configured to:

set an alarm condition based on the uncontrolled trend;

determine, using the computer processing circuitry, that the uncontrolled trend is related to an arcing condition;

set the alarm condition based on the arcing condition; and send, using the communications circuitry, the alarm condition.

19. The apparatus of claim 15, wherein the controller is further configured to detect, using the computer processing circuitry, the trend:

by determining that the first voltage value and the second voltage value indicate an increase or decrease over time; or based on a rising differential voltage over a period of time.

20. The apparatus of claim 15, wherein the controller is further configured to:

determine, using the computer memory or the communications circuitry, a plurality of voltage values in addition to the first voltage value, the second voltage value, the third voltage value and the fourth voltage value;

apply, using the computer processing circuitry, linear regression or non-linear regression to the plurality of voltage values, the first voltage value, the second voltage value, the third voltage value, and the fourth voltage value; and detect, using the computer processing circuitry, the trend using the linear regression or the non-linear regression.

* * * * *